(12) United States Patent
Davis et al.

(10) Patent No.: US 10,023,283 B2
(45) Date of Patent: *Jul. 17, 2018

(54) LARGE OUTBOARD MOTOR INCLUDING VARIABLE GEAR TRANSFER CASE

(71) Applicant: Seven Marine, LLC, Germantown, WI (US)

(72) Inventors: Eric A. Davis, Mequon, WI (US); Richard A. Davis, Mequon, WI (US)

(73) Assignee: Seven Marine, LLC, Germantown, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,508

(22) Filed: Aug. 20, 2015

(65) Prior Publication Data

US 2015/0353176 A1  Dec. 10, 2015

Related U.S. Application Data

(63) Continuation of application No. 13/861,918, filed on Apr. 12, 2013, now Pat. No. 9,126,666, and a
(Continued)

(51) Int. Cl.
*B63H 20/14* (2006.01)
*B63H 20/00* (2006.01)
(Continued)

(52) U.S. Cl.
CPC .......... *B63H 20/14* (2013.01); *B63H 20/002* (2013.01); *B63H 20/32* (2013.01); *F16H 57/031* (2013.01);
(Continued)

(58) Field of Classification Search
CPC ............................... B63H 20/02; B63H 20/28
See application file for complete search history.

(56) References Cited

U.S. PATENT DOCUMENTS

| 1,903,350 A | 4/1933 | Landrum |
|---|---|---|
| 2,722,193 A | 11/1955 | Brindley |

(Continued)

FOREIGN PATENT DOCUMENTS

| DE | 102007048058 A1 | 4/2009 |
|---|---|---|
| EP | 1775212 A2 | 4/2007 |

(Continued)

OTHER PUBLICATIONS

European Office Action for Application No. 11704394.3, dated May 21, 2015, 8 pages.
(Continued)

*Primary Examiner* — Stephen P Avila
(74) *Attorney, Agent, or Firm* — Husch Blackwell LLP

(57) ABSTRACT

An outboard motor for a marine vessel application, transmission devices for such an outboard motor, and related methods of making, operating, and modifying attributes of same, are disclosed herein. In at least one embodiment, the motor includes a horizontal-crankshaft engine in an upper portion of the motor, positioned substantially above a trimming axis of the motor. In at least another embodiment, first, second and third transmission devices are employed to transmit rotational power from the engine to propeller(s). In at least a further embodiment, the motor is made to include a rigid interior assembly formed by the engine, multiple transmission devices, and a further structural component. In further embodiments, the motor includes numerous cooling, exhaust, and/or oil system components, and/or other transmission features. In at least some additional embodiments, a transmission device of the motor is configured to facilitate gear ratio variation and/or includes an integrated oil pump.

26 Claims, 25 Drawing Sheets

Related U.S. Application Data continuation-in-part of application No. 13/831,070, filed on Mar. 14, 2013, now Pat. No. 9,126,665, which is a continuation of application No. 13/026,203, filed on Feb. 11, 2011, now Pat. No. 8,460,041.

(60) Provisional application No. 61/623,530, filed on Apr. 12, 2012, provisional application No. 61/303,518, filed on Feb. 11, 2010.

(51) Int. Cl.

| | | |
|---|---|---|
| *F16H 57/031* | (2012.01) | |
| *F16H 57/04* | (2010.01) | |
| *B63H 20/32* | (2006.01) | |
| *F16H 57/00* | (2012.01) | |
| *F16H 57/02* | (2012.01) | |

(52) U.S. Cl.
CPC ..... *F16H 57/0436* (2013.01); *F16H 57/0441* (2013.01); *B63H 2020/323* (2013.01); *F16H 2057/0075* (2013.01); *F16H 2057/02043* (2013.01)

(56) References Cited

U.S. PATENT DOCUMENTS

| | | | |
|---|---|---|---|
| 2,953,335 | A | 9/1960 | Kiekhaefer |
| 3,025,823 | A | 3/1962 | Tenney |
| 3,148,557 | A | 9/1964 | Chimanckas |
| 3,487,803 | A * | 1/1970 | Alexander, Jr. ........ B63H 21/28 440/75 |
| 3,707,939 | A | 1/1973 | Berg |
| 3,896,757 | A * | 7/1975 | Kucher ................ B63H 5/125 440/58 |
| 3,955,526 | A | 5/1976 | Kusche |
| 4,382,797 | A | 5/1983 | Blanchard |
| 4,408,994 | A | 10/1983 | Blanchard |
| 4,523,556 | A | 6/1985 | Suzuki |
| 4,559,018 | A | 12/1985 | Nakahama et al. |
| 4,600,395 | A | 7/1986 | Pichl |
| 4,600,396 | A | 7/1986 | Crane et al. |
| RE32,620 | E | 3/1988 | Iwai |
| 4,854,274 | A | 8/1989 | Dingess |
| 4,869,692 | A | 9/1989 | Newman |
| 4,887,983 | A | 12/1989 | Bankstahl et al. |
| 4,907,994 | A | 3/1990 | Jones |
| 4,925,413 | A | 5/1990 | Newman et al. |
| 4,992,066 | A | 2/1991 | Watson |
| 5,009,621 | A | 4/1991 | Bankstahl et al. |
| 5,084,596 | A | 1/1992 | Borsh et al. |
| 5,088,945 | A | 2/1992 | Onoue |
| 5,088,946 | A | 2/1992 | Nakayama |
| 5,108,325 | A | 4/1992 | Livingston et al. |
| 5,149,287 | A | 9/1992 | Koike |
| 5,178,566 | A | 1/1993 | Stojkov et al. |
| 5,190,488 | A | 3/1993 | Fujimoto |
| 5,215,486 | A | 6/1993 | Rizikow |
| 5,435,763 | A | 7/1995 | Pignata |
| 5,553,586 | A | 9/1996 | Koishikawa |
| 5,766,047 | A | 6/1998 | Alexander et al. |
| 5,766,048 | A | 6/1998 | Iwashita |
| 5,769,036 | A | 6/1998 | Takahashi |
| 5,879,210 | A | 3/1999 | Goto et al. |
| 5,911,211 | A | 6/1999 | Uchida |
| 5,938,490 | A | 8/1999 | Rodler |
| 5,961,358 | A | 10/1999 | Hardesty et al. |
| 5,997,372 | A | 12/1999 | Idzikowski et al. |
| 6,146,223 | A | 11/2000 | Karls et al. |
| 6,206,739 | B1 | 3/2001 | Dadd et al. |
| 6,390,866 | B1 | 5/2002 | Nystrom |
| 6,478,641 | B2 | 11/2002 | Jordan |
| 6,513,463 | B2 | 2/2003 | Katayama |
| 6,561,860 | B2 | 5/2003 | Colyvas |
| 6,814,635 | B1 | 11/2004 | Okabe |
| 6,884,131 | B2 | 4/2005 | Katayama et al. |
| 6,910,987 | B2 | 6/2005 | Richards |
| 7,001,231 | B1 | 2/2006 | Halley et al. |
| 7,052,340 | B1 | 5/2006 | Broussard |
| 7,297,035 | B2 | 11/2007 | Broussard |
| 7,311,571 | B1 | 12/2007 | Swan et al. |
| 7,441,528 | B2 | 10/2008 | Osakabe |
| 7,497,750 | B2 | 3/2009 | Nakata et al. |
| 7,942,138 | B1 | 5/2011 | Belter et al. |
| 8,079,886 | B2 | 12/2011 | Fukuoka |
| 8,460,041 | B2 | 6/2013 | Davis et al. |
| 9,126,665 | B2 | 9/2015 | Davis et al. |
| 9,126,666 | B2 * | 9/2015 | Davis ................ B63H 20/14 |
| 9,132,666 | B2 | 9/2015 | Davis et al. |
| 9,132,899 | B2 | 9/2015 | Davis et al. |
| 9,227,711 | B2 | 1/2016 | Davis et al. |
| 9,227,712 | B2 | 1/2016 | Davis et al. |
| 9,365,273 | B2 | 6/2016 | Davis et al. |
| 2001/0039908 | A1 | 11/2001 | Bilek et al. |
| 2002/0034900 | A1 | 3/2002 | Kato |
| 2003/0036320 | A1 | 2/2003 | Matsuda |
| 2003/0224671 | A1 | 12/2003 | Katayama et al. |
| 2004/0014375 | A1 | 1/2004 | Okabe |
| 2006/0052014 | A1 | 3/2006 | Kobayashi |
| 2006/0172630 | A1 | 8/2006 | Kawamoto |
| 2007/0240666 | A1 | 10/2007 | Osakabe |
| 2008/0023923 | A1 * | 1/2008 | Kameyama ........ F16J 15/0825 277/595 |
| 2009/0130928 | A1 | 5/2009 | Taylor et al. |
| 2009/0173185 | A1 | 7/2009 | Okabe et al. |
| 2009/0203271 | A1 | 8/2009 | Okabe et al. |
| 2009/0298361 | A1 * | 12/2009 | Nakamura ............ B63H 20/20 440/75 |
| 2011/0195620 | A1 | 8/2011 | Davis et al. |
| 2013/0273792 | A1 | 10/2013 | Davis et al. |
| 2015/0353177 | A1 | 12/2015 | Flodman et al. |
| 2016/0023734 | A1 | 1/2016 | Davis et al. |
| 2016/0023735 | A1 | 1/2016 | Davis et al. |
| 2016/0023736 | A1 | 1/2016 | Davis et al. |
| 2016/0023741 | A1 | 1/2016 | Davis et al. |
| 2016/0129981 | A1 | 5/2016 | Davis et al. |

FOREIGN PATENT DOCUMENTS

| | | |
|---|---|---|
| EP | 1777154 A2 | 4/2007 |
| FR | 2939403 A1 | 6/2010 |
| JP | S58-192199 U | 12/1983 |
| JP | S61-055000 U | 4/1986 |
| JP | H05-77547 U | 10/1993 |
| JP | 07-149291 | 6/1995 |
| JP | 09-066892 | 3/1997 |
| JP | 2009-309497 A | 12/1997 |
| JP | H10196397 A | 7/1998 |
| JP | 2000211586 A | 8/2000 |
| JP | 2001263062 A | 9/2001 |
| JP | 2003206954 A | 7/2003 |
| JP | 09-137444 | 6/2009 |
| JP | 2009156095 A | 7/2009 |
| JP | 2009161054 A | 7/2009 |
| JP | 2009166534 A | 7/2009 |
| WO | 91/19643 A1 | 12/1991 |
| WO | 2009/075623 A1 | 6/2009 |
| WO | 2011/100631 A1 | 8/2011 |
| WO | 2011/100641 A1 | 8/2011 |
| WO | 2014/127035 A1 | 8/2014 |

OTHER PUBLICATIONS

Chinese Office Action for Application No. 201180018386.3, dated Jun. 30, 2015, with English translation, 7 pages.
Notice of Allowance for Japanese Application No. 2012-553062, dated Sep. 29, 2015, 4 pages.
Australian Office Action for Application No. 2011215586, dated Feb. 3, 2016, 7 pages.
European Office Action for Application No. 11704394.3 dated Mar. 30, 2016 (4 pages).
International Search Report and Written Opinion for international application No. PCT/US2011/024660, dated Jul. 25, 2011, 12 pages.

(56) References Cited

OTHER PUBLICATIONS

International Search Report and Written Opinion for international application No. PCT/US2011/024648, dated Aug. 1, 2011, 11 pages.
International Search Report for international application No. PCT/US2014/016089, dated May 16, 2014, 5 pages.
EP Communication for application No. 11704394.3 dated Sep. 18, 2012, 2 pages.
Response to EP communication for application 11704394.3 dated Jan. 29, 2014, 30 pages.
Patent Examination Report No. 1 for Australian patent application No. 2011215586 dated Jun. 30, 2014, 4 pages.
Chinese office action for application No. 201180018386.3 dated Oct. 30, 2014, 12 pages.
Japanese office action for application No. 2012-553062 dated Dec. 17, 2014 with English translation, 10 pages.
Wikipedia Eccentric (mechanism) page, 2 pages, printed on Feb. 13, 2013.
How stuff works "How Car Cooling Systems Work", printed on Feb. 13, 2013, 3 pages.
Wikipedia Pump page, 17 pages, printed on Feb. 13, 2013.
Seven Marine 557 Outboard Update, Boats.com Blog from Apr. 16, 2011, retrieved from url: http://ww.boats.com/blog/2011/04/seven-marine-557-outboard-update/, printed Apr. 19, 2011, 6 pages.
Non Final Office Action for U.S. Appl. No. 13/861,918, dated Jan. 5, 2015, 5 pages.
Non Final Office Action for U.S. Appl. No. 13/843,722, dated Jun. 16, 2014, 6 pages.
Non Final Office Action for U.S. Appl. No. 13/831,070, dated Sep. 10, 2014, 5 pages.
Non Final Office Action for U.S. Appl. No. 13/801,951, dated Sep. 11, 2014, 6 pages.
Non Final Office Action for U.S. Appl. No. 13/801,986, dated Nov. 19, 2014, 6 pages.
Non Final Office Action for U.S. Appl. No. 13/802,171, dated Nov. 28, 2014, 7 pages.
Outboard motor, Wikipedia, https://en.wikipedia.org/wiki/Outboard_motor, printed Feb. 3, 2016, pp. 1-9.
50 years Honda Marine, http://marine.honda.com/au/50 years, 2014, printed Mar. 21, 2017, pp. 1-2.
Honda Boat Engine, Model GB-30 manual, date unknown, pp. 3-35, It is believed that this was publically available as of Jan. 2010.
Australian Office Action Response for application No. 2011215586, dated Jan. 27, 2016, 23 pages.
EP Communication Response for application No. 11704394.3, dated Nov. 19, 2015, 6 pages.
EP Communication Response for application No. 11704394.3, dated Jan. 13, 2017, 12 pages.
EP Communication for application No. 14707559.2, dated Sep. 22, 2015, 2 pages.
EP Communication for application No. 14707559.2, dated Jul. 8, 2016, 3 pages.
Japanese Office Action for application No. 2015-229278, dated Sep. 6, 2016, English Translation, 3 pages.
Non Final Office Action Report for U.S. Appl. No. 13/802,171, dated May 20, 2015, 23 pages.
Non Final Office Action Response for U.S. Appl. No. 13/831,070, dated Mar. 9, 2015, 12 pages.
Non Final Office Action for U.S. Appl. No. 13/843,722, dated Jun. 19, 2013, 7 pages.
Non Final Office Action Response for U.S. Appl. No. 13/843,722, dated Oct. 21, 2013, 20 pages.
Final Office Action for U.S. Appl. No. 13/843,722, dated Dec. 5, 2013, 8 pages.
Final Office Action Response for U.S. Appl. No. 13/843,722, dated Jun. 5, 2014, 20 pages.
Final Office Action Response for U.S. Appl. No. 13/843,722, dated Dec. 15, 2014, 16 pages.
Office Action for U.S. Appl. No. 13/026,203, dated Jul. 27, 2012, 6 pages.
Non Final Office Action Response for U.S. Appl. No. 13/026,203, dated Jan. 22, 2013, 12 pages.
Final Office Action for U.S. Appl. No. 13/802,171, dated Jul. 7, 2015, 8 pages.
Final Office Action Response for U.S. Appl. No. 13/802,171, dated Dec. 7, 2015, 11 pages.
Non Final Office Action Response for U.S. Appl. No. 13/801,986, dated Apr. 20, 2015, 12 pages.
Non Final Office Action Response for U.S. Appl. No. 13/861,918, dated Jul. 1, 2015, 10 pages.
Final Office Action for U.S. Appl. No. 14/831,608, dated Mar. 22, 2017, 5 pages.
Non Final Office Action for U.S. Appl. No. 14/831,558, dated Aug. 23, 2016, 5 pages.
Non Final Office Action for U.S. Appl. No. 14/831,584, dated Aug. 24, 2016, 4 pages.
Non Final Office Action for U.S. Appl. No. 14/831,634, dated Aug. 23, 2016, 6 pages.
Non Final Office Action for U.S. Appl. No. 14/962,891, dated Nov. 2, 2016, 8 pages.
Notice of Rejection for Japanese Application No. 2017/041325 dated Apr. 25, 2018 with English Translation.

* cited by examiner

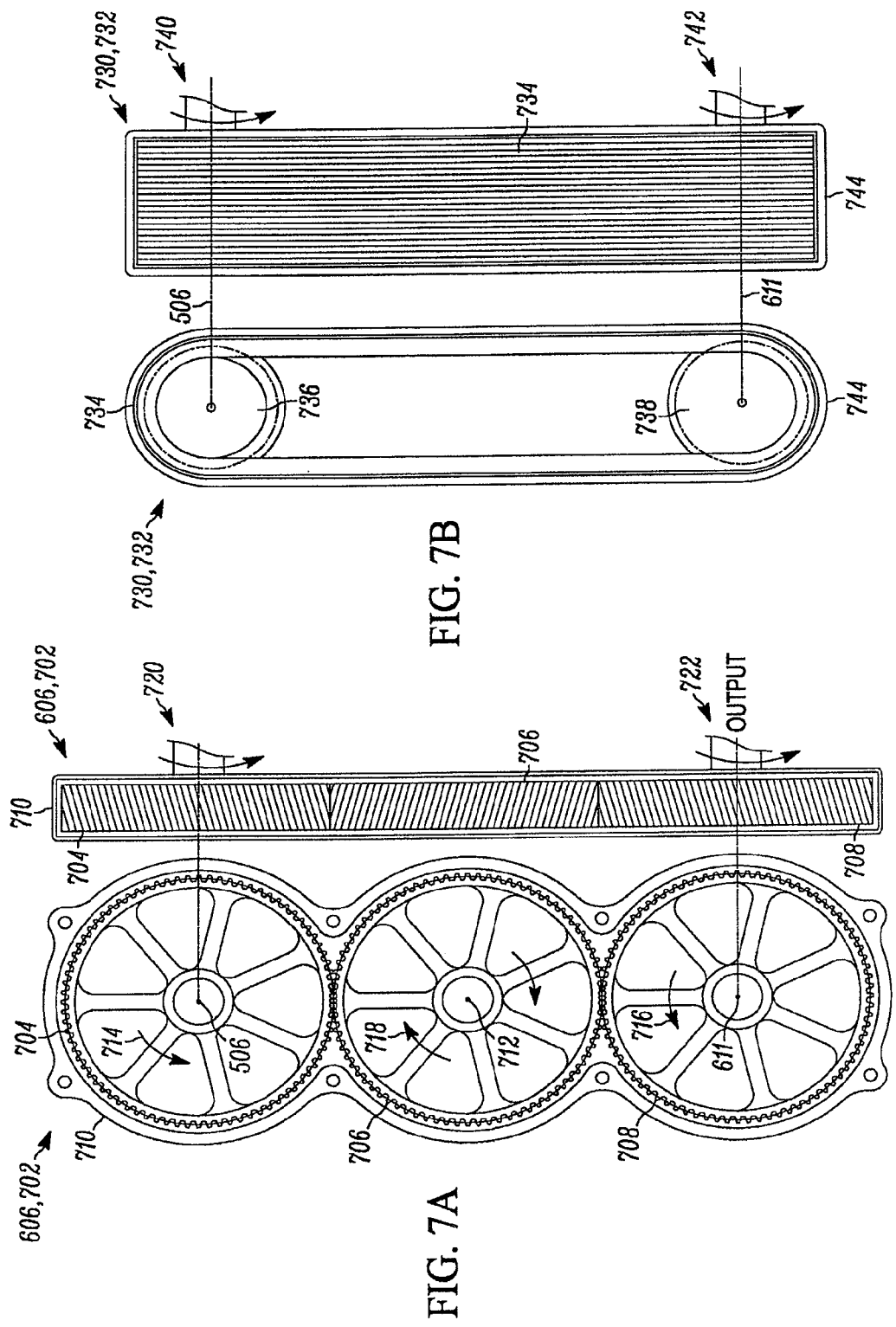

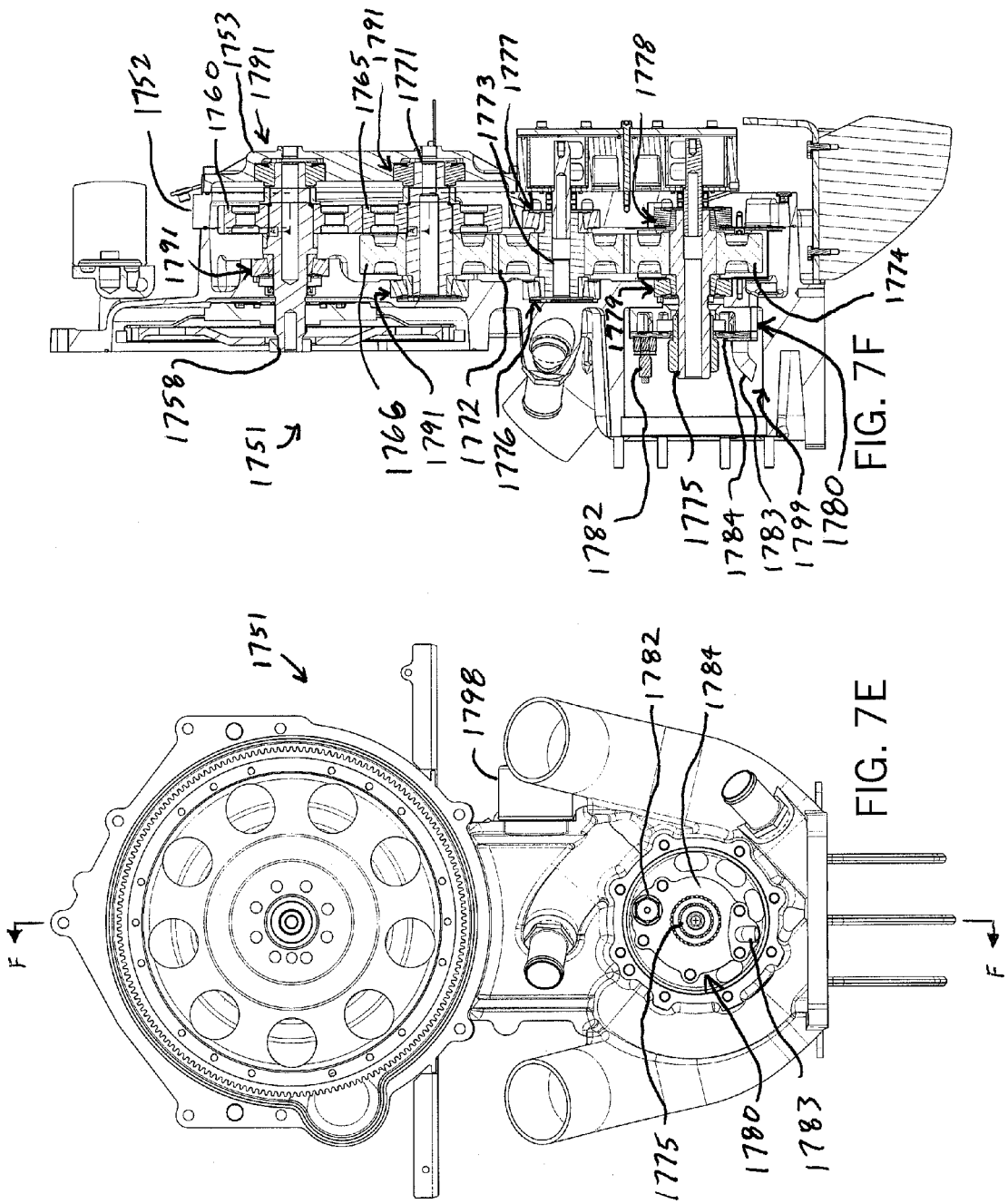

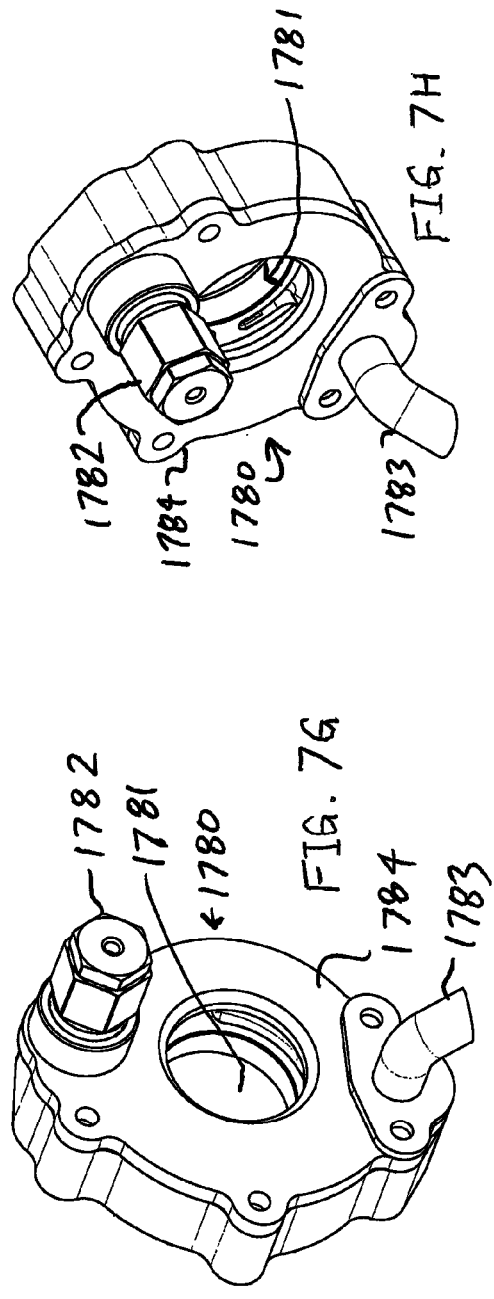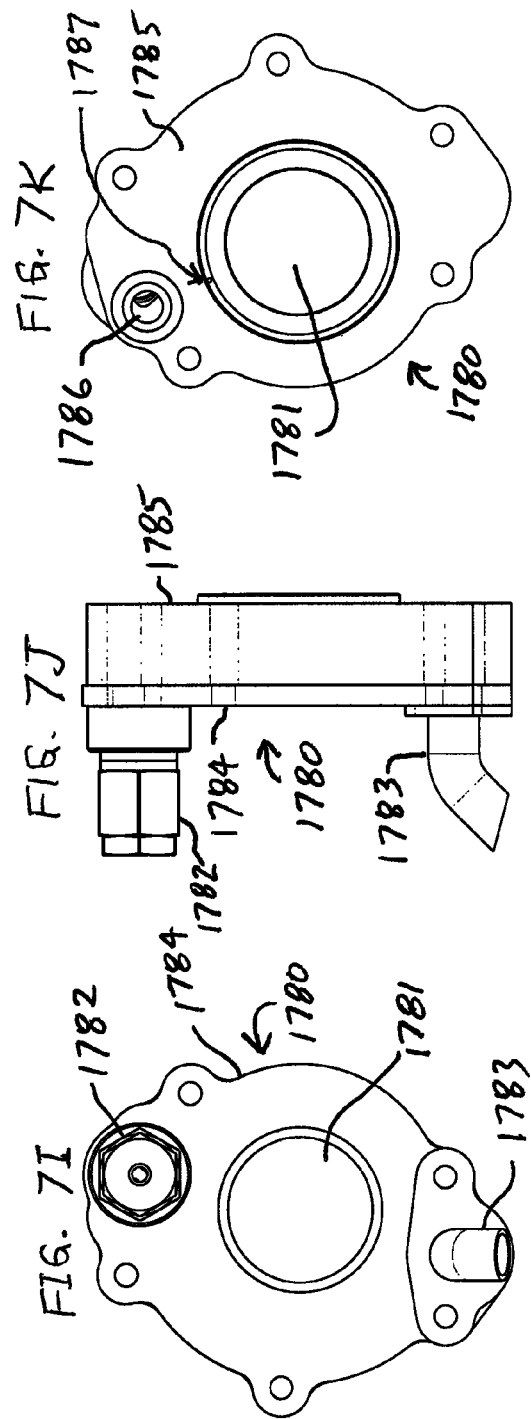

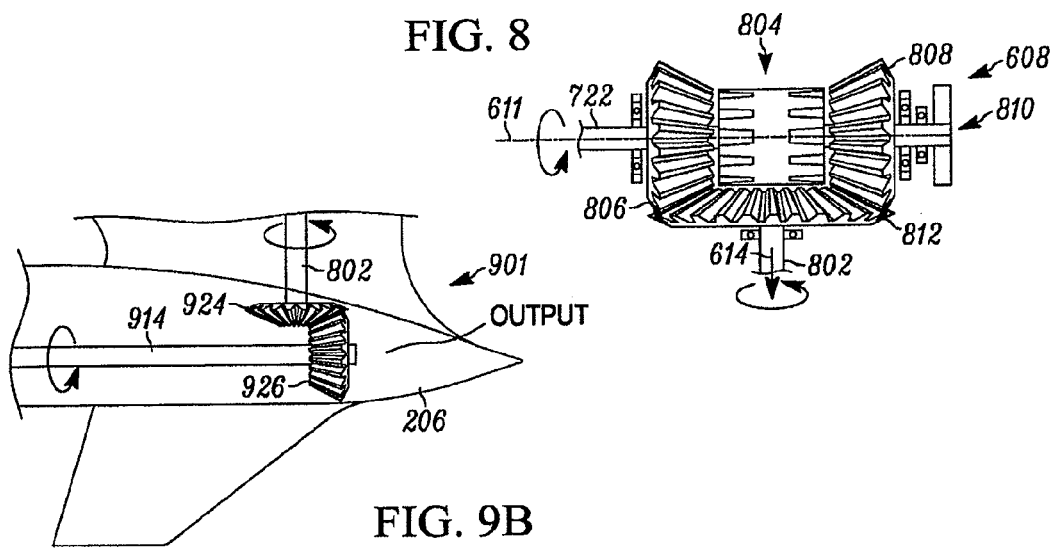
FIG. 8
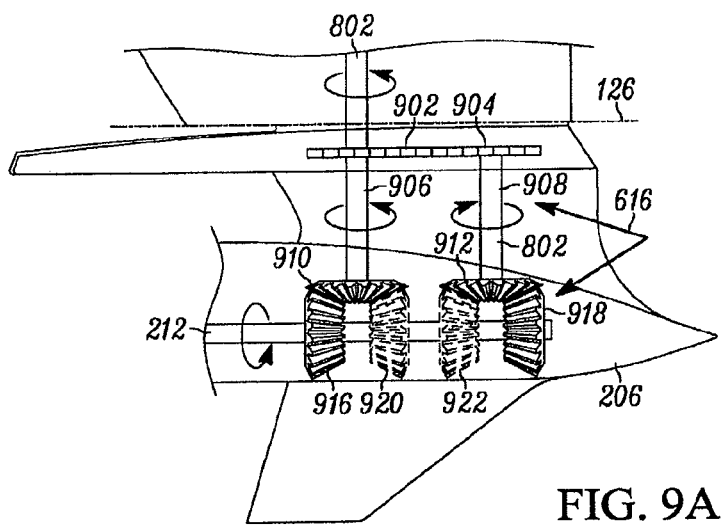
FIG. 9B
FIG. 9A
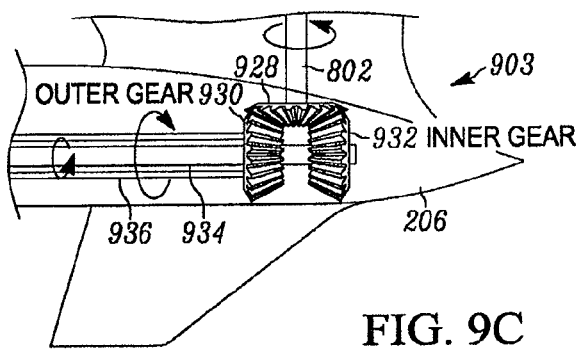
FIG. 9C

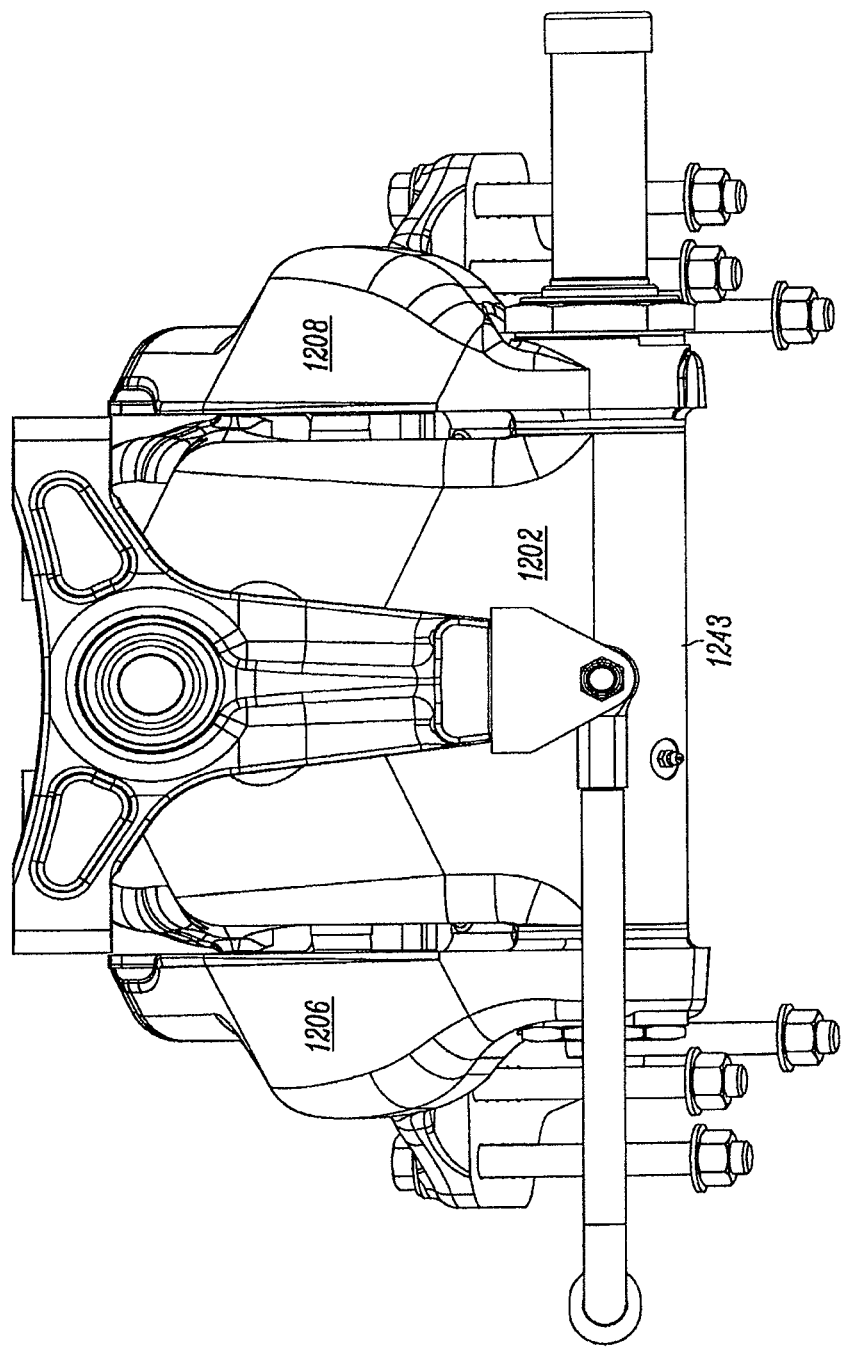

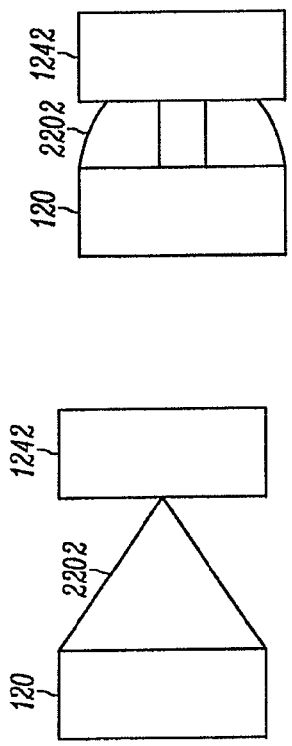
FIG. 23A
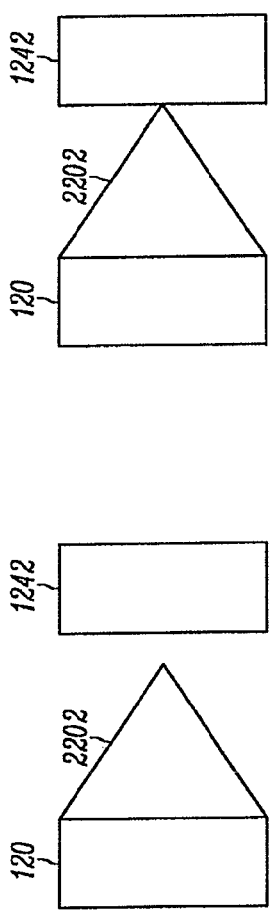
FIG. 23B
FIG. 23C
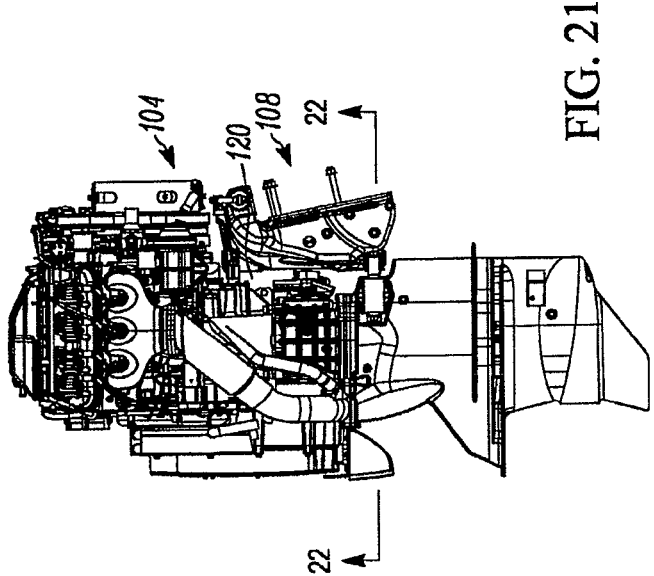
FIG. 21
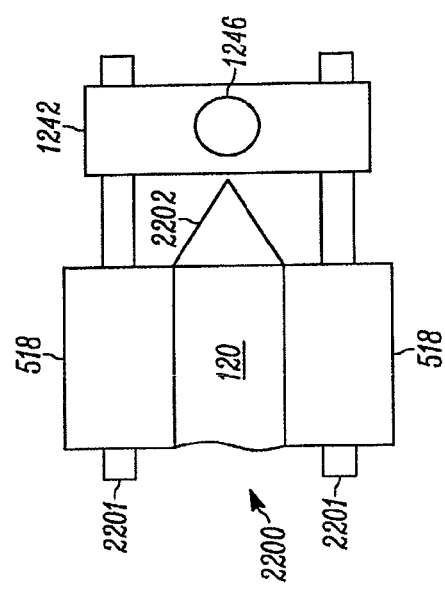
FIG. 22

LARGE OUTBOARD MOTOR INCLUDING VARIABLE GEAR TRANSFER CASE

CROSS-REFERENCE TO RELATED APPLICATIONS

The present application claims the benefit of U.S. provisional patent application No. 61/623,530 filed on Apr. 12, 2012 and entitled "Large Outboard Motor Including Variable Gear Transfer Case", which is hereby incorporated by reference herein.

STATEMENT REGARDING FEDERALLY SPONSORED RESEARCH OR DEVELOPMENT

--

FIELD OF THE INVENTION

The present invention relates to marine propulsion systems and/or related methods of making and/or operating such systems, and more particularly to outboard motors used as marine propulsion systems, alone and/or in combination with marine vessels with respect to which those motors are implemented, and/or methods of making and/or operating same.

BACKGROUND OF THE INVENTION

There exist currently many types of motorized or engine-driven propulsion systems for boats and other marine vehicles or vessels (collectively referred to herein generally as "marine vessels"). An inboard engine marine propulsion system for example typically involves an engine that is situated (and supported) within the body (or hull) of the marine vessel and that drives a crankshaft that in turn, by way of one or more connections, drives one or more propellers situated along the exterior of the hull of the marine vessel (often at the rear of the vessel). In such a design, the connections between the propellers and the engine are all situated within the hull of the marine vessel, and the propellers are typically fixed in their axial orientation relative to the hull. An additional form of marine propulsion system that can be considered a variant of the inboard engine marine propulsion system is a "jet boat" marine propulsion system, where instead of employing propellers along the exterior of the marine vessel, water rather is drawn into tunnel(s) extending through hull and then pumped outward from those tunnels to propel the vessel.

Further for example, a pod-type marine propulsion system also employs power provided by an engine situated internally within the body (hull) of the marine vessel. However, rather than having propeller(s) axially fixed in relation to the hull, the propeller(s) in such a system are mounted on a pod structure extending downward beneath the hull, and power is transmitted from the engine within the hull down beneath the hull through the pod structure and ultimately to the propeller(s) located thereon. Because a pod structure employed in a marine vessel having a pod-type marine propulsion system is typically rotatable about a steering (vertical or substantially-vertical) axis of the marine vessel, such a marine vessel employing a pod-type marine propulsion system typically has enhanced maneuverability relative to marine vessels employing standard inboard engine marine propulsion systems with axially-fixed propellers.

While all of the above-described types of marine propulsion systems have their merits and are well-suited for respective marine vessel applications, each of those systems can be disadvantageous in certain respects. In particular, in such systems, typically a number of components such as the propeller(s) remain continually in the water even when the marine vessel is not in active use. Consequently, such systems often utilize expensive components that are designed to withstand near-constant exposure to water. Relatedly, some components of such systems can be difficult to service due to their being within the water or otherwise difficult to access.

Further, such systems typically are lacking in maneuverability to some extent. As already discussed, standard inboard engine marine propulsion systems with axially-fixed propellers typically allow for less maneuverable than pod-type marine propulsion system in terms of steering maneuverability, particularly since axially-fixed propellers do not generally allow for adjustments in the direction of thrust about a steering (vertical or substantially-vertical) axis of the marine vessel. Yet all of these conventional systems are further lacking in terms of the ability to adjust the thrust direction up or down about an additional trimming axis that can be understood as a horizontal (or substantially horizontal) axis perpendicular to both the steering (vertical or substantially vertical) axis of the marine vessel and the front-to-rear (bow-to-stern) axis of the marine vessel. This can be problematic particularly for marine vessels that vary considerably in their speeds. Many marine vessel hulls are designed so that, as the marine vessel varies in speed, the angle of attack of the hull (that is, an inclination of the hull) relative to the water line changes. In such marine vessels, to the extent that the propulsion systems fail to allow for thrust adjustments about the trimming axes of the marine vessels, the effectiveness of the propulsion systems in propelling the marine vessels forward through the water varies and can decline depending upon the marine vessels' speeds and changing angles of attack.

A further variant of marine propulsion system that can address some of these problems is the sterndrive marine propulsion system. In such a system, like those already described, an engine is supported within the body (hull) of the marine vessel. However, rather than employing fixed propeller(s) or pump(s) or the above-discussed steerable pod of a pod-type marine propulsion system, an additional outboard assembly including one or more propellers is mounted at (so as to extend from) the stern of the marine vessel. Thus, the driving apparatus of the marine vessel is separated into two primary parts, the engine within the hull of the vessel and the additional outboard assembly with the propeller(s) and associated componentry.

In such a sterndrive marine propulsion system, although the outboard assembly is connected by way of one or more linkages to the output of the engine so that rotational power from the engine can be received at the outboard assembly and ultimately communicated to the propeller(s) of the outboard assembly, the outboard assembly is mounted to the marine vessel in a rotatable manner such that the outboard assembly can not only be steered relative to the marine vessel about a steering axis but also can be rotated about a trimming axis (again substantially perpendicular to both the steering axis and the front-to-rear axis of the marine vessel, where substantially perpendicular can occur, for example, when at zero trim). By virtue of this, the sterndrive marine propulsion system not only allows for good steering maneuverability but also allows for adjustment of the thrust direction about the trimming axis so as to enhance the effectiveness of the propulsion system in driving the marine vessel. Further, rotation of the outboard assembly about the trimming axis can allow for removal of the propeller(s) out of the water when not being used, such that those components need not be designed to withstand as much wear-and-tear from exposure to the elements, and also are easier to access for servicing.

Although sterndrive marine propulsion systems can be advantageous in the above respects, such marine propulsion systems along with the other inboard engine marine propulsion systems already discussed share in common the disadvantage that, by situating the engine within the hull of the marine vessel, valuable space within the main body of the marine vessel is taken up. This is often disadvantageous since space within a marine vessel is often at a premium and would preferably be utilized for other purposes such as for cabin space, storage, etc. Further, the effectiveness of a propulsion system in propelling a marine vessel forward can often be enhanced if the marine vessel's angle of attack is inclined as the marine vessel planes through the water. Yet placement of an engine of a marine vessel within the hull of the vessel, as is the case in all of the aforementioned types of marine propulsion systems, tends to counteract this effect. This is because the engine is often the heaviest, or one of the heaviest, portions of a marine vessel, and consequently placement of the engine within the hull tends to reduce the marine vessel's angle of attack (or work against further increases in that angle of attack).

Yet a further type of marine propulsion system, namely, the outboard motor marine propulsion system, addresses some of the aforementioned disadvantages. Like sterndrive marine propulsion systems, outboard motor marine propulsion systems include an outboard assembly that is rotatably mounted at the stern of the marine vessel with which it is associated in a manner such that the outboard assembly can be rotated both about a steering axis and a trimming axis. Thus, outboard motor marine propulsion systems not only offer maneuverability in terms of steering but also offer the advantages described above with respect to sterndrive marine propulsion systems in terms of achieving enhanced propelling of the boat notwithstanding changes in the angle of attack of the marine vessel, reducing the need for specialized components capable of withstanding the elements, and facilitating servicing.

Additionally, in contrast with sterndrive marine propulsion systems, the motor or engine of an outboard motor marine propulsion system is also located on the outboard assembly itself rather than within the hull of the marine vessel. Such placement of the engine allows for the aforementioned disadvantages associated with inboard engine placement to be overcome. In particular, valuable space within the hull no longer needs to be allocated to the engine, thus freeing up that space for other uses. Also, since the weight of the engine is placed at (so as to extend behind) the stern of the marine vessel as part of the outboard assembly, the angle of attack of the marine vessel tends to be further increased rather than diminished by the engine placement, thus resulting in better powering of the marine vessel.

Outboard motor marine propulsion systems also allow for additional advantages to be achieved as well. For example, for various reasons, the engines employed in outboard motor marine propulsion systems often can be more efficient in design and lower in weight than inboard engines providing the same amount of drive power. Additionally, because the engine/motor is integrated within the outboard assembly in an outboard motor marine propulsion system such systems tend to be robust, and removal of the entire (or substantially the entire) driving apparatus of the marine vessel can be easily achieved to not only facilitate servicing of the components of that driving apparatus but also facilitate transporting of the driving apparatus (as well as the marine vessel, either in combination with the driving apparatus or separate therefrom), storage of the driving apparatus, and replacement of the driving apparatus with another driving apparatus.

Given the above advantages associated with outboard motor marine propulsion systems, in many respects these propulsion systems are the most effective marine propulsion systems available for a wide variety of marine vessel applications. Even so, conventional outboard motor marine propulsion systems are disadvantageous in one or more respects. Above all, there exists an ongoing demand for larger and more powerful marine vessel propulsion systems, so as to increase the speed and agility of marine vessels and the ease of use and excitement associated with operating marine vessels. This demand is further heightened by the growth in size and weight of marine vessels themselves, particularly yachts and other pleasure craft. Yet conventional outboard motors are limited in terms of the power that the motors can generate and deliver to the propeller(s) of the outboard motors for driving marine vessels. Indeed conventional outboard motors have topped out, in terms of the maximum power output from a single motor, at around 350 horsepower, and improvements in power output to get to even that level have been difficult to achieve.

Although in some marine vessel applications these problems have been at least partly overcome by mounting multiple (often, for example, three or four) outboard motors on a single marine vessel so as to achieve a larger combined power, such efforts have only met with limited success. Not only can the implementation and control of multiple outboard motors be a costly and complicated, but also the use of multiple outboard motors is a rather inefficient manner of achieving higher power for a marine vessel. While each additional outboard motor added to a marine vessel increases the overall driving power available for the marine vessel, the amount of increased driving power is not as large as might be hoped for because, in addition to outputting power, each additional outboard motor also increases the drag affecting movement of the marine vessel due to the interaction between that assembly and the water into which that assembly descends.

For at least these reasons, therefore, it would be advantageous if an additional new or improved marine propulsion system could be developed that, in at least some embodiments, would achieve one or more of the above-described advantages associated with existing outboard motor marine propulsion systems and yet also would overcome entirely, or to a significant degree, the aforementioned disadvantages associated with the use of conventional outboard motors, and/or would achieve one or more other advantages. Among other things, it would be desirable if a new or improved outboard motor marine propulsion system could be developed that, in at least some embodiments, allowed for the output of substantially greater power levels than conventional outboard motor marine propulsion systems, or otherwise allowed for one or more enhanced manners of operation or implementation of an outboard motor marine propulsion system.

BRIEF SUMMARY OF THE INVENTION

The present inventors have recognized that vertical crankshaft engines, which are naturally suited for outboard motor applications insofar as the crankshafts naturally are configured to deliver rotational power downward from the engines to the propellers situated at the bottoms of the outboard motors for interaction with the water, nevertheless impose serious limits on the development of higher power systems, because the development of vertical crankshaft engines capable of achieving substantial increases in power output in outboard motor marine propulsion systems has proven to be very time-consuming, complicated, and costly. Additionally, the present inventors have recognized that it is possible to implement horizontal crankshaft engines in outboard motor marine propulsion systems, and that the use of horizontal crankshaft engines opens up the possibility of using a wide variety of high quality, relatively inexpensive engines (including, for example, many automotive engines) in outboard motor marine propulsion systems that can yield dramatic improvements in the levels of power output by outboard motor marine propulsion systems as well as one or more other types of improvements as well.

Relatedly, the present inventors have recognized one or more features that, depending upon the embodiment, can be employed in the design of outboard motor marine propulsion systems utilizing horizontal crankshaft engines that can enhance the performance of such systems and allow for more streamlined, more efficient, and otherwise more effective integration of horizontal crankshaft engines in relation to other system components. For example, in some embodiments, a three-part transmission (including, further for example, a forward-neutral-reverse transmission) can be utilized so as to deliver and allow for the delivery of rotational power from the engine to the propeller(s). Also for example, in some embodiments, exhaust from the engine can be delivered by way of exhaust conduit(s) to the gear assembly and out a rear hub proximate a propeller of the assembly. Further for example, in at least some embodiments, some of the water within which the marine vessel is situated can be utilized for cooling of gear portions and/or for cooling the engine itself, via a heat exchanger. Also for example, the mounting system by which the outboard motor is attached to the marine vessel itself can have one or more particular attributes that reflect, and take advantage of, the use of a horizontal crankshaft engine.

Further, the present inventors have recognized that a variety of implementations and embodiments of transmission devices can be implemented in one or more such outboard motors. For example, transmission devices can be employed in which one or more internal power train components such as one or more gears can be accessed and replaced so as to modify operational parameter(s) of the transmission devices, for example, a gear ratio of a transmission device. This can be achieved, in at least some embodiments for example, by providing a cover portion on the transmission device that can be removed to allow access of the one or more internal power train components. Further, in some such transmission devices, an oil pump can be integrated with the transmission device and particularly mounted upon a rotating shaft associated with the transmission device such that, when the transmission is operating such that the rotating shaft is experiencing rotation, the oil pump pressurizes and outputs oil for use by any one or more of a variety of components that can benefit from such oil.

Notwithstanding the above comments, it should be understood that, depending upon the embodiment, one or more of these types of features can be present and/or one or more of these various features need not be present. Further, the present inventors have additionally realized that one or more of these features can potentially be advantageously implemented in embodiments of outboard motor marine propulsion systems even though other(s) of these features are not present, and even potentially where other types of engines other than horizontal crankshaft engines are being utilized (or even possibly in some sterndrive or other marine propulsion systems where the engine is not integrated with the outboard assembly).

More particularly, in at least some embodiments, the present invention relates to an outboard motor configured to be mounted on a marine vessel. The outboard motor includes a housing including an upper portion and a lower portion, where at least one output shaft extends outward from the lower portion upon which at least one propeller is supported, and an engine configured to provide first torque at a first shaft extending outward from the engine, the engine being substantially situated within the housing. The outboard motor further includes a first transmission device that is in communication with the first shaft so as to receive the output torque and configured to cause second torque including at least some of the first torque to be communicated to a first location beneath the engine, a second transmission device configured to receive the second torque and to cause third torque including at least some of the second torque to be communicated to a second location beneath the first location within or proximate to the lower portion, and a third transmission device positioned within or proximate to the lower portion that is configured to receive the third torque and cause at least some at least some of the third torque to be provided to the at least one output shaft.

Additionally, in at least some embodiments, the present invention relates to a method of operating an outboard engine. The method includes providing first torque from the engine at a first shaft extending aftward from the engine, and causing second torque including at least some of the first torque to be provided to a first location below the engine at least in part by way of a first transmission device. The method further includes causing third torque including at least some of the second torque to be provided to a second location below the first location at least in part by way of a second transmission device, and causing fourth torque including at least some of the third torque to be provided to a propeller supported in relation to a torpedo portion of the outboard engine.

Further, in at least some embodiments, the present invention relates to an outboard motor configured to be mounted on a marine vessel. The outboard motor includes a housing including an upper portion and a lower portion, where at least one output shaft extends outward from the lower portion upon which at least one propeller is supported, and an engine configured to provide first torque at a first shaft extending outward from the engine, the engine being substantially situated within the housing. The outboard motor further includes a first transmission device that is in communication with the first shaft so as to receive the first torque and configured to cause second torque including at least some of the first torque to be communicated to a first location beneath the engine, and at least one additional transmission device configured to receive the second torque and to cause third torque including at least some of the second torque to be communicated at least indirectly to the at least one output shaft. The first transmission device additionally includes a plurality of power train components including a plurality of gears, a primary housing structure within which the power train components are supported and also including an access orifice, and a cover structure configured to cover over the access orifice when attached to the primary housing structure. The first transmission device is configured so that, when the cover structure is removed from the primary housing structure, one or more of the power train components are accessible by way of the access orifice, whereby accessing and modification of one or more of the power train components is facilitated so as to facilitate modification of a gear ratio of the first transmission device.

Additionally, in at least some embodiments, the present invention relates to a method of modifying a gear ratio of a first transmission device on an outboard motor. The method includes removing a cover from a primary housing of the first transmission device so as to reveal power train components supported within the primary housing, the power train components including first and second gears, removing first and second fastening components by which the first and second gears are respectively affixed to first and second shafts respectively extending within the first transmission device, and removing the first and second gears from the first transmission device via an orifice within the primary housing. The method additionally includes providing third and fourth gears respectively as replacements for the first and second gears, respectively, affixing the third and fourth gears with respect to the first and second shafts, and attaching the cover to the primary housing.

Further, in at least some embodiments, the present invention relates to a transmission device for implementation in an outboard motor configured to be mounted on a marine vessel. The transmission device includes a plurality of power train components including a plurality of gears and a plurality of shafts, the plurality of shafts including an input shaft and an output shaft, where the power train components are arranged so that input rotation of the input shaft results in output rotation of the output shaft. The transmission device also includes a primary housing portion within which the plurality of power train components are at least partly positioned, and a secondary housing portion that is configured to be affixable to and removable from the primary housing portion, where the primary housing portion and the secondary housing portion are configured so that the secondary housing when affixed to the primary housing covers over an opening with the secondary housing portion. The transmission device further includes an oil pump that is formed as part of the transmission device, wherein the transmission device with the oil pump is configured so that the oil pump is driven to pressurize and output oil when the transmission device is operating to communicate rotational power.

Again, although the above discussion is intended to provide some examples of embodiments and features encompassed herein, it is not intended that the present invention be limited to any one or more of these examples, but rather it is intended that the present invention can encompass numerous embodiments and/or features in addition to, varying from, and/or other than those discussed above, including but not limited to embodiments and/or features in which one or more of the embodiments or features discussed above are not present. Notwithstanding the above, in other embodiments, numerous other features, characteristics, assemblies, combinations, methods and other aspects can be provided.

BRIEF DESCRIPTION OF THE DRAWINGS

FIGS. 7A and 7B are schematic diagrams showing in more detail two example embodiments of a first transmission of the outboard motor of FIG. 6A;

FIG. 7E is a front elevation view of a further alternate embodiment of a first transmission (transfer case) of the outboard motor of FIG. 6A that is configured to allow for gear ratio variation and that also includes an integrated oil pump;

FIG. 7F is a cross-sectional view of the further alternate embodiment of the first transmission (transfer case) shown in FIG. 7E, taken along line F-F of FIG. 7E;

FIGS. 7G, 7H, 7I, 7J, and 7K respectively are left side perspective, right side perspective, rear elevation, right side, and front elevation views of the oil pump that is integrated in the further alternate embodiment of the first transmission (transfer case) of FIGS. 7E and 7F;

FIG. 8 is a schematic diagram showing in more detail an example embodiment of a second transmission of the outboard motor of FIG. 6A.

FIGS. 9A-9C are schematic diagrams showing in more detail three example embodiments of a third transmission of the outboard motor of FIG. 6A (or a modified version thereof having two counterrotating propellers);

FIG. 16 is an enlarged top view of the mounting system of FIG. 12;

FIG. 21 is a reduced right side view of the outboard motor and a mounting system for mounting the outboard motor to a marine vessel;

FIG. 22 is a schematic cross sectional view, taken along line 22-22 of FIG. 21, showing a progressive mounting assembly;

FIGS. 23A-C are schematic illustrations depicting a portion of the progressive mounting structure of FIG. 21 in operation.

DETAILED DESCRIPTION OF THE PREFERRED EMBODIMENT

Figure 1:
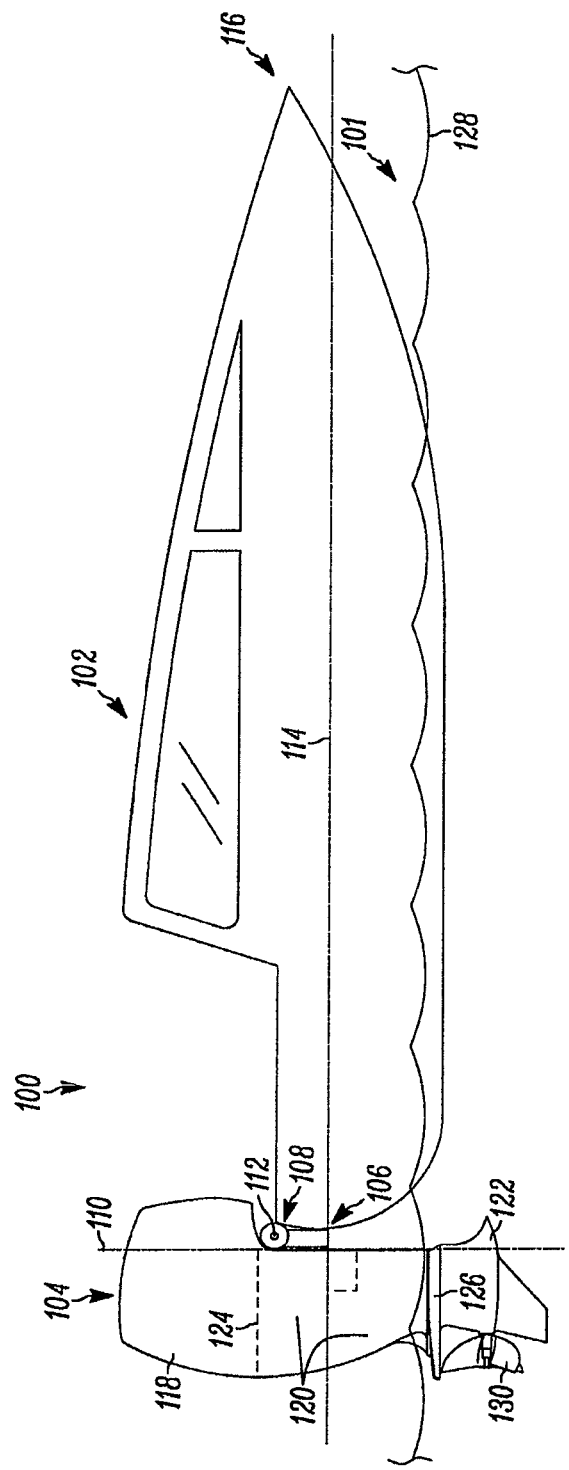
FIG. 1 is a schematic view of an example marine vessel assembly including an example outboard motor.

Referring to FIG. 1, an example marine vessel assembly 100 is shown to be floating in water 101 (shown in cut-away) that includes, in addition to an example marine vessel 102, an example outboard motor marine propulsion system 104, which for simplicity is referred to below more simply as an outboard motor 104. As shown, the outboard motor 104 is coupled to a stern (rear) edge or transom 106 of the marine vessel 102 by way of a mounting system 108, which is described in further detail below. Also described below, the mounting system 108 will be considered, for purposes of the present discussion, to be part of the outboard motor 104 although one or more components of the mounting system can technically be assembled directly to the stern edge (transom) 106 and thus could also be viewed as constituting part of the marine vessel 102 itself. In the present embodiment shown, the marine vessel 102 is shown to be a speed boat although, depending upon the embodiment, the marine vessel can take a variety of other forms, including a variety of yachts, other pleasure craft, as well as other types of boats, marine vehicles and marine vessels.

As will be discussed in further detail below, the mounting system 108 allows the outboard motor 104 to be steered about a steering (vertical or substantially vertical) axis 110 relative to the marine vessel 102, and further allows the outboard motor 104 to be rotated about a tilt or trimming axis 112 that is perpendicular to (or substantially perpendicular to) the steering axis 110. As shown, the steering axis 110 and trimming axis 112 are both perpendicular to (or substantially perpendicular to) a front-to-rear axis 114 generally extending from the stern edge 106 of the marine vessel toward a bow 116 of the marine vessel.

The outboard motor 104 can be viewed as having an upper portion 118, a mid portion 120 and a lower portion 122, with the upper and mid portions being separated conceptually by a plane 124 and the mid and lower portions being separated conceptually by a plane 126 (the planes being shown in dashed lines). Although for the present description purposes the upper, mid and lower portions 118, 120 and 122 can be viewed as being above or below the planes 124, 126, these planes are merely provided for convenience to distinguish between general sections of the outboard motor, and thus in certain cases it may be appropriate to refer to a section of the outboard motor that is positioned above the plane 126 (or plane 124) as still being part of the lower portion 122 (or mid portion 120) of the outboard motor view, or to refer to a section of the outboard motor that is positioned below the plane 126 (or plane 124) as still being part of the mid portion 120 (or upper portion 118). This is the case, for example, in the discussion with respect to FIG. 10A.

Nevertheless, generally speaking, the upper portion 118 and mid portion 120 can be understood as generally being positioned above and below the plane 124, while the mid portion 120 and lower portion 122 can be understood as generally being positioned above and below the plane 126. Further, each of the upper, mid, and lower portions 118, 120, and 122 can be understood as generally being associated with particular components of the outboard motor 104. In particular, the upper portion 118 is the portion of the outboard motor 104 in which the engine or motor of the outboard motor assembly is entirely (or primarily) located. In the present embodiment, given the positioning of the upper portion 118, the engine therewithin (e.g., internal combustion engine 504 discussed below with respect to FIG. 5) particularly can be considered to be substantially above (or even entirely above) the trimming axis 112 mentioned above. Given such positioning, the engine essentially is not in contact with the water 101 during operation of the marine vessel 102 and outboard motor 104, and advantageously the outside water 101 does not tend to enter cylinder ports of the engine or otherwise deleteriously affect engine operation. Such positioning further is desirable since, by positioning the engine above the trimming axis 112, the mounting system 108 and the transom 106 to which it is attached can be at a convenient (e.g., not-excessively-elevated) location along the marine vessel 102.

By comparison, the lower portion 122 is the portion that is typically within the water during operation of the outboard motor 104 (that is, beneath a water level or line 128 of the water 101), and among other things includes a gear casing (or torpedo section), as well as a propeller 130 as shown (or possibly multiple propellers) associated with the outboard motor. The mid portion 120 positioned between the upper and lower portions 118, 122 as will be discussed further below can include a variety of components and, among other things in the present embodiment, will include transmission, oil reservoir, cooling and exhaust components, among others.

Figure 2:
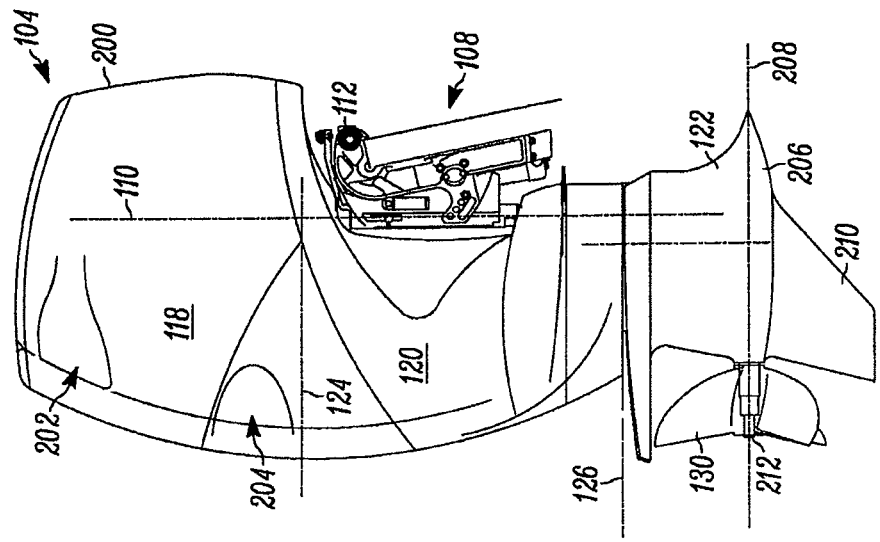
FIG. 2 is a right side elevation view of the outboard motor of FIG. 1.
Figure 3:
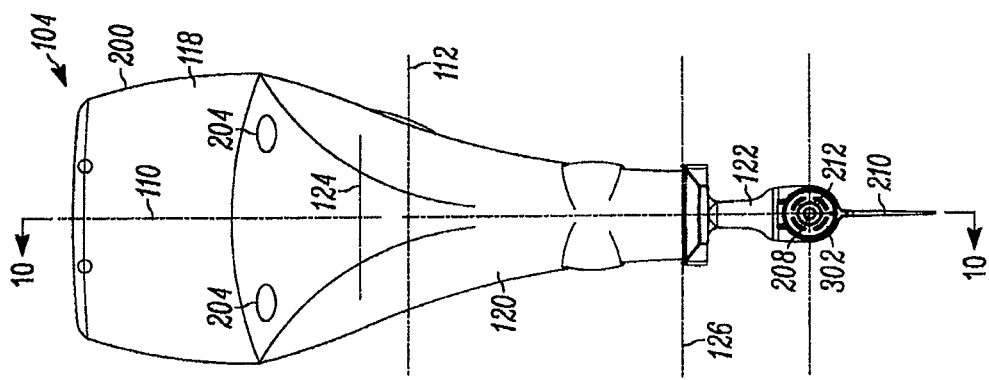
FIG. 3 is a rear elevation view of the outboard motor of FIG. 1.

Turning next to FIGS. 2 and 3, a further side elevation view (right side elevation view) and rear view of the outboard motor 104 of FIG. 1 are provided. It will be understood that the left side view of the outboard motor 104 is in at least some embodiments a mirror image of the right side view provided in FIG. 2. In particular, FIGS. 2 and 3 again show the outboard motor 104 as having the upper portion 118, mid portion 120 and lower portion 122 separated by the planes 124 and 126, respectively. Further, the steering axis 110 and trimming (or tilt) axis 112 are also shown. The mounting system 108 is particularly evident from FIG. 2, as is the propeller 130 (which is not shown in FIG. 3). FIGS. 2 and 3 particularly show several features associated with an outer housing or cowling 200 of the outboard motor 104. Among other things, the cowling 200 includes air inlet scoops (or simply air inlet) 202 along upper side surfaces of the upper portion 118 of the outboard motor 104, one of which is shown in the right side elevation view provided in FIG. 2 (it being understood that a complimentary air inlet is provided on the left side of the cowling 200). In the present embodiment, the air inlet scoops 202 extend in a rearward-facing direction and serve as an entry for air to be used in the engine of the outboard motor 104 (see FIG. 5). The high positioning of the air inlet scoops 202 reduces the extent to which seawater can enter into the air inlets.

Additionally as shown, also formed within the cowling 200 are exhaust bypass outlets 204, which are shown in further detail in FIG. 3 to be rearward-facing oval orifices in the upper portion 118 of the outboard motor 104 extending into the cowling 200. As discussed further below, the exhaust bypass outlets 204 in the present embodiment serve as auxiliary (or secondary) outlets for exhaust generated by the engine of the outboard motor 104. As such, exhaust need not always (or ever) flow out of the exhaust bypass outlets 204, albeit in the present embodiment it is envisioned that under at least some operational circumstances the exhaust will be directed to flow out of those outlets.

Further as evident from FIG. 2, the lower portion 122 of the outboard motor 104 includes a gear casing (or torpedo) 206 extending along an elongated axis 208 about which the propeller 130 spins when driven. Downwardly-extending from the gear casing 206 is a downwardly-extending fin 210. Referring particularly to FIG. 3, it should further be understood that an orifice (actually multiple orifices as discussed further with respect to FIGS. 10A and 10B) 302 is formed at a rearward-most end or hub 212 of the gear casing 206 that surrounds a propeller driving output shaft 212 extending along the axis 208. As will be discussed further below, this orifice 302 forms a primary exhaust outlet for the outboard motor 104 that is the usual passage out of which exhaust is directed from the engine of the outboard motor (as opposed to the exhaust bypass outlets 204).

Figure 4A:
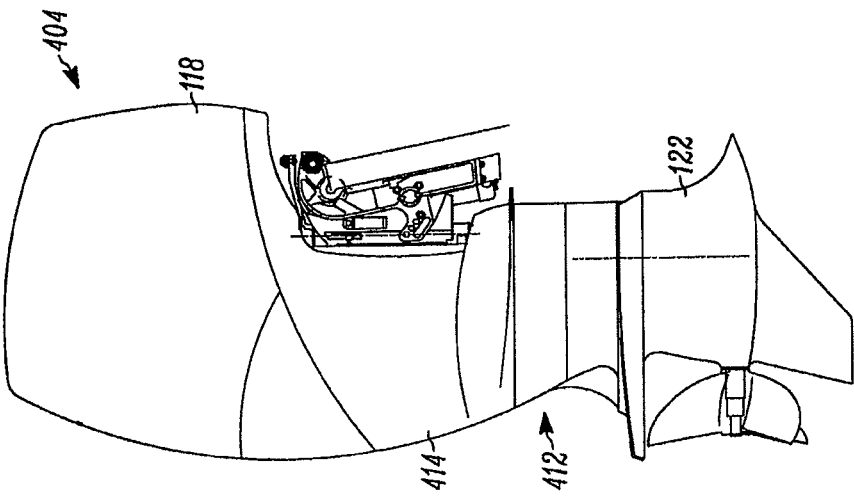
FIGS. 4A and 4B are right side elevation views of alternate embodiments of the outboard motor of FIG. 1.
Figure 4B:
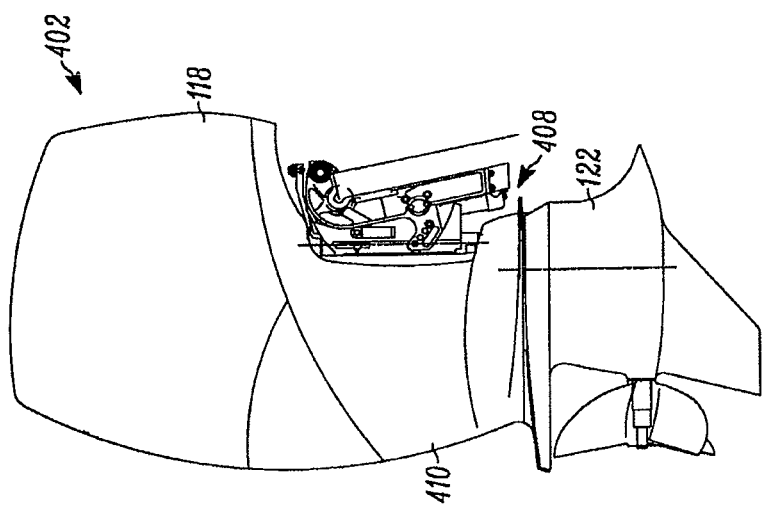

Referring additionally to FIGS. 4A and 4B, first and second alternate embodiments 402 and 404, respectively, of the outboard motor 104 are shown. Each of these alternate embodiments 402, 404 is substantially identical to the outboard motor 104 shown in FIG. 2, except insofar as the mid portion 120 of the outboard motor 104 is changed in its dimensions in each of these other alternate embodiments. More particularly, a leg lengthening section 408 of a mid portion 410 of the first alternate embodiment 402 of FIG. 4A is shortened relative to the corresponding leg lengthening section of the mid portion 120 of the outboard motor 104, while a leg lengthening section 412 of a mid portion 414 of the second alternate embodiment 404 of FIG. 4B is elongated relative to the corresponding section of the mid portion 120 of the outboard motor 104. Thus, with such variations, the positioning of the lower portion 122 can be raised or lowered relative to the upper portion 118 depending upon the embodiment and particularly the leg lengthening section of the mid portion.

Figure 5:
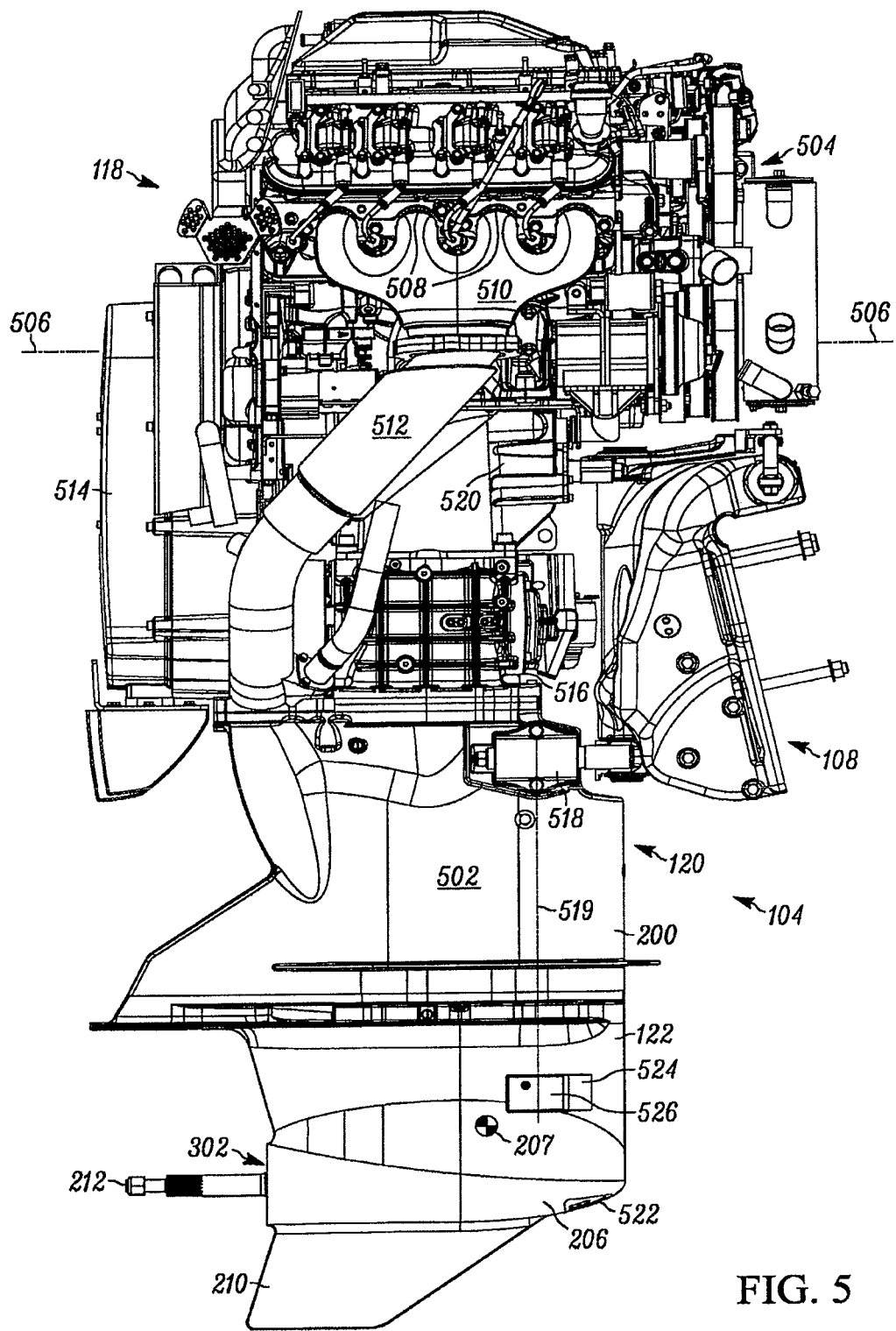
FIG. 5 is a further rights side elevation view of the outboard motor of FIG. 1, showing in more detail several example internal components of the outboard motor particularly revealed when cowling portion(s) of the outboard motor are removed.

Turning to FIG. 5, a further right side elevation view of the outboard motor 104 is provided that differs from that of FIG. 2 at least insofar as the cowling 200 (or, portions thereof) is removed from the outboard motor to reveal various internal components of the outboard motor, particularly within the upper portion 118 and mid portion 120 of the outboard motor. At the same time, the lower portion 122 of the outboard motor 104 is viewed from outside the cowling 200 of the outboard motor, as is a lower section of the middle portion 120 that can be termed a midsection 502 of the middle portion 200. Again though, above the midsection 502, various internal components of the outboard motor 104 are revealed. As with the views provided in FIG. 2 and FIG. 4, the view in FIG. 5 is the mirror image (or substantially a mirror image) of the left side elevation view that would be obtained if the outboard motor were viewed from its opposite side (with the cowling removed).

More particularly as shown in FIG. 5, an engine 504 of the outboard motor 104 is positioned within the upper portion 118 of the outboard motor, entirely or at least substantially above the trimming axis 112 as mentioned earlier. In at least some embodiments, and in the present embodiment, the engine 504 is a horizontal crankshaft internal combustion engine having a horizontal crankshaft arranged along a horizontal crankshaft axis 506 (shown as a dashed line). Further, in at least some embodiments and in the present embodiment, the engine 504 not only is a horizontal crankshaft engine, but also is a conventional automotive engine capable of being used in automotive applications and having multiple cylinders and other standard components found in automotive engines. More particularly, in the present embodiment, the engine 504 particularly is an eight-cylinder V-type internal combustion engine such as available from the General Motors Company of Detroit, Mich. for implementation in Cadillac (or alternatively Chevrolet) automobiles. Further, the engine 504 in at least some embodiments is capable of outputting power at levels of 550 horsepower or above, and/or power within the range of at least 557 horsepower to at least 707 horsepower.

As an eight-cylinder engine, the engine 504 has eight exhaust ports 508, four of which are evident in FIG. 5, emanating from the left and right sides of the engine. The four exhaust ports 508 emanating from the right side of the engine 504 particularly are shown to be in communication with an exhaust manifold 510 that merges the exhaust output from these exhaust ports into an exhaust channel 512 that leads downward from the exhaust manifold 510 to the midsection 502. It will be understood that a complimentary exhaust manifold and exhaust channel are provided on the left side of the engine to receive the exhaust from the corresponding exhaust ports on that side of the engine. As will be described in further detail below, both of the exhaust channels (including the exhaust channel 512) upon reaching the midsection 502 further are coupled to the lower portion 122 at which the exhaust is ultimately directed through the gear casing 206 and out the orifice 302 serving as the primary exhaust outlet. It should further be noted that, given the use of the horizontal crankshaft engine 504, all of the steam relief ports associated with the various engine cylinders are at a shared, high level, above the crankshaft (all or substantially all steam in the engine therefore rises to a shared engine level). Also the accessory drive and heat exchanger system are accessible at the front of the engine 504 (particularly when the lid portion of the cowling 200 is raised as discussed further below). In addition to showing the aforementioned components, FIG. 5 additionally shows a transfer case 514 within which is provided a first transmission as discussed further below, and a second transmission 516 that is located below the engine 504.

Further, FIG. 5 shows the mounting system 108, including a lower mounting bracket structure 518 of the mounting system 108 by which the midsection 502 of the mid portion 120 of the outboard motor 504 is linked to the mounting system, and also an upper mounting bracket 520 by which the mounting system is attached to an upper section of the mid portion 120. An elastic axis of mounting 519 is provided and passes through the upper mounting bracket 520 and the lower mounting bracket 518. In at least some embodiments, the center of gravity of the engine 504 is in line with the elastic axis of mounting. Also FIG. 5 shows a lower water inlet 522 positioned along a front bottom section of the gear casing 206 forward of the fin 210, as well as an upper water inlet 524 and associated cover plate 526 provided near the front of the lower portion 122, about midway between the top and bottom of the lower portion. The lower and upper water inlets 522, 524 and associated cover plates 526 (there is also a corresponding upper water inlet and associated cover plate on the left side of the lower portion 122) are discussed further with respect to FIG. 10A. All of these components, and additional components of the outboard motor 104, are discussed and described in further detail below.

Figure 6A:
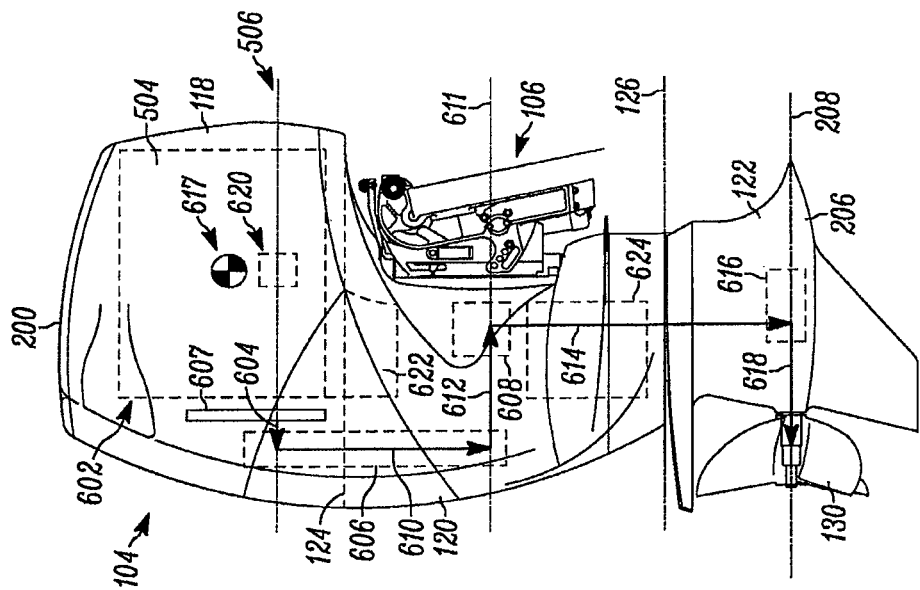
FIG. 6A is a schematic diagram illustrating in additional detail several example internal components of the outboard motor of FIGS. 1 and 5.

Turning to FIG. 6A, a further right side elevation view of the outboard motor 104 is provided in which the relationship of certain internal components of the outboard motor are figuratively illustrated in phantom. More particularly as shown, the outboard motor 104 again is shown to include the engine 504 (this time as represented by a dashed outline in phantom) within the upper portion 118 of the outboard motor. Further as illustrated, rotational power output from the engine 504 is delivered from the engine and to the propeller 130 of the outboard motor by way of three distinct transmissions. More particularly as shown, rotational output power is first transmitted outward from a rear face 602 of the engine 504, along the crankshaft axis 506 as represented by an arrow 604, to a first transmission 606 shown in dashed lines (the power being transmitted by the crankshaft, not shown). A flywheel 607 of the outboard motor 104 is further positioned between the rear of the engine 504 and the first transmission 606, on the crankshaft, for rotation about the crankshaft axis 506.

Figure 6B:
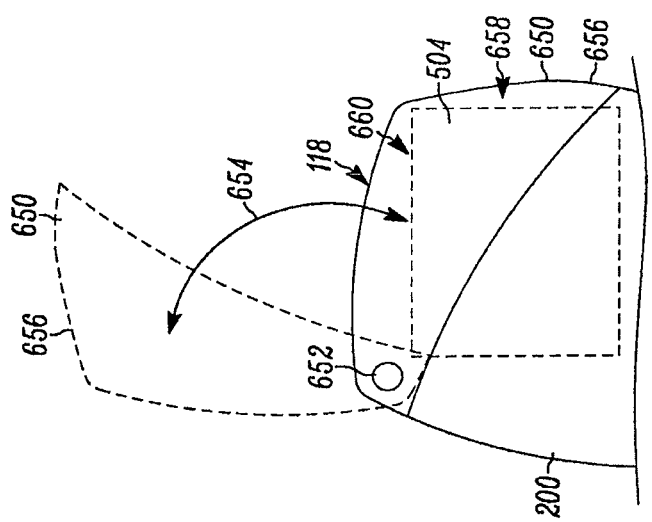
FIG. 6B is a further diagram showing an upper portion of the outboard motor of FIG. 6 an illustrating an example manner of configuring the cowling of the outboard motor to allow for opening and closing of a portion of the cowling so as to reveal internal components.

Referring additionally to FIG. 6B, an additional cutaway view of the upper portion 118 of the outboard motor 104 shown in FIG. 6A is provided so as to particularly illustrate a portion of the cowling 200, shown as a cowling portion 650, that is hinged relative to the remainder of the cowling by way of a hinge 652. As a result of the particular manner in which the cowling portion 650 is hingedly coupled to the remainder of the cowling 200, the cowling portion 650 is able to be opened in a manner by which the cowling swings upward and aftward relative to the remainder of the cowling, in a direction represented by an arrow 654. Thus, the cowling portion 650 can take on both a closed position (shown in FIG. 6B in solid lines) and an open position (shown in dashed lines), as well as positions intermediate therebetween. Further, because the cowling portion 650 includes a front side 656 that extends all or almost all of (or a large portion of) the height of the upper portion 118 of the outboard motor 104, opening of the cowling portion in this manner allows the engine 504 to be largely exposed and particularly for a front portion 658 of the engine 504 and/or a top portion 660 of the engine to be easily accessed, and particularly easily accessed by a service technician or operator standing at the stern of the marine vessel 102 to which the outboard motor 104 is attached. In embodiments where the engine 504 is a horizontal crankshaft engine, particularly an automotive engine as mentioned above, servicing of the engine (and particularly those portions or accessories of the engine that most commonly are serviced, such as oil level, spark plugs, belts, and/or various electrical components) can be particularly facilitated by this arrangement. Also, an accessory drive, extending from the front of the engine 504, along with an associated accessory drive belt, can be accessed in this manner.

Referring again to FIG. 6A, the purpose of the first transmission 606 is first of all to transmit the rotational power from the crankshaft axis 506 level within the upper portion 118 of the engine 104 to a lower level corresponding to a second transmission 608 (also shown in dashed lines) within the mid portion 120 of the outboard motor 104 (the upper portion 118 and middle portion 120 again being separated by the plane 124). Thus, an arrow 610 is shown connecting the arrow 604 with a further arrow 612 at a set level 611 of the second transmission 608. The arrow 612, which links the arrow 610 with the second transmission 608, is representative of a shaft or axle (see FIG. 7) linking the first transmission 606 with the second transmission 608, by which rotational power is communicated in a forward direction within the outboard motor 104 from the first transmission to the second transmission. Additionally, a further arrow 614 then represents communication of the rotational power downward again from the level of the second transmission 608 within the mid portion 120 to a third transmission 616 within the gear casing 206 of the lower portion 122. In accordance with at least one aspect, the gear casing 206 has a center of pressure 207 that is aft of the elastic axis of mounting (FIG. 5). Finally, as indicated by an arrow 618, rotational power is communicated from the third transmission 616 aftward (rearward) from that transmission to the propeller 130 along the axis 208. It can further be noted that, given this arrangement, the flywheel 607 mentioned above is aft of the engine 504, forward of the first transmission 606, and above each of the second and third transmissions 608 and 616. In at least some embodiments, an oil pump is provided that is concentrically driven by the engine crankshaft.

Thus, in the outboard motor 104, power output from the engine 504 follows an S-shaped route, namely, first aftward as represented by the arrow 604, then downward as represented by the arrow 610, then forward as represented by the arrow 612, then downward again as represented by the arrow 614 and then finally aftward again as represented by the arrow 618. By virtue of such routing, rotational power from the horizontal crankshaft can be communicated downward to the propeller 130 even though the power take off (that is, the rotational output shaft) of the engine is proximate the rear of the outboard motor 104/cowling 200. Although it is possible that, in alternate embodiments, rotational power need not be communicated in this type of manner, as will be described further below, this particular manner of communicating the rotational power via the three transmissions 606, 608, 616 is consistent with, and makes possible, a number of advantages. Additionally, it should further be noted that in FIG. 6A, a center of gravity 617 of the engine 504 is shown to be above the crankshaft axis 506, and a position of the mounting pad for the engine block 620 is also shown (in phantom) to be located substantially at the level of the crankshaft axis 506.

In addition to showing the above features of the outboard motor 104 particularly relating to the transmission of power within the outboard motor, FIG. 6A also shows certain aspects of an oil system of the outboard motor 104. In particular, in the present embodiment, it should be understood that each of the engine 504, the first transmission 606, the second transmission 608, and the third transmission 616 includes its own dedicated oil reservoir, such that the respective oil sources for each of these respective engine components (each respective transmission and the engine itself) are distinct. In this regard, the oil reservoirs for the first transmission 606 and third transmission 616 can be considered part of those transmissions (e.g., the reservoirs can be the bottom portions/floors of the transmission housings). As for the engine 504, an engine oil reservoir 622 extends below the engine itself, and in this example extends partly into the mid portion 120 of the outboard motor 104 from the upper portion 118. Notwithstanding the present description, the engine oil reservoir 622 can also be considered to be part of the engine itself (in such case, the engine 504 is substantially albeit possibly not entirely above the trimming axis 112; alternatively, the engine oil reservoir 622 can be considered distinct from the engine per se, in which case the engine is entirely above the trimming axis). In accordance with other embodiments of the present disclosure, a dry sump (not shown) can be provided, separate and apart from the engine oil reservoir 622. And in accordance with embodiments of the present disclosure, a circulation pump is provided, for example, as part of the engine to circulate glycol, or a like fluid.

Further, FIG. 6A particularly shows that a second transmission oil reservoir 624 is positioned within the mid portion 120 of the outboard motor 104, beneath the second transmission 608. This positioning is advantageous for several reasons. First, as will be discussed further below, the positioning of the second oil transmission reservoir 624 at this location allows cooling water channels to pass in proximity to the reservoir and thus facilitates cooling of the oil within that reservoir. Additionally, the positioning of the second oil transmission reservoir 624 at this location is advantageous in that it makes use of interior space within the mid portion 120 which otherwise would serve little or no purpose (other than as a housing for the shaft connecting the second and third transmissions and for cooling and exhaust pathways as discussed below), as a site for storing oil that otherwise would be difficult to store elsewhere in the outboard motor. Indeed, because as discussed below the second transmission 608 is a forward-neutral-reverse (FNR) transmission, that transmission utilizes a significant amount of oil (e.g., 10 quarts or 5 Liters) and storage of this amount of oil requires a significant amount of space, which fortunately is found at the mid portion 120 (within which is positioned the second oil transmission reservoir 624 capable of holding such amounts of oil).

Figure 6C:
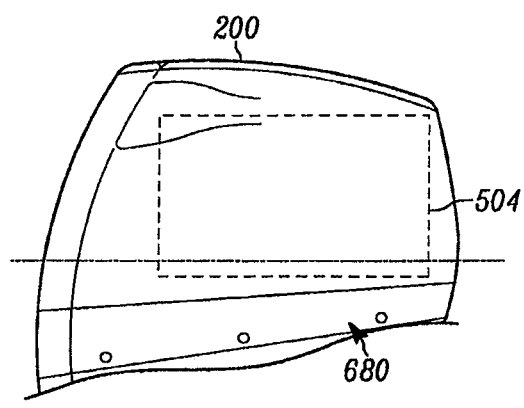
FIGS. 6C-6E illustrate schematically sealing pan features associated with the engine.
Figure 6E:
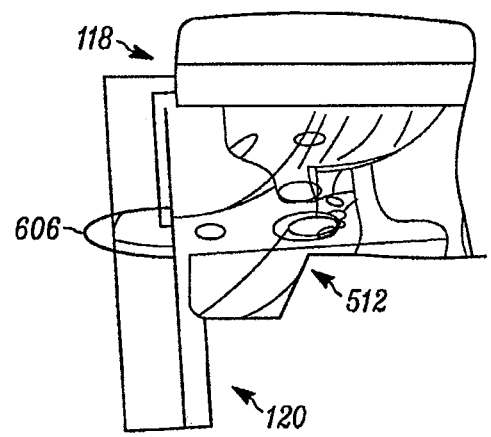
Figure 6D:
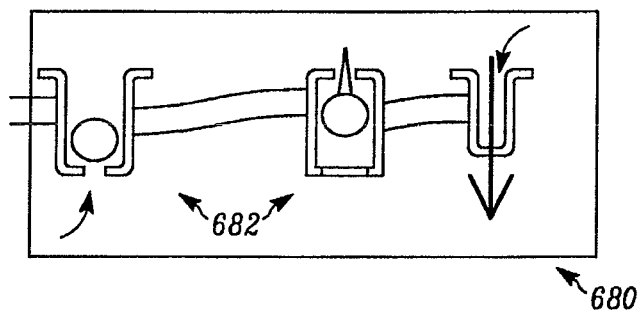

Turning next to FIGS. 6C-6D, additional features of the outboard motor 104 are shown, particularly in relation to the cowl 200 and a watertight sealing pan beneath the engine 104. As illustrated particularly in FIG. 6C (which shows a cutaway view of the upper portion 118), the cowl 200 particularly serves to house the engine 504 and serves to separate the engine compartment from other remaining portions of the outboard motor 104 to provide a clean and dry environment for the engine. For this purpose, in combination with the cowl 200, the outboard motor 104 additionally includes a substantially watertight sealing pan 680 that is positioned beneath the engine 504. Referring additionally to FIG. 6D, which schematically provides a top view of the watertight sealing pan 680. In particular as shown, the watertight sealing pan 680 includes valves 682 that allow water that resides in the watertight sealing pan to exit the watertight sealing pan, but that preclude water from reentering the watertight sealing pan. As for FIG. 6E, a further schematic view illustrates a rights side view of the upper portion 118 and a section of the mid portion 120 to illustrate how the exhaust conduits 512 pass through holes separate from the first transmission 606 through the sealing pan.

Turning next to FIGS. 7A-9C, internal components of the first, second and third transmissions 606, 608 and 616 are shown. It should be understood that, notwithstanding the particular components shown in FIGS. 7A-9C, it is envisioned that the first, second and third transmissions can take other forms (with other internal components) in other embodiments as well. Particularly referring to FIG. 7A, both a rear elevation view and also a right side elevation view (corresponding respectively to the views provided in FIG. 3 and FIG. 2) of internal components 702 of the first transmission 606 are shown. In this embodiment, the first transmission 606 is a parallel shaft transmission that includes a series of first, second and third gears 704, 706 and 708, respectively, that are each of equal diameter and are arranged to engage/interlock with one another in line between the crankshaft axis 506 and the level 611 previously discussed with reference to FIG. 6A. All three of the first, second and third gears 704, 706 and 708 are housed within an outer case 710 of the first transmission 606. An axis of rotation 712 of the second gear 706 positioned in between the first gear 704 and the third gear 708 is parallel to the first axis 506 and level 611, and all of the first axis 506, level 611 and axis of rotation 712 are within a shared vertically-extending or substantially vertically-extending plane. As will be understood, because there are three gears, rotation of the first gear 704 in a first direction represented by an arrow 714 (in this case, being counterclockwise as shown in the rear view) produces identical counterclockwise rotation in accordance with an arrow 716 of the third gear 708, due to intermediary operation of the second gear 706, which rotates in the exact opposite (clockwise) direction represented by an arrow 718. Thus, in this embodiment, rotation of a crankshaft 720 of the engine (as shown in cutaway in the side elevation view) about the crankshaft axis 506 produces identical rotation of an intermediate axle 722 rotating about the level 611, the intermediary axle 722 linking the third gear 708 with the second transmission 608.

Although in the present embodiment of FIG. 7A, each of the first, second and third gears 704, 706 and 708 are of equal diameter, in other embodiments the gears can have different diameters such that particular rotation of the crankshaft 720 produces a different amount of rotation of the intermediary axle 722 in accordance with stepping up or stepping down of gear ratios. In addition, depending upon the embodiment, the number of gears linking the crankshaft 720 with the intermediary axle 722 need not be three. If an even number of gears is used, it will be understood that the intermediary axle will rotate in a direction opposite that of the crankshaft. Further, in at least some embodiments, the particular gears employed in the first transmission can be varied depending upon the application or circumstance, such that the outboard motor 104 can be varied in its operation in real time or substantially real time. For example, a 3-gear arrangement can be replaced with a 5-gear arrangement, or a 3 to 2 step down gear ratio can be modified to a 2 to 3 step up ratio.

Notwithstanding the embodiment of the first transmission 606 shown in FIG. 7A, in an alternate embodiment of the first transmission shown in FIG. 7B as a transmission arrangement 730, internal components 732 of the transmission include a chain 734 that links a first sprocket 736 with a second sprocket 738, where the first sprocket 736 is driven by a crankshaft 740 and the second sprocket 738 drives an intermediary axle 742 (intended to link the second sprocket 738 to the second transmission 608). Due to operation of the chain 734, rotation of the crankshaft 740 in a particular direction produces identical rotation of the intermediary axle 742. Also as shown, the chain 734 and sprockets 736, 738 are housed within an outer case 744.

Notwithstanding the embodiments shown in FIGS. 7A-7B, it should be understood that a variety of other transmission types can be employed in other embodiments to serve as (or in place of) the first transmission 606. For example, in some embodiments, a first wheel (or pulley) driven by the crankshaft (power take off from the engine 504) can be coupled to a second wheel (or pulley) for driving the intermediate axle (for driving the second transmission 608) by way of a belt (rather than a chain such as the chain 734). In still another embodiment, a 90 degree type gear driven by the crankshaft can drive another 90 degree type gear in contact with that first 90 degree gear, and that second 90 degree gear can drive a further shaft extending downward (e.g., along the arrow 610 of FIG. 6A) so as to link that second gear with a third 90 degree gear that is located proximate the level 611. The third 90 degree gear can turn a fourth 90 degree gear that is coupled to the intermediary axle and thus provides driving power to the second transmission 608.

Additionally, as already noted, in at least some embodiments, the particular gears (or other components) employed in the first transmission can be varied depending upon the application or circumstance, such that the gear ratio between the input and output of that first transmission can be varied and such that the outboard motor 104 can consequently be varied in its operation in real time or substantially real time. One further example of a first transmission that particularly allows for such gear ratio variation is shown to be a transfer case 751 in FIGS. 7C and 7D, where the transfer case 751 is configured to be coupled (and mounted in relation) to the engine 504 to receive input power therefrom, and also to the second transmission 608 (to which output power from the transfer case is provided).

As shown, in this embodiment, the transfer case 751 includes an input shaft 758, a first change gear 760, a second change gear 765, an intermediate shaft 771, a further gear 766, an additional gear 772, a lay shaft 773, a final output gear 774, and an output shaft 775. The first change gear 760 is particularly mounted upon the input shaft 758 by way of a splined coupling, and the second change gear 765 is mounted upon the intermediate shaft 771 also via a splined coupling. During normal operation, the transfer case 751 operates by transmitting power received from the engine 504 via the input shaft 758. Rotation of the input shaft 758 drives rotation of the first change gear 760, which meshes with and consequently drives the second change gear 765. Power is then transmitted from the second change gear 765 by way of the intermediate shaft 771 to the further gear 766, which is also mounted upon the intermediate shaft 771. The further gear 766 drives the additional gear 772 that is mounted to the lay shaft 773. The additional gear 772 in turn meshes with and drives the final output gear 774, which is mounted to the output shaft 775, thus allowing for the delivery of output power from the output shaft that can be provided to the second transmission 608.

Further as shown, the transfer case 751 has particular features that facilitate modification of gear/power train components within the transfer case. The transfer case 751 has a primary cover 752 that serves as a housing that surrounds and encloses the transfer case and the gears/power train components therewithin (including the aforementioned first change gear 760, second change gear 765, intermediate shaft 771, further gear 766, additional gear 772, lay shaft 773, final output gear 774, and at least portions of the input shaft 758 and output shaft 775). However, as should be particularly evident from FIG. 7D, the primary cover 752 does not entirely enclose all of the gears/power train components but rather has an orifice 790 at an upper rear-facing region of the primary cover by way of which the first and second change gears 760, 765 are accessible from outside of the primary cover to allow for modifications to the gears/power train components so as to result in gear ratio modifications. So that the gears/power train components can be fully enclosed (and protected from the outside environment) once a desired arrangement and gear ratio have been achieved, the transfer case 751 additionally includes a change gear (or simply gear) cover 753, which can be assembled to the primary cover 752 (e.g., by way of bolts or other fastening structures) so as to cover over the orifice 790. The gear cover 753 in the present embodiments additionally serves to support some of the gear/power train components of the transfer case 751 when it is assembled to the primary cover 752.

Figure 7C:
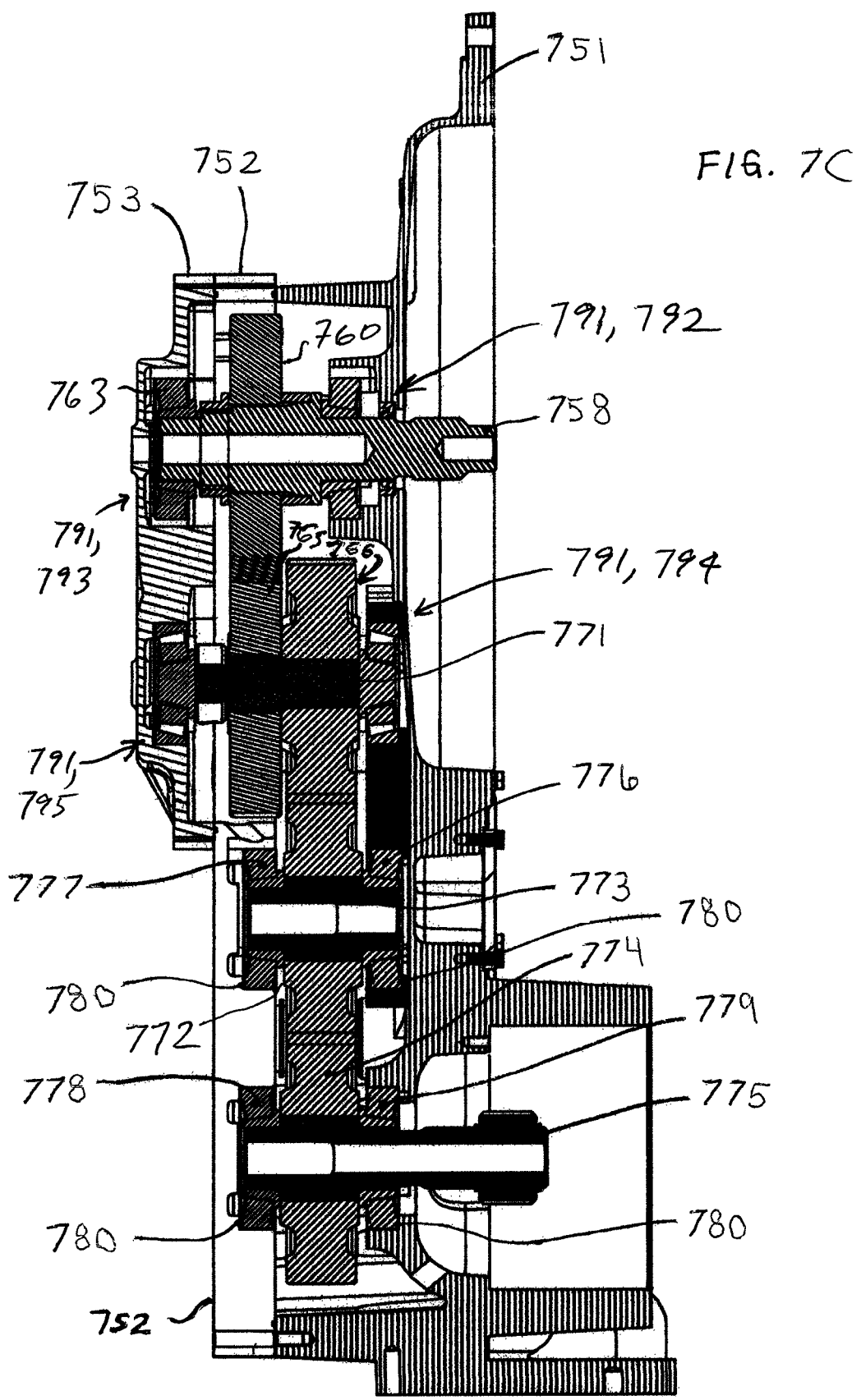
FIG. 7C is a cross-sectional view of an alternate embodiment of a first transmission (transfer case) of the outboard motor of FIG. 6A that is configured to allow for gear ratio variation, the cross-section being taken a long a central plane extending through the central axes of the input and output shafts of the transfer case.
Figure 7D:
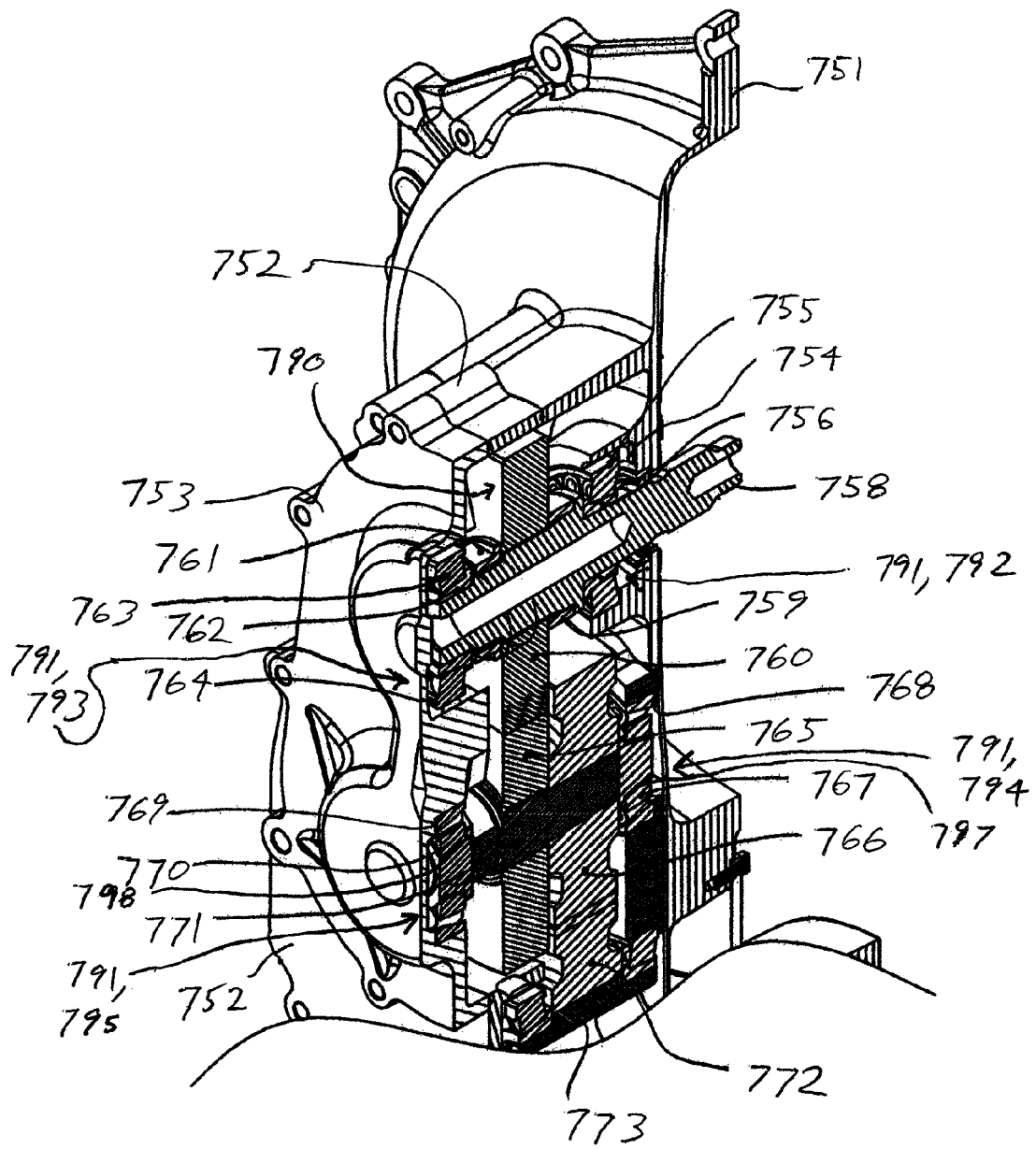
FIG. 7D is an additional, partially-cutaway, cross-sectional view of an upper portion of the first transmission (transfer case) shown in FIG. 7C, the cross-section being taken along a plane extending through the central axis of the input shaft of the transfer case but extending askew of the output shaft central axis.

In addition to the above, FIGS. 7C and 7D show further features of the transfer case 751 and gears/power train components therewithin. More particularly, the respective first change gear 760 can be securely fastened to the input shaft 758 via a first nut 761 (see FIG. 7D) and the second change gear 765 can be securely fastened to the intermediate shaft 771 by way of a second nut (which is not shown, but should be understood to be of the same type as the first nut and at a location in relation to the second change gear that corresponds to the location of the first nut relative to the first change gear). Additionally as shown, each of the input shaft 758 and the intermediate shaft 771 is suspended/supported within (or relative to) the transfer case 751 by way of a respective pair of roller bearing assemblies 791 respectively positioned at opposite ends of the respective shaft within the transfer case (at opposite ends proximate the front and rear of the transfer case 751). More particularly, the input shaft 758 is supported by a first roller bearing assembly 792 located proximate the front of the transfer case 751 that includes an outer cup 755 and a cone 756 on the shaft 758, plus a shim 754, and a second roller bearing assembly 793 located proximate the rear of the transfer case 751 that includes an outer cup 763 and a cone 762 on the shaft 758, plus a shim 764. Similarly, the intermediate shaft 771 is supported by a third roller bearing assembly 794 located proximate the front of the transfer case 751 that includes an outer cup 767 and a cone 797 on the shaft 771, plus a shim 768, and a fourth roller bearing assembly 795 located proximate the rear of the transfer case 751 that includes an outer cup 770 and a cone 798 on the shaft 771, plus a shim 769.

The bearing assemblies 791 (792, 793,794, and 795) are particularly set to the appropriate pre-load level by way of the shims 754, 764, 768, and 769 (in other words, the bearings partiality to the appropriate pre-load level with the shims). It can be further noted that, in the present embodiment, the first change gear 760 is spaced apart from the first bearing assembly 792 by way of a cylindrical spacer 759, but is spaced (kept) apart from the second bearing assembly 793 by way of the nut 761. By comparison, the second change gear 765 is spaced part from the third bearing assembly 794 by way of the further gear 766, and spaced (kept) part from the fourth bearing assembly 795 by way of the second nut mentioned above (not shown). Finally, it should be appreciated from FIG. 7C that each of the lay shaft 773 and output shaft 775 also are supported by way of respective pairs of bearing assemblies As shown, the lay shaft 773 is particularly supported by a fifth bearing assembly 776 proximate the front of the transfer case 751 and a sixth bearing assembly 777 proximate the rear of the transfer case, and that the output shaft 775 is supported by a seventh bearing assembly 779 proximate the front of the transfer case and an eighth bearing assembly 778 proximate the rear of the transfer case. In this embodiment, each of the bearing assemblies includes a respective shim 780 (although the same reference numeral 780 is used for simplicity in referring to each of these shims, it should be appreciated that the respective shims used for each bearing can be different from the others), and also each of the bearing assemblies includes a respective outer cup and respective cone.

Given the design shown in FIGS. 7C and 7D, with the gear cover 753 removed from the primary cover 752, the first and second change gears 760 and 765 can be selected and modified to vary the gear ratio as required depending on the application. In particular, the first change gear 760 can be removed and replaced as desired without changing the shimming of the roller bearing assemblies 792, 793 (or bearing set) on the input shaft 758. Also, the same method of shimming and changing of the second change gear 765 can be performed in relation to the intermediate shaft 771 without changing the shimming of the roller bearing assemblies 794, 795 (bearing set) associated with that shaft. For example, although in the present example embodiment of the transfer case 751 shown in FIGS. 7C and 7D the first and second change gears 760 and 765 have the same (or substantially the same) diameter as one another, the first change gear 760 can be replaced with a first replacement change gear (not shown) having a larger (or smaller) diameter than the first change gear 760 and the second change gear 765 can be replaced with a second replacement change gear (not shown) having a smaller (or larger) diameter than the second change gear 765 so as to vary the gear ratio between the input shaft 758 and the intermediate shaft 771 from a 1:1 (or substantially 1:1) ratio to a ratio substantially less than (or greater than) a 1:1 ratio. Also for example, if the transfer case 751 initially has a first change gear that is larger (or smaller) in diameter than the second change gear, the first and second change gears can be replaced so that the first change gear is smaller (or larger) in diameter than the second change gear (or so that the first and second change gears share the same diameter), so as effect additional changes in gear ratio.

Using this approach, therefore, variations in the gear ratio of the transfer case 751 can be accomplished simply by removing the gear cover 753, removing the two retaining nuts (one of which is shown as the nut 761) from the shafts 758, 771, changing/replacing of one or both of the change gears 760, 765, placing the retaining nuts (or possibly other nuts or other fasteners differing from the original ones) back onto the shafts to retain the changed/replacement gears, and reassembling the gear cover 753 onto the remainder of the transfer case 751 (e.g., onto the primary cover 752). The gears 760, 765 and thus the associated gear ratio of the transfer case 751 can consequently be changed without affecting the pre-load torque of the shafts 758, 771. An advantage of this design is that, in contrast to many conventional transfer case designs, which require that the transfer case be separated completely from the engine and transmission in order to check a preload shaft, the present embodiment of FIGS. 7C and 7D particularly eliminates this disassembly requirement.

Notwithstanding the particular discussion provided with respect to FIGS. 7C and 7D, a variety of alternate embodiments are also possible. For example, in some alternate embodiments, the respective shims on one or the other of the ends of one or both of the input and intermediate shafts 758, 771 can be eliminated from the roller bearing assemblies 791 at those respective end(s). That is, in one such alternate embodiment, the shim 754 can be present while the shim 764 is absent, or vice-versa. Likewise, in alternate embodiments shims can be absent from one or the other of the bearing assemblies used to support one or both of the shafts 773 and 775. Also, although in the embodiment of FIGS. 7C and 7D removal of the gear cover 753 allows for access and modification/replacement of the first and second change gears 760, 765 (as well as possibly one or more of the associated components, such as one or more components of the bearing assemblies 791 such as one or more of the shims 754, 764, 768, 769), in other embodiments the gear cover 753 and primary cover 752 (e.g., in terms of the size of the orifice 790) can be modified to allow for accessing and modification/replacement of one or more of the other gears 766, 772, 774 and associated power train components (again such as one or more of the associated bearing assemblies and components thereof such as one or more shims). Also, in other embodiments, the numbers and/or types of gears and associated power train components in the transfer case can be varied.

Referring to FIGS. 7E and 7F, in still an additional alternate embodiment of the first transmission 606, the first transmission can be (or include) a transfer case 1751 that includes an integrated oil pump 1780. FIG. 7E particularly shows a front elevation view of the transfer case 1751 and FIG. 7F shows a cross-sectional view of the transfer case 1751 taken along line F-F of FIG. 7E (with the view directed so as to allow for viewing of portions of a right half of the transfer case). As is evident from FIG. 7F in particular, the transfer case 1751 includes a number of components that correspond to the same or substantially the same components of the transfer case 751 of FIGS. 7C and 7D. Among other things, the transfer case 1751 includes a first change gear 1760, second change gear 1765, intermediate shaft 1771, further gear 1766, additional gear 1772, lay shaft 1773, final output gear 1774, and at least portions of an input shaft 1758 and output shaft 1775 that respectively correspond to (and are identical to or substantially similar to) the first change gear 760, second change gear 765, intermediate shaft 771, further gear 766, additional gear 772, lay shaft 773, final output gear 774, and the input shaft 758 and output shaft 775 (or portions of those shafts), respectively.

Further, the transfer case 1751 includes two pairs of roller bearing assemblies 1791 for supporting the input shaft 1758 and intermediate shaft 1771, which correspond respectively to the roller bearing assemblies 791 of the transfer case 751 (in which each roller bearing assembly includes a respective cup, cone, and shim), as well as roller bearing assemblies 1776, 1777, 1778, and 1779 respectively corresponding to the respective roller bearing assemblies 776, 777, 7778, and 7779 of the transfer case 751 (and again which each include a respective cup, cone, and shim), and also includes nuts (or other spacers) corresponding to the nuts of the transfer case 751 (e.g., the first nut 761 discussed above) for maintaining relative positioning of the gears. Additionally, the transfer case 1751 also includes a primary housing 1752 and gear cover 1753 that is attachable to and removable from the primary housing, so as to reveal and allow for changing/replacement of the first and second change gears 1760 and 1761 so as to allow for variation of the gear ratio provided by the transfer case. Thus, in terms of allowing for the transfer of rotational power from the input shaft 1758 and the output shaft 1775, and facilitating variation of the gear ratio provided by the transfer case 1751 by the changing/replacement of one or more of the change gears 1760 and 1761, the transfer case 1751 operates in a manner that is the same as or substantially the same as the transfer case 751 of FIGS. 7C and 7D.

Notwithstanding these similarities, the transfer case 1751 includes additional features different from those of the transfer case 751 particularly insofar as the transfer case 1751 includes the oil pump 1780 integrated within the transfer case. As shown, in the present embodiment, the oil pump 1780 particularly is mounted on the output shaft 1775 as it extends forward from the final output gear 1774, toward the location at which is positioned the second transmission 608 (not shown) below the engine 504. More particularly as shown in additional FIGS. 7G, 7H, 7I, 7J, and 7K, which respectively are left side perspective, right side perspective, rear elevation, right side, and front elevation views of the oil pump 1780 independent of the remainder of the transfer case 1751, the oil pump 1780 is a substantially annular structure having an inner orifice 1781 (as particularly is evident from FIGS. 7G, 7H, 7I, and 7K), an oil output port 1786 (see particularly FIG. 7K), and an oil input port 1783 (below the oil output port), where the oil input port 1783 is positioned along a front-facing face 1784 of the oil pump (as is visible in FIGS. 7G, 7H, 7I, and 7J) and the oil output port 1786 is formed along a rear-facing face 1785 of the oil pump (as shown in FIGS. 7J and 7K). The oil output port 1786 is shown particularly as including an orifice surrounded by an O-ring. Further as shown, the oil pump 1780 additionally includes an oil pressure relief valve 1782 that extends outward (forward) from the front-facing face 1784 of the oil pump, which is located above the oil input port 1783, and which serves to prevent oil pressure from going beyond predetermined level(s).

As is evident particularly from the FIG. 7F, when the oil pump 1780 is mounted on the output shaft 1775, the output shaft 1775 passes through the inner orifice 1781. Due to coupling of an exterior splined surface of the output shaft with an inner splined surface within the oil pump that forms the inner orifice 1781, rotation of the output shaft causes rotation of the oil pump. Since the output shaft 1775 turns when the engine 504 causes rotation of the input shaft 1758 (that is, when transfer case 1751/first transmission operates or turns), engine operation and consequent rotation of the output shaft drives the oil pump and causes the oil pump to deliver oil. Although operation can vary depending upon the embodiment, in the present embodiment, the oil pump only operates to deliver oil when the when the transfer case (first transmission) 1751 is operating and the output shaft 1775 is rotating. When the oil pump is operating due to rotation of the output shaft 1775, the pump pressurizes incoming oil received via the oil input port 1783 and delivers (outputs) the pressurized oil via the output port 1786 to an oil filter 1798 (see FIG. 7E), which removes debris from the oil. The filtered, pressurized oil exiting the oil filter 1798 then is ready to be used, and is supplied from the oil filter to any of a variety of components of the outboard motor (e.g., in this case, the outboard motor 104 equipped with the transfer case 1751) that can utilize that oil, by way of any of a variety of, or a series of (or a variety of series of), of interconnected passages, galleries, tubes, and/or holes.

In the present embodiment, the oil pump 1780 can be a conventional gerotor pump suitable for pumping oil suitable for use in an engine such as the engine 504 or in relation to components of transmission devices such as the first, second, and third transmissions 606, 608, and 616. A gerotor pump can be suitable as the oil pump 1780 particularly because the output shaft 1775 passes through the center of the pump on a spline that allows radial driving torque for the pump but also allows free axial motion of the pump driver (thus not affecting the free axial motion of the pump inner member that is typically required for the correct functioning of a gerotor pump). Nevertheless, in other embodiments, the oil pump 1780 can be another type of oil pump including, for example, a vane type oil pump or a geared oil pump.

Also, in the present embodiment, the oil pump 1780 is positioned on the output shaft 1775 because an oil sump or reservoir 1799 from which the oil pump draws oil is located at the bottom of (or below) the transfer case 1751 and the output shaft 1775 is the lowermost shaft of the transfer case that is closest to that oil sump. More particularly as illustrated, the oil input port 1783 (oil pump inlet tube or pickup tube) in the present embodiment extends into the oil sump 1799 such that, as the outboard motor changes angle during operation of the outboard motor or the marine vessel on which the outboard motor is implemented (in terms of any of fore and aft or aft angle referred to as "trim" or boat roll angles), the oil input port allows oil to be accessed and delivered even despite such movements of the outboard motor/marine vessel.

Nevertheless, in alternate embodiments, the oil pump can instead be mounted on any other of the shafts of the transfer case 1751 (e.g., any of the input shaft 1758, the intermediate shaft 1771, the lay shaft 1773), and/or can be mounted in other manners. Indeed, the present disclosure is intended to encompass any of a variety of embodiments in which any of a variety of oil pumps is formed as part of, and/or integrated with, a transmission device (or transfer case), and is driven to pump oil when the transmission device (or transfer case) is operating to communicate rotational power. And the present disclosure is further intended to encompass any of a variety of such embodiments involving an oil pump formed as part of or integrated with a transmission device, where the pumped oil can be utilized to lubricate any of a variety of Components) of that transmission device (e.g., power train components such as gears or shafts or bearings thereof), and/or of other transmission devices, the engine, or other structures or devices (e.g., other components of the outboard motor).

Providing of the oil pump 1780 in the transfer case 1751 in the manner shown in FIGS. 7E and 7F is advantageous in the present embodiment of an outboard motor in which a horizontal crankshaft engine is employed. To begin, providing of the oil pump 1780 in an integrated manner along the output shaft 1775 (or another shaft of the transfer case), is a convenient and elegant manner of implementing an engine-driven oil pump. Although the oil pump 1780 can provide oil to any of a variety of components of the outboard motor, including components of the engine 504 and/or any of the transmissions 606, 608, 616, in the present embodiment a primary purpose of the oil pump 1780 is to lift oil from the oil sump 1799, drive the oil through the oil filter 1798, and cause delivery of the filtered oil to the backside(s) of the tapered roller bearings (e.g., the roller bearing assemblies 1791, 1776, 1777, 1778, 1779) of the transfer case 1751 via interconnecting passages. This augments the natural flow of oil thru each bearing.

The particular interconnecting passages used to communicate oil from the oil pump (and oil filter 1798) to the bearings can vary depending upon the embodiment. In the present embodiment, in which the transfer case 1751 includes eight of the bearings (four bearing assemblies 1791, plus the bearing assemblies 1776, 1777, 1778, and 1779), the oil pump (or oil pump via the oil filter 1798) can deliver oil to the uppermost six (6) of the bearings (the bearing assemblies 1791, 1776, and 1777) via transmission internal drill ways. Also, as shown in FIG. 7K, in the present embodiment oil can be delivered from the oil pump 1780 to a seventh of the bearings (the bearing assembly 1779) by way of an orifice 1787 included in the oil pump body itself, so as to feed oil to that bearing, which is the bearing that is closest to the oil pump. The eighth of the bearings (the bearing assembly 1778) can be directly exposed to the oil sump 1799. With such an arrangement, oil returns to the oil sump 1799 from the bearings by cascading downwardly, thereby lubricating the gears 1760, 1765, 1766, 1772, and 1774 of the transfer case 1751 (first transmission).

In addition, placement of the oil pump 1780 in the location shown in FIGS. 7E and 7F not only allows for filtered, pressurized oil to be directly supplied to components of the transfer case 1751, but also allows for such oil to be provided to any of a number of other components of the outboard motor that can benefit from such oil. Indeed, in the present embodiment of the outboard motor, in which first, second, and third transmissions are employed (e.g., in this example, the transfer case 1751, the second transmission 608, and the third transmission 616, respectively) to connect the engine 504 to the propeller mounted at the gear casing 206 and to communicate engine torque and driving power to the propeller, there are numerous components that require or can benefit from lubrication provided by the oil delivered from the oil pump 1780.

Further in this regard, it should be appreciated that, depending upon the embodiment of outboard motor, there are a variety of different types of transmissions and transmission components that can be employed as well as a variety of manners of assembling and/or coupling those transmissions and transmission components, and the present disclosure is intended to encompass numerous such embodiments including, further for example (and without limitation), embodiments involving any one or more of gear, belt, shaft, electric generator and/or motor, hydraulic pump and/or motor, and/or other components. Regardless of which of such implementations are provided in any given embodiment, in all or substantially all of such implementations, an oil pump providing lubrication can beneficially supply oil to one or more components of such implementations.

Turning next to FIG. 8, in the present embodiment the second transmission 608 is a wet plate transmission (or multi-plate wet disk clutch transmission) that receives rotational power via the intermediary axle 722 (previously shown in FIG. 7A) rotating about the level 611 and provides output power by way of an output shaft 802, which extends downwardly in the direction of the arrow 614 and links the second transmission to the third transmission 616 within the gear casing 206. The internal components of the wet disk clutch transmission constituting the second transmission 608 can be designed to operate in a conventional manner. Thus, operation of the second transmission 608 is controlled by controlling positioning of a clutch 804 positioned between a reverse gear 806 on the left and a forward gear 808 on the right of the clutch, where each of the reverse gear, clutch and forward gear are co-aligned along the axis established by the level 611. Movement of a control block 810 located to the right of the forward gear 808, to the right or to the left, causes engagement of the reverse gear 806 or forward gear 808 by the clutch 804 such that either the reverse gear 806 or the forward gear 808 is ultimately driven by the rotating intermediary axle 722.

Further as shown, each of the reverse gear 806 and forward gear 808 are in contact with a driven gear 812, with the reverse gear engaging a left side of the driven gear and the forward gear engaging a right side of the driven gear, the reverse and forward gears being oriented at 90 degrees relative to the driven gear. The driven gear 812 itself is coupled to the output shaft 802 and is configured to drive that shaft. Thus, depending upon whether the reverse gear 806 or forward gear 808 is engaged, the driven gear 812 connected to the output shaft 802 is either driven in a counterclockwise or clockwise manner when rotational power is received via the intermediate axle 722. Also, a neutral position of the clutch 804 disengages the output shaft 802 from the intermediary axle 722, that is, the driven gear 812 in such circumstances is not driven by either the forward gear 808 or the reverse gear 806 and consequently any rotational power received via the intermediary axle 722 is not provided to the output shaft 802.

It should be noted that the use of a wet disk clutch transmission in the present embodiment is made possible since the wet disk clutch transmission can serve as the second transmission 608 rather than the third transmission 616 in the gear casing (and since the wet disk clutch transmission need not bear as large of torques, particularly when the twin pinion arrangement is employed in the third transmission). Nevertheless, it can further be noted that, in additional alternate embodiments, the second transmission 608 need not be a wet disk clutch transmission but rather can be another type of transmission such as a dog clutch transmission or a cone transmission. That is, although in the present embodiment the wet disk clutch transmission serves as the second transmission 608, in other embodiments, other transmission devices can be employed. For example, in other embodiments, the second transmission 608 can instead be a cone clutch transmission or a drop clutch transmission. Further, in other embodiments, the third transmission (gear casing) 616 can itself employ a dog clutch transmission or other type of transmission. Also, in other embodiments, the first transmission 606 can serve as the transmission providing forward-neutral-reverse functionality instead of the second transmission providing that capability, in which case the second transmission can simply employ a pair of bevel gears to change the direction of torque flow from a horizontal direction (between the first and second transmissions) to a downward direction (to the third transmission/gear case).

Turning next to FIG. 9A, internal components of the third transmission 616 are shown within a cutaway section of the lower portion 122 of the outboard motor 104 (plus part of the mid portion 120). In the present embodiment the third transmission 616 is a twin pinion transmission. Given this configuration, the output shaft 802 extending from the second transmission 608 reaches the plane 126 at which are located a pair of first and second gears 902 and 904, respectively, that are of equal diameter and engage one another. In the present embodiment, the second gear 904 is forward of the first gear 902, with both gears having axes parallel to (or substantially parallel to) the steering axis 110 (see FIG. 1) of the outboard motor 104. First and second additional downward shafts 906 and 908, respectively, extend downward from the first and second gears 902 and 904, respectively, toward first and second pinions 910 and 912, respectively, which are located within the gear casing 206 with the first pinion 910 being aft of the second pinion 912. Due to the interaction of the first and second gears 902 and 904, while rotation of the first additional downward shaft 906 proceeds in the same direction as that of the output shaft 802, the rotation of the second additional downward shaft 908 is in the opposite direction relative to the rotation of the output shaft 802. Thus, the pinions 910 and 912, respectively, rotate in opposite directions.

Further as shown, each of the first and second pinions 910 and 912 engages a respective 90 degree type gear that is coupled to the propeller driving output shaft 212 that is coupled to the propeller 130 (not shown). The power provided via both of the pinions 910, 912 is communicated to the propeller driving output shaft 212 by way of a pair of first and second 90 degree type gears 916 and 918 or, alternatively, 920 and 922. Only the gears 916, 918 or the gears 920, 922 are present in any given embodiment (hence, the second set of gears 920, 922 in FIG. 9A are shown in phantom to indicate that those gears would not be present if the gears 916, 918 were present). As shown, the gears of each pair 916, 918 or 920, 922 are arranged relative to their respective pinions 910, 912 along opposite sides of the pinions such that the opposite rotation of the respective pinions will ultimately cause the respective gears of either pair to rotate the propeller driving output shaft 212 in the same direction. That is, the first 90 degree type gear 916 is towards the aft side of the first pinion 910 while the second 90 degree type gear 918 is to the forward side of the pinion 912. Likewise, while the first 90 degree type gear 920 (shown in phantom) is to the forward side of the first pinion 910, the second 90 degree type gear 922 is (also shown in phantom) to the aft side of the second pinion 912.

Notwithstanding the above discussion, in alternate embodiments the third transmission 616 can take other forms. For example, as shown in FIG. 9B, in one alternate embodiment of the third transmission shown as a transmission 901, there is only a single pinion 924 within the gear case 206 that is directly coupled to the output shaft 802 (elongated as appropriate), and that pinion drives a single 90 degree type gear 926 coupled to the propeller driving output shaft 914. In yet a further alternate embodiment of the third transmission 616, shown as a transmission 903 in FIG. 9C, gears within the gear casing 206 are configured to drive a pair of counter-rotating propellers (not shown). More particularly, in this embodiment, a single pinion 928 within the gear casing 206 is driven by the output shaft 802 (again as appropriately elongated) and that pinion drives both rear and forward 90 degree type gears 930 and 932, respectively. As shown, the forward 90 degree type gear 932 drives an inner axle 934 that provides power to a rearmost propeller (not shown) of the counter-rotating pair of propellers, while the rear 90 degree type gear 930 drives a concentric tubular axle 936 that is coaxially aligned around the first axle 934. The tubular axle 936 is connected to the forward one of the propellers of the pair of counter-rotating propellers (not shown) and drives that propeller.

Figures 10A, 10B:
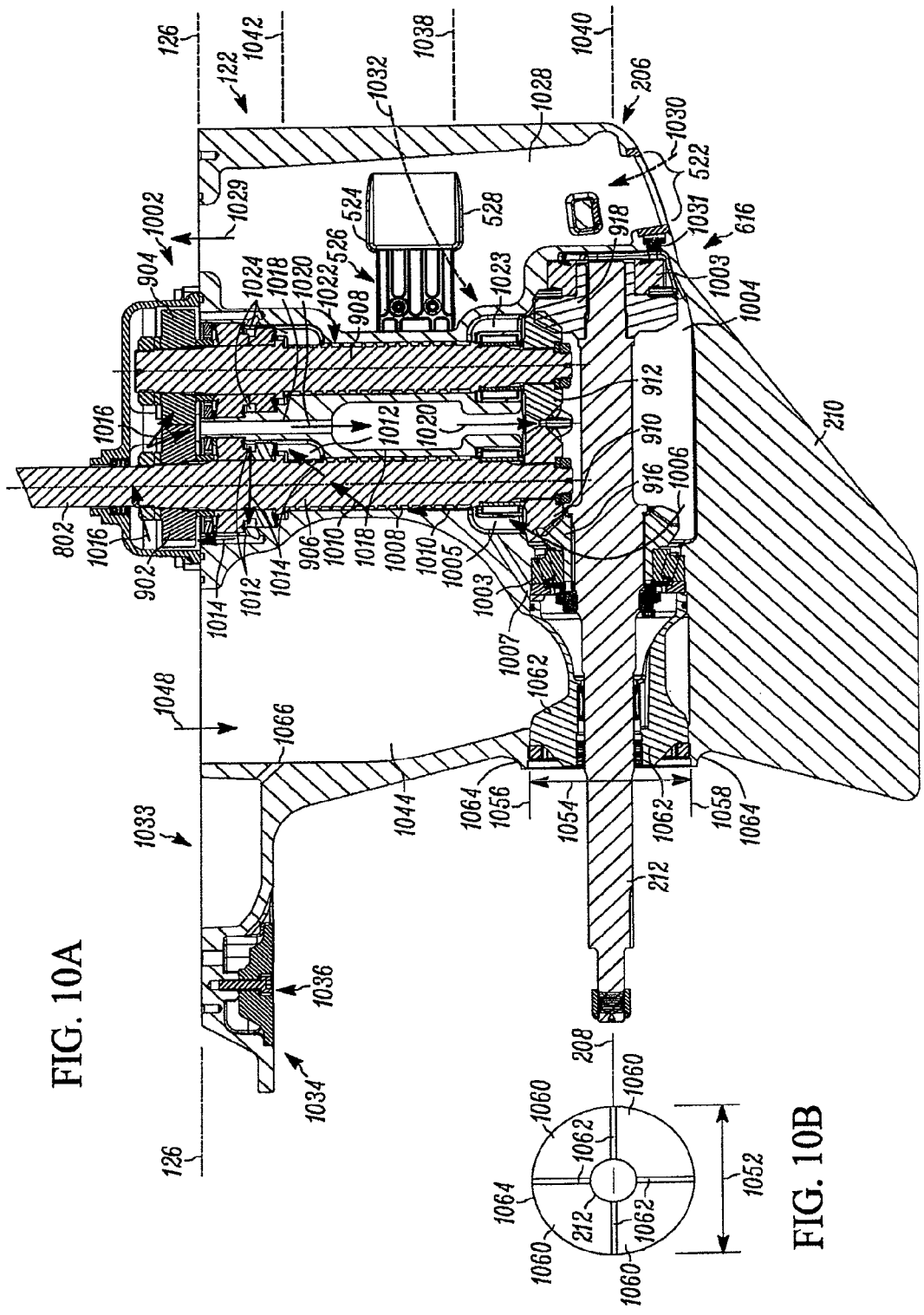
FIG. 10A is a cross-sectional view of a lower portion of the outboard motor of FIGS. 1-3, 5, and 6A, taken along line 10-10 of FIG. 3, shown cutaway from mid and upper portions of that outboard motor.
FIG. 10B is a rear elevation view a gear casing of the lower portion of the outboard motor of FIG. 10A, shown cutaway from the remainder of the lower portion.

Referring further to FIG. 10A, an additional cross-sectional view is provided of the lower portion 122 of the outboard motor 104, taken along line 10-10 of FIG. 3. Among other things, this cross-sectional view again shows components of the third transmission 616 of the outboard motor 104. The view provided in FIG. 10A particularly also is a cutaway view with portions of the outboard motor 104 above the plane 126 cutaway, aside from a section 1002 of the lower portion 122 receiving the output shaft 802 from the second transmission 608 and housing the first and second gears 902, 904 (contrary to the schematic view of FIG. 9A, in FIG. 10A the section 1002 actually extends slightly above the plane 126 serving as the general conceptual dividing line between the lower portion 122 and the mid portion 120, but nevertheless can still be considered part of the lower portion 122 of the outboard motor 104). In addition to the section 1002, FIG. 10A also shows the first and second additional downward shafts 906 and 908, which link the respective first and second gears 902 and 904 with the first and second pinions 910 and 912, respectively. In turn, the first and second pinions 910 and 912, respectively, are also shown to engage the first and second 90 degree type gears 916 and 918, respectively, which drive the propeller driving output shaft 212 (as with FIG. 3, the propeller 130 is not shown in FIG. 10A) extending along the elongated axis 208 of the gear casing 206 above the fin 210. Tapered roller bearings 1003 are further shown in FIG. 10A to support the first and second 90 degree type gears 916, 918 and the propeller driving output shaft 212 relative to the walls of the third transmission 616.

In addition to showing some of the same components of the third transmission 616 shown schematically in FIG. 9A, FIG. 10A is also intended to illustrate oil flow within the third transmission, and further to illustrate several components/portions of a cooling system of the outboard motor 104 and also several components/portions of an exhaust system of the outboard motor that are situated within the lower portion 122 (additional components/portions of the cooling system and exhaust system of the outboard motor 104 are discussed further below with respect to subsequent FIGS.). With respect to oil flow within the third transmission 616, it should be noted that oil congregates in a reservoir portion 1004 near the bottom of the gear casing 206. By virtue of rotation of the first and second 90 degree type gears 916 and 918, not only is oil provided to lubricate those gears but also oil is directed to the first and second pinions 910 and 912, respectively. Flow in this direction, particularly from the reservoir portion 1004 via the first 90 degree type gear 916 to the first pinion 910 and a space 1005 above the first pinion is indicated by an arrow 1006 (it will be understood that oil proceeds in a complementary manner via the second 90 degree type gear 918 to the second pinion 910).

Upon reaching the space 1005 above the first pinion 910, some of that oil is directed to the tapered roller bearings 1003 supporting the 90 degree type gears 916, 918 and the propeller driving output shaft 212 (as well as aft of those components) via a channel 1007. Further, additional amounts of the oil reaching the space 1005 is directed upward to the first gear 902 by way of rotation of the first additional downward shaft 906, due to operation of an Archimedes spiral mechanism 1008 formed between the outer surface of the first additional downward shaft and the inner surface of the passage within which that downward shaft extends, as represented by arrows 1010. Ultimately, due to operation of the Archimedes spiral mechanism 1008, oil is directed upward through the channel of the Archimedes spiral mechanism up to additional channels 1012 linking a region near the top of the Archimedes spiral mechanism with the first gear 902 as represented by arrows 1014. Upon reaching the first gear 902, the oil lubricates that gear and also further lubricates the second gear 904 due to its engagement with the first gear as represented by arrows 1016. Then, some of the oil reaching the first and second gears 902, 904, proceeds downward back to the reservoir portion 1004 by way of further channels 1018 extending downward between the first and second additional downward shafts 906, 908 to the reservoir portion 1004, as represented by arrows 1020.

Although in this example oil reaches the top of the third transmission 616 and particularly both of the first and second gears 902, 904 via the Archimedes spiral mechanism 1008 associated with the first additional downward shaft 906, such operation presumes that the first additional downward shaft is rotating in a first direction tending to cause such upward movement of the oil. However, this need not always be the case, since the outboard motor 104 can potentially be operated in reverse. Given this to the be the case, an additional Archimedes spiral mechanism 1022 is also formed between the outer surface of the second additional downward shaft 908 and the inner surface of the passage within which that downward shaft extends. Also, additional channels 1024 corresponding to the additional channels 1012 are also formed linking the top of the additional Archimedes spiral mechanism 1022 with the second gear 904. Given the existence of the additional Archimedes spiral mechanism 1022 and the additional channels 1024, when the direction of operation of the outboard motor 104 is reversed from the manner of operation shown in FIG. 10A, oil proceeds upward from the reservoir portion 1004 via the second 90 degree type gear 918, the second pinion 912, an additional space 1023 above the second pinion 912 (corresponding to the space 1005), the additional Archimedes spiral mechanism 1022, and the additional channels 1024 to the second gear 904 and ultimately the first gear 902 as well (after which the oil then again proceeds back down to the reservoir portion via the further channels 1018). Thus, oil reaches the first and second gears 902 and 904 and the entire third transmission 616 is lubricated regardless of the direction of operation of the outboard motor 104.

Finally, it should also be noted that, assuming a given direction of operation of the outboard motor 104, while oil proceeds upward to the first and second gears 102, 104 via one of the Archimedes spiral mechanism 1008, 1022, it should not be assumed that the other of the Archimedes spiral mechanism 1022, 1008 is not operating in any manner. Rather, whenever one of the Archimedes spiral mechanisms 1008, 1022 is tending to direct oil upward, the other of the Archimedes spiral mechanisms 1022, 1008 is tending to direct at least some of the oil reaching it back down to that one of the pinions 910, 912 and then ultimately to the reservoir portion 1004 as well (via the corresponding one of the 90 degree type gears 916, 918). Thus, in the example of FIG. 10A showing oil to be provided upward due to operation of the Archimedes spiral mechanism 1008, it should also be understood that at least some of the oil reaching the second gear 904, rather than being direct downward back to the reservoir portion 1004 via the further channels 1018, instead proceeds back down to the reservoir portion via the additional Archimedes spiral mechanism 1022, which in this case would tend to be directing oil downward. Alternatively, if the outboard motor 104 was operating in the reverse manner and oil was directed upward via the additional Archimedes spiral mechanism 1022, then the Archimedes spiral mechanism 1008 would tend to direct at least some of the oil reaching it via the first gear 902 back down to the reservoir portion 1004 as well.

As already noted, FIG. 10A also shows several cooling system components of the lower portion 122 of the outboard motor 104. In the present embodiment, coolant for the outboard motor 104 and particularly the engine 504 is provided in the form of some of the water 101 within which the marine vessel assembly 100 is situated. More particularly, FIG. 10A shows that the outboard motor 104 receives/intakes into a coolant chamber 1028 within the lower portion 122 some of the water 101 (see FIG. 1) via multiple water inlets, namely, the lower water inlet 522 and two of the upper water inlets 524 already mentioned with respect to FIG. 5. As earlier noted, the lower water inlet 522 is positioned along the bottom of the gear casing 206, near the front of that casing forward of the fin 210, and the water 101 proceeds into the coolant chamber 1028 via the lower water inlet generally in a direction indicated by a dashed arrow 1030. It should further be noted from FIG. 10A that an oil drain screw 1031 allowing for draining of oil from the reservoir portion 1004/third transmission 616 extends forward from the third transmission toward the lower water inlet 522, from which it can be accessed and removed so as to allow oil to drain from the third transmission even though the oil drain screw is still located interiorly within the outer housing wall of the outboard motor 104. Such positioning of the oil drain screw 1031 is advantageous because, in contrast to some conventional arrangements, the oil drain screw does not protrude outward beyond the outer housing wall of the outboard motor 104 and thus does not create turbulence or drag as the outboard motor passes through the water and also does not as easily corrode over time due to water exposure.

In contrast to the lower water inlet 522, the upper water inlets 524 are respectively positioned midway along the left and right sides of the lower portion 122 (particularly along the sides of a strut portion of the lower portion linking the top of the lower portion with the torpedo-shaped gear casing portion at the bottom), and the water 101 proceeds into the coolant chamber 1028 via these inlets in a direction generally indicated by a dashed arrow 1032. It should be understood that, as a cross-sectional view from the right side of the lower portion 122, FIG. 10A particularly shows the left one of the upper water inlets 524, while the right one of the upper water inlets (along the right side of the lower portion 122) is shown instead in FIG. 5. More particularly, in the present embodiment, each of the respective left and right ones of the upper water inlets 524 is formed by the combination of a respective one of the cover plates 526 (previously mentioned in FIG. 5) and a respective orifice 528 within the respective left or right sidewalls (housing or cowling walls) of the lower portion 122. The respective cover plate 526 of each of the upper water inlets 524 serves to partly, but not entirely, cover over the corresponding one of the respective orifices 528, so as to direct water flow into the coolant chamber 1028 via the respective one of the upper water inlets in a front-to-rear manner as illustrated by the dashed arrow 1032. The cover plates 526 can be attached to the sidewalls of the lower portion 122 in a variety of manners, including by way of bolts or other fasteners, or by way of a snap fit.

Upon water being received into the coolant chamber 1028 via the lower and upper water inlets 522, 524, water then proceeds in a generally upward direction as indicated by an arrow 1029 toward the mid portion 120 (and ultimately to the upper portion 118) of the outboard motor 104 for cooling of other components of the outboard motor including the engine 504 as discussed further below. It should be further noted that, given the proximity of the coolant chamber 1028 adjacent to (forward of) the third transmission 616, cooling of the oil and third transmission components (including even the gears 902, 904) can be achieved due to the entry of coolant into the coolant chamber. Eventually, after being used to cool engine components in the mid portion 120 and upper portion 118 of the outboard motor 104, the cooling water is returned back down to the lower portion 122 at the rear of the lower portion, where it is received within a cavity 1033 within a cavitation plate 1034 along the top of the lower portion, and is directed out of the outboard motor via one or more orifices leading to the outside (not shown). It should be further noted that FIG. 10A, in addition to showing the cavity 1033, also shows the cavitation plate 1034 to support thereon a sacrificial anode 1036 that operates to alleviate corrosion occurring due to the proximity of the propeller 130 (not shown), which can be made of brass or stainless steel, to the lower portion 122/gear casing 206, which can be made of Aluminum.

Although in the present embodiment the cover plates 526 allow water flow in through the respective orifices 528 into the coolant chamber 1028, and additionally water flow is allowed in through the lower water inlet 522 as well, this need not be the case in all embodiments or circumstances. Indeed, it is envisioned that, in at least some embodiments, a manufacturer or operator can adjust whether any one or more of these water inlets do in fact allow water to enter the outboard motor 104 as well as the manner(s) in which water flow into the coolant chamber 1028 is allowed. This can be achieved in a variety of manners. For example, rather than employing the cover plates 526, in other embodiments or circumstances other cover plates can be used to achieve a different manner of water flow into the orifices 528 of the upper water inlets 524, or to entirely preclude water flow into the coolant chamber 1028 via the orifices (e.g., by entirely blocking over covering over the orifices). Likewise, a cover plate can be placed over the lower water inlet 522 (or the orifice formed thereby) that would partly or entirely block, or otherwise alter the manner of, water flow into the coolant chamber 1028.

Adjustment of the lower and upper water flow inlets 522, 524 in these types of manners can be advantageous in a variety of respects. For example, in some implementations or operational circumstances, the outboard motor 104 will not extend very deeply into the water 101 (e.g., because the water is shallow) and, in such cases, it can be desirable to close off the upper water flow inlets 524 so that air cannot enter into coolant chamber 1028 if the upper water flow inlets happen to be positioned continuously above or occasionally exposed above the water line 128, for example, if the water line is only at about a mid strut level 1038 as shown in FIG. 5 or even lower, further for example, at a level 1040 (which can be considered the water line or water surface for on plane speed for surfacing propellers). Alternatively, in some implementations or operational circumstances, the outboard motor 104 will extend deeply into the water, such that the water line could be at a high level 1042 (which can be considered the water line or water surface for on plane speeds for submerged propellers) above the upper water flow inlets 524. In such cases, it would potentially be desirable to have all of the lower and upper water flow inlets 522, 524 configured to allow for entry of the water 101 into the coolant chamber 1028.

Yet in still other circumstances, even with the outboard motor 104 extending deeply into the water, it can be desirable for the upper water flow inlets 524 to be configured to allow water entry therethrough and yet to block water entry via the lower water flow inlet 522, for example, if the bottom of the lower portion 122 is nearing the bottom of the body of water in which the marine vessel assembly 100 is traveling, such that dirt or other contaminants are likely to enter into the coolant chamber 1028 along with water entering via the lower water flow inlet 522 (but such dirt/contaminants are less likely to be present at the higher level of the upper water flow inlets 524). It is often, if not typically, the case that one or more of the lower and upper water flow inlets 522, 524 will be partly or completely blocked or modified by the influence of one or more cover plates, to adjust for operational circumstances or for other reasons.

Referring still to FIG. 10A, in addition to the aforementioned cooling system components, also shown are several components of the outboard motor 104 that are associated with the exhaust system. In particular, as discussed above and discussed further below, exhaust produced by the engine and delivered via the exhaust channels 512 (as shown in FIG. 5), depending upon the circumstance or embodiment, primarily or entirely directed to the lower portion 122 and into an exhaust cavity 1044 that is positioned generally aft relative to the components of the third transmission 616 (e.g., aft of the first and second gears 902, 904 and first and second pinions 910, 912), generally in a direction indicated by an arrow 1048. The exhaust cavity 1044 opens directly to the rear gear casing 206. To show more clearly the manner in which the exhaust cavity 1044 is in communication with the exterior of the outboard motor 104 (e.g., to the water 101), further FIG. 10B is provided that shows a rear elevation view 1050 of the gear casing 206 of the lower portion 122, cutaway from the remainder of the lower portion. For comparison purposes, a diameter 1052 of the gear casing 206 of FIG. 10B corresponds to a distance 1054 between lines 1056 and 1058 of FIG. 10A.

More particularly as shown in FIG. 10B, exhaust from the exhaust cavity 1044 particularly is able to exit the outboard motor 104 via any and all of four quarter section orifices 1060 (which together make up the orifice 302 of FIG. 3) surrounding the propeller driving output shaft 212 and respectively extending circumferentially around that output shaft between respective pairs of webs 1062 extending radially inward toward the crankshaft from a surrounding wall 1064 of the lower portion 122. Given the particular relationship between the cross-sectional view of FIG. 10A and the rear elevation view of FIG. 10B, two of the webs 1062 are also shown in FIG. 1 OA extending radially upward and downward from the propeller driving output shaft 212 to the surrounding wall 1064 of the lower portion 122. As shown, the webs 1062 also extend axially along the propeller driving output shaft 212 and along the surrounding wall 1064. It can further be noted that, in the present embodiment, a bore 1066 extends between the cavity 1033 that receives cooling water and the exhaust cavity 1044, which allows some amount of excess cooling water within the cavity 1033 to drain out of outboard motor 104 via the exhaust cavity 1044 and quarter section orifices 1060/orifice 302 (although this manner of draining coolant is not at all the primary manner by which coolant exits the outboard motor). It should be noted that such interaction with coolant, and in other locations where the coolant system interacts with the exhaust system, helps to cool the exhaust in a desirable manner.

Figure 11A:
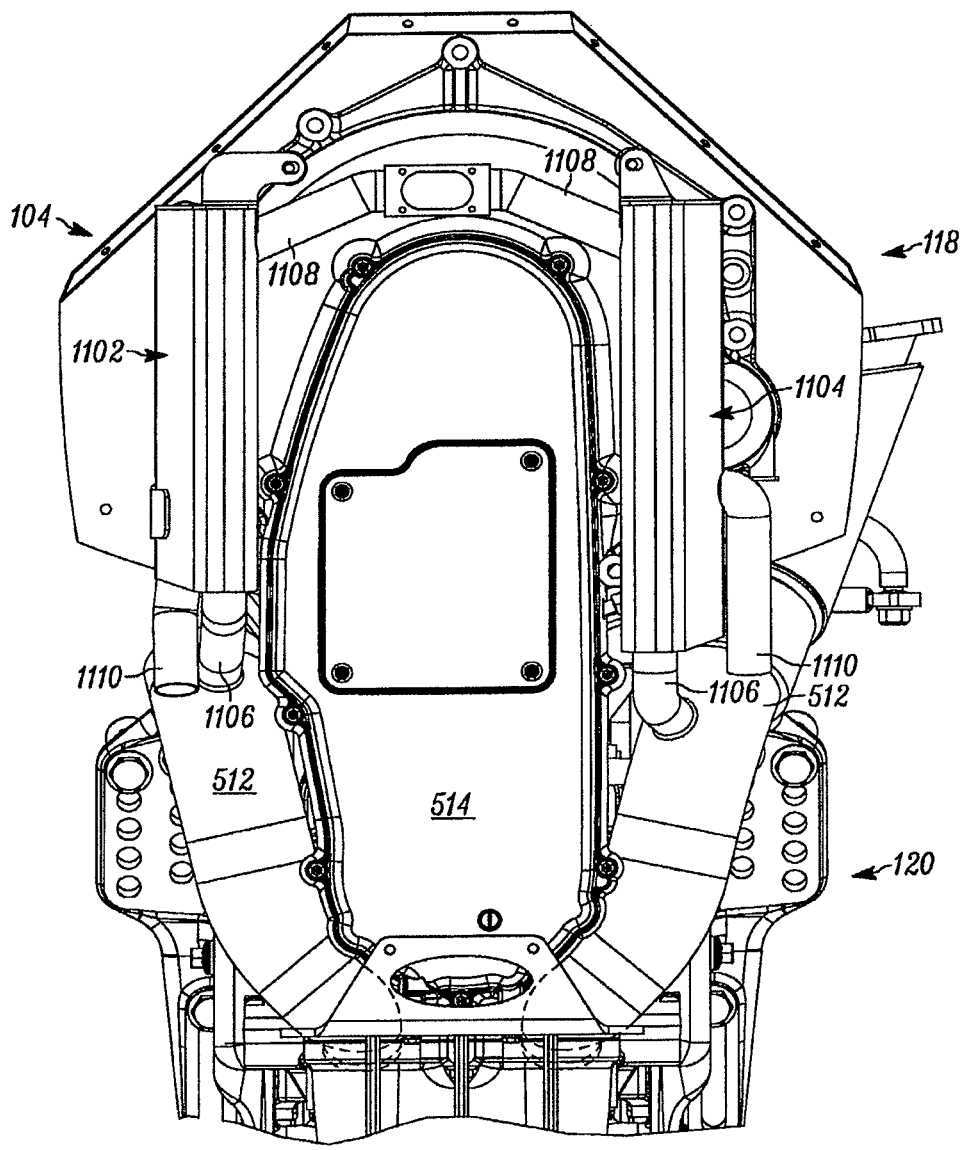
FIG. 11A is a rear elevation view of upper and mid portions of the outboard motor of FIGS. 1-3, 5, 6A and 10A-10B, shown with the cowling of the outboard motor removed to reveal internal components of the outboard motor including exhaust system components.

Turning next to FIG. 11A, several other components of the exhaust system of the outboard motor 104 are shown in additional detail by way of an additional rear elevation view of the upper portion 118 and mid portion 120 of the outboard motor, shown with the cowling 200 removed, and shown in cutaway so as to exclude the lower portion 122 of the outboard motor. In particular as shown, the exhaust conduits 512 receiving exhaust from the exhaust manifolds 510 along the right and left sides of the engine 504 (see also FIG. 5) are shown extending downward toward the lower portion 122 and the exhaust cavity 1044 described with respect to FIG. 10A. As illustrated, the exhaust conduits 512 particularly direct hot exhaust along the port and starboard sides of the outboard motor 104, so as to reduce or minimize heat transfer from the hot exhaust to internal components or materials (e.g., oil) that desirably should be or remain cool.

Exhaust from the engine 504 is primarily directed by the exhaust conduits 512 to the exhaust cavity 1044 since exhaust directed out of the outboard motor 104 via the orifice 302 proximate the propeller 130 (not shown) is typically (or at least often) innocuous during operation of the outboard motor 104 and the marine vessel assembly 100 of which it is a part. Nevertheless, there are circumstances (or marine vessel applications or embodiments) in which it is desirable to allow some exhaust (or even possibly much or all of the engine exhaust) to exit the outboard motor 104 to the air/atmosphere. In this regard, and as already noted with respect to FIGS. 2 and 3, in the present embodiment the outboard motor 104 is equipped to allow at least some exhaust to exit the outboard motor via the exhaust bypass outlets 204. More particularly, in the present embodiment, at least some exhaust from the engine 504 proceeding through the exhaust conduits 512 is able to leave the exhaust conduits and proceed out via the exhaust bypass outlets 204. So that exhaust exiting the outboard motor 104 in this manner is not overly noisy, further in the present embodiment such exhaust proceeds only indirectly from the exhaust conduits to the exhaust bypass outlets 204, by way of a pair of left side and right side mufflers 1102 and 1104, respectively, which are arranged on opposite sides of the transfer case 514 aft of the engine 504 within which is positioned the first transmission 606.

Further as shown in FIG. 11A, each of the left side muffler 1102 and right side muffler is coupled to a respective one of the exhaust conduits 512 by way of a respective input channel 1106. Each of the mufflers 1102, 1104 then muffles/diminishes the sound associated with the received exhaust, by way of any of a variety of conventional muffler internal chamber arrangements. Further, in the present embodiment, the left and right side mufflers 1102, 1104 are coupled to one another by way of a crossover passage 1108, by which the sound/air patterns occurring within the two mufflers are blended so as to further diminish the noisiness (and improve the harmoniousness) of those sound/air patterns. As a result of the operations of the mufflers 1102, 1104 individually and in combination (by way of the crossover passage 1108), exhaust output provided from the respective mufflers at respective output ports 1110 is considerably less noisy and less objectionable than it would otherwise be. The exhaust output from the output ports 1110 thus can be provided to the exhaust bypass outlets 204 (again see FIGS. 2 and 3) so as to exit the outboard motor 104.

Figure 11B:
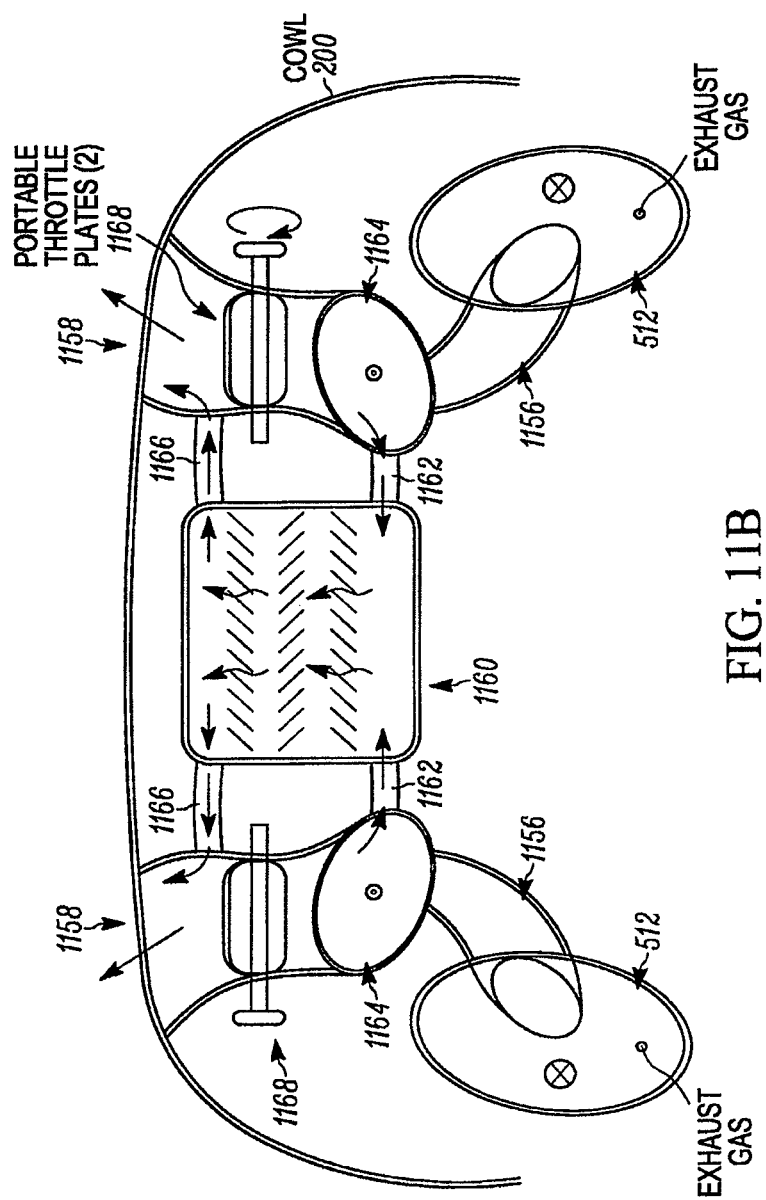
FIG. 11B illustrates various exhaust system components of the outboard motor in additional detail.

Turning to FIG. 11B, features of an alternate exhaust bypass outlet system are illustrated, which can also (or alternatively) be implemented in the outboard motor 104. In this arrangement, again the exhaust conduits 512 are shown through which exhaust flows downward to the lower portion 122 of the outboard motor. Additionally, portions of the input channels 1156 are shown that link the exhaust conduits 512 with bypass outlet orifices 1158 in the cowl 200 of outboard motor. Further as shown, an idle relief muffler 1160 is coupled to each of the input channels 1156 by way of respective intermediate channels 1162 extending between the idle relief muffler and intermediate regions 1164 of the input channels. Exhaust as processed by the idle relief muffler 1160 eventually is returned to the input channels 1156 prior to those input channels 1156 reaching the bypass outlet orifices 1158 by way of respective return channels 1166. Further, to govern the amount of exhaust passing through the input channels 1156 from the exhaust conduits 512 to the bypass outlet orifices 1158, respective rotatable (and controllable) throttle plates 1168 are positioned within the input channels 1156 in between the locations at which the respective intermediate channels 1162 encounter the respective input channels (that is, at the respective intermediate regions 1164) and the locations at which the respective return channels 1166 encounter the respective input channels. As result, the amount of exhaust that leaves the outboard motor via the orifices 1158 can be controlled, and exhaust flow can be permitted, limited, and/or completely precluded.

Figure 12:
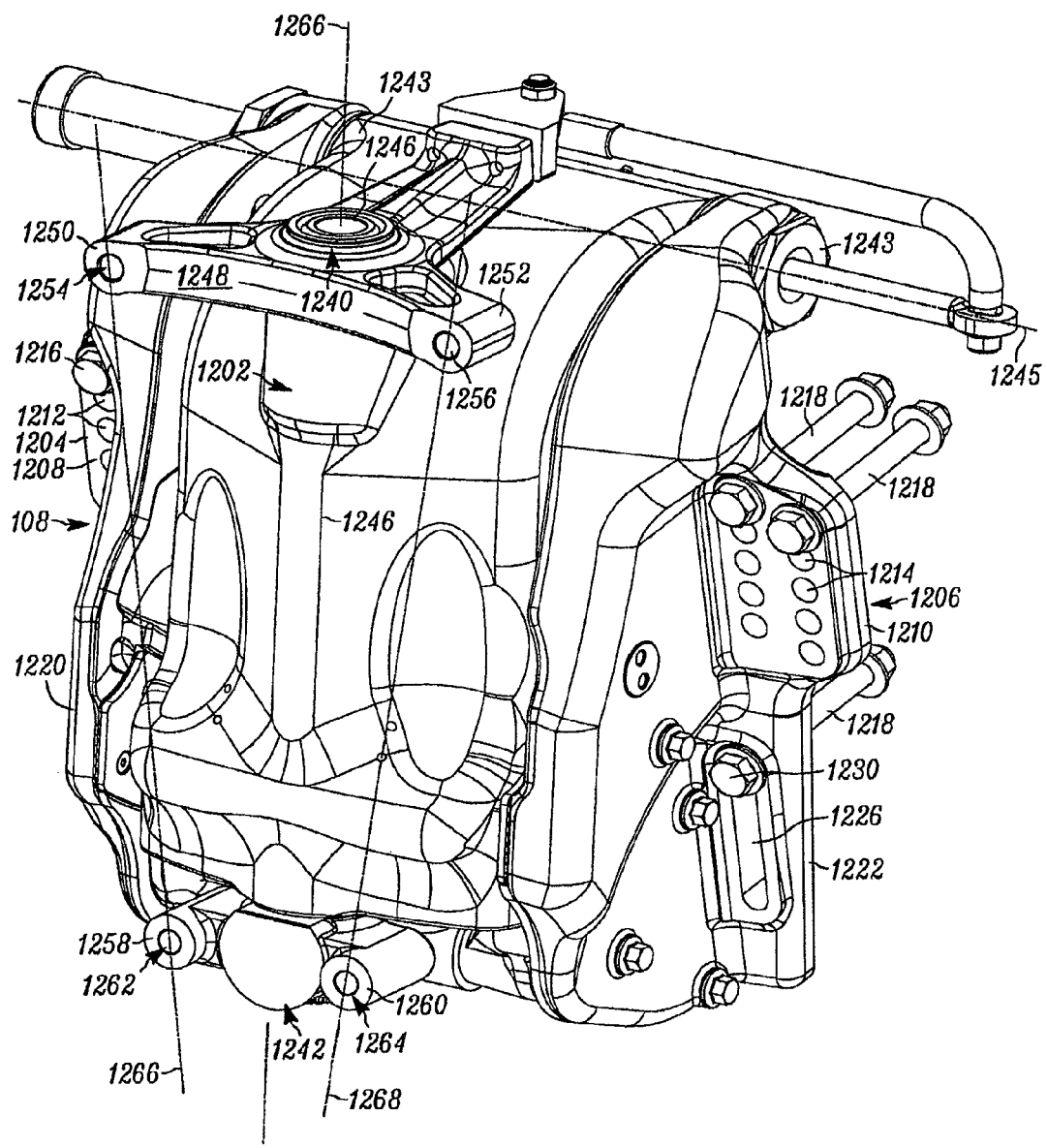
FIG. 12 is an enlarged perspective view of the exemplary mounting system in accordance with embodiments of the present disclosure.
Figure 13:
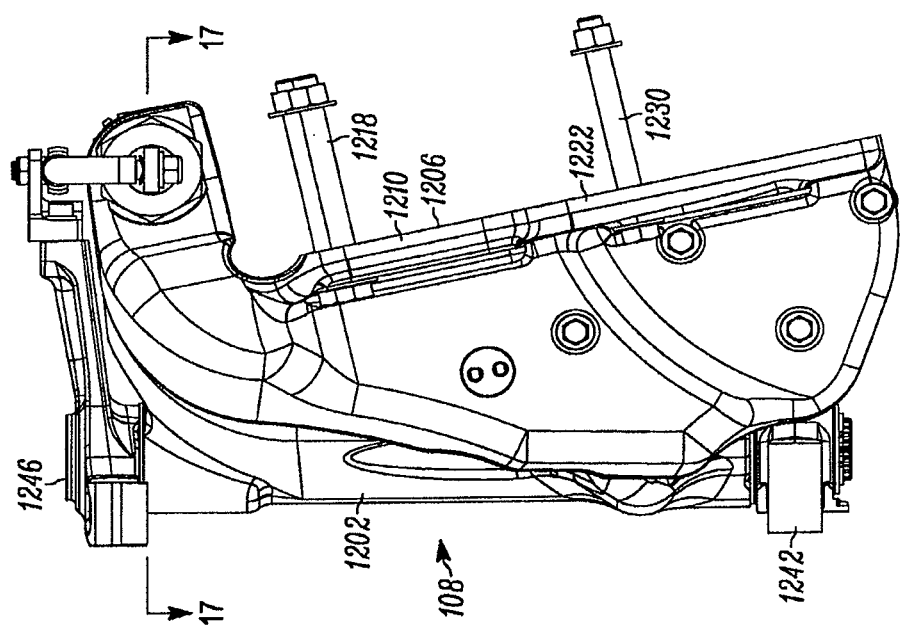
FIG. 13 is an enlarged right side elevational view of the mounting system of FIG. 12.
Figure 14:
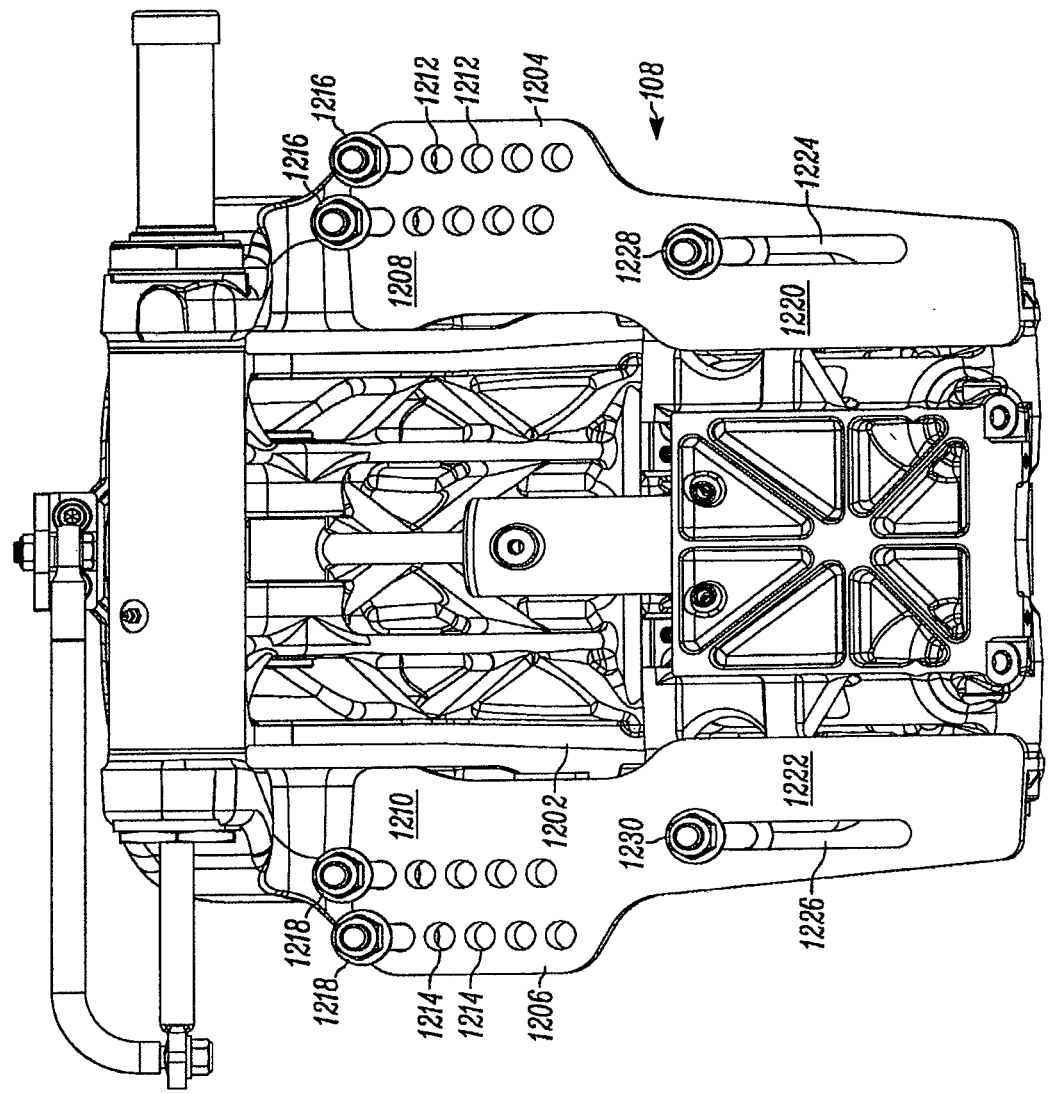
FIG. 14 is an enlarged front view of the mounting system of FIG. 12.

FIGS. 12, 13, and 14 are enlarged perspective, right side elevational, and front views, respectively, of a mounting system 108 in accordance with embodiments of the instant disclosure. Mounting system 108 generally links, or otherwise connects, an outboard motor to a marine vessel (for example, the exemplary outboard motor 104 and the exemplary marine vessel 102 shown and described in FIG. 1). More particularly, the mounting system 108 connects the outboard motor to the rear or transom area of the marine vessel and, in this way, the mounting system can also be termed a "transom mounting system". In accordance with at least some embodiments, mounting system 108 generally includes a swivel bracket structure 1202, which is cast or otherwise formed. Extending from the swivel bracket structure 1202 is a pair of clamp bracket structures 1204, 1206, respectively. In at least some embodiments, the clamp bracket structures 1204, 1206 are generally mirror images of, and thus are symmetric with respect to, one another and in this respect can be said to extend equally, or be equally disposed, with respect to the swivel bracket structure 1202. The clamp bracket structures 1204, 1206 are generally used to secure the mounting system to the marine vessel transom. In accordance with various embodiments, clamp bracket structures 1204, 1206 include respective upper regions 1208, 1210, a plurality of holes 1212, 1214 for receiving connectors or fasteners 1216, 1218. In addition, the clamp bracket structures 1204, 1206 include, respective lower regions 1220, 1222, and slots 1224, 1226, for receiving connectors or fasteners 1228, 1230. Connectors 1216, 1218, 1228, and 1230 are used to affix the clamp bracket structures 1204, 1206, and more generally the mounting system 108 to the marine vessel. Slots 1224 and 1226 provide for additional variability and/or adjustability such mounting by permitting the fasteners to be located in a variety of locations (e.g., higher or lower). Connectors 1216 and 1218 (only a few of which are shown) and 1228 and 1230 can, as shown, take the form of nut-bolt arrangements, but it should be understood that other fasteners are contemplated and can be used. Similarly, with regard to the holes 1212 and 1214, and slots 1224 and 1226, it should be understood that the size, shape, number and precise placement, among other items, can vary.

The swivel bracket structure 1202 further includes a first or upper steering yoke structure 1240, as well as a second or lower steering yoke structure 1242 that are joined by way of a tubular or substantially tubular structure 1246 (also called a steering tube structure). The first yoke structure 1240 includes a first or upper crosspiece mounting structure 1248 that is, in at least some embodiments, centered or substantially centered about the steering tube structure 1246, and the crosspiece mounting structure terminates in a pair of mount portions 1250, 1252 having passages 1254, 1256, respectively, which are used to couple the swivel bracket structure, typically via bolts or other fasteners (not shown), to the outboard engine via upper mounting brackets or motor mounts 520 (FIG. 5). The second or lower yoke structure 1242 similarly includes a pair of mount portions 1258, 1260 having passages 1262, 1264, respectively, which further couple, again typically via bolts or other fasteners (not shown), to the outboard engine, typically via lower mounting brackets or motor mounts 518 (FIG. 5) and as well be described below. A steering axis 1266 extends longitudinally along the center of steering tube structure 1246 and thereby provides an axis of rotation, which in use is typically a vertical or substantially vertical axis of rotation, for the upper and lower steering yoke structures 1240, 1242 and the swivel bracket structure 1202 to which they are joined. Swivel bracket structure 1202 is rotatable about a tilt tube structure 1243 having a tilt axis 1245 and thus also relative clamp bracket structures 1206 and 1208. The tilt axis 1245 generally is an axis of rotation or axis of pivot (e.g., permitting tiling and/or trimming about the axis), but for simplicity the axis is generally referred to simply as a tilt axis. When the outboard motor is in use, the tilt axis 1245 is typically a horizontal, or substantially horizontal, axis of rotation.

Figure 15:
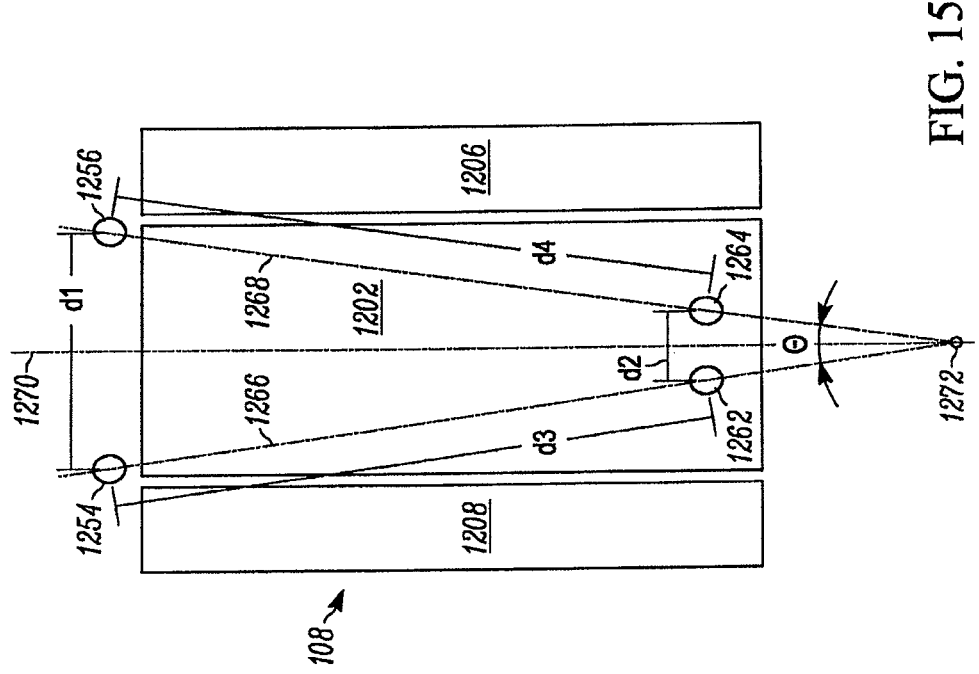
FIG. 15 is a schematic view of the mounting system of FIG. 12 generally illustrating convergence between the upper mounts and the lower mounts.

FIG. 15 is a schematic illustration of the mounting system 108 having the swivel bracket structure 1202 and clamp bracket structures 1206 and 1208. With reference to FIGS. 12 and 15. Passages 1254 and 1256 are separated by a distance "d1" and passages 1262 and 1264 are separated by a distance "d2". Similarly, passages 1254 and 1262 are separated by a distance "d3" and passages 1256 and 1264 are separated by a distance "d4". As can be seen, distance d1 is longer or greater than distance d2. It should be understood that distances d1-d4 referenced here are generally taken from centers of the respective passages which, as shown, are typically cylindrical or substantially cylindrical in shape. More generally, it should be understood that the distance separating the respective upper mounting portions is greater than the distance separating the lower mounting portions. In addition, other shapes for the passages are contemplated and the relative position for establishing the respective distances can vary to convenience. And more generally, connections can be accomplished using other structures besides passages, or external fastening mechanisms, and such modifications are contemplated and considered within the scope of the present disclosure.

An axis 1266 is illustrated to extend between passages 1264 and 1266 and further, and axis 1268, is depicted to extend between passages 1256 and 1264. For illustrative purposes, a center axis 1270 is provided bisecting the distances d1 and d2. As can be seen, by axes 1266 and 1268 converge on axis 1270, as shown, at a point of convergence 1272 located below or beyond yoke structure 1242 and an angle theta is established between these axes. Advantageously, having a distance d1 larger than d2 increases steering stability. More particularly, when the swivel bracket structure 1202 is coupled to a horizontal crankshaft engine of the kind described herein, resultant roll torque is reduced or minimized.

It is noted that while in the instant embodiment both the upper and lower yoke structures include a pair of passages, it should be understood that this can vary but yet still provide for the aforementioned convergence. For example, the lower yoke structure could include only a single mounting portion, with the single mounting portion (which again can include a passage) for mounting the yoke structure to swivel bracket structure located below and between the pair of upper mounting portions of the first or upper steering yoke structure such that the there is a similar convergence from the upper mounting portions to the lower mounting portion. In at least one embodiment the single mount portion would be generally situated, and in at least some instances centered about, the steering axis.

Figure 17:
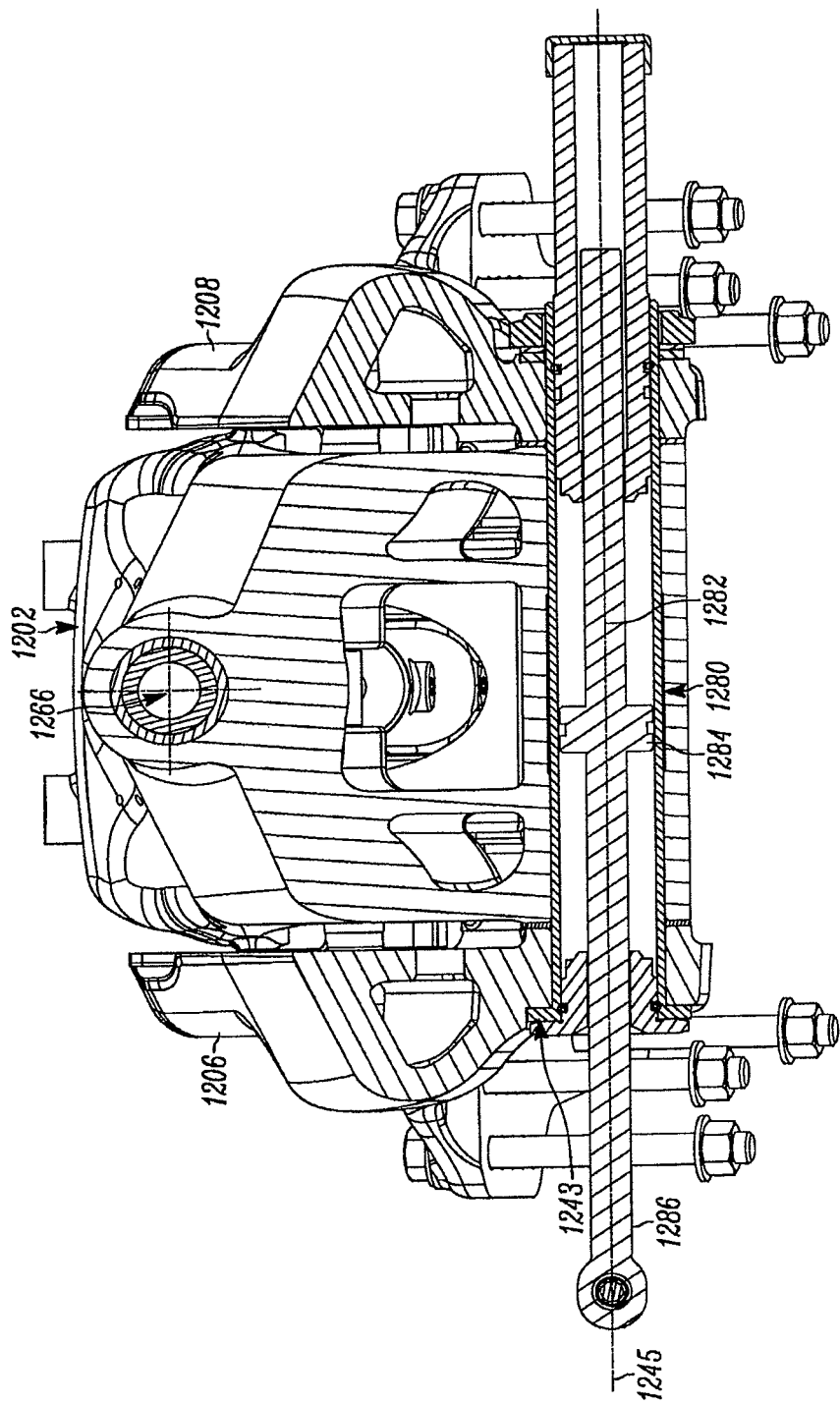
FIG. 17 is a cross sectional view taken along line 17-17 of FIG. 13 and/or through a tilt tube structure of the mounting system of FIG. 12.

Referring to FIG. 16, an enlarged top view of the mounting system 108 of FIG. 12 is shown. FIG. 17 illustrates a cross sectional view of the mounting system of FIG. 12 along or through tilt tube structure 1243. The tilt tube 1243 further provides a housing for a power steering cylinder 1280 having a central axis 1282 that coincides, or substantially coincides, with the tilt axis 1245. The power steering cylinder includes a power steering piston 1284 that translates or otherwise moves within the steering cylinder 1280 in response to power steering fluid (e.g., hydraulic fluid) movement. Actuation of the steering cylinder 1280 provides translation of a steering arm mechanism 1286 to actuate steering of the swivel bracket structure 1202 about the steering axis 1266. Positioning the power steering cylinder inside the tilt tube, the need for additional mounting space for the power steering components is eliminated. Further, such positioning accommodates the scaling of the structures, with the relative trim tube and power steering tube structure size typically related (e.g., based on engine size, vessel sized, etc.).

Several other considerations can be noted in relation to the power steering operation of the outboard motor 104. For example, in accordance with the present embodiment, a tilt tube structure (or, more generally a "tilt structure") surrounds a power steering actuator, the actuator comprising a hydraulic piston. However, it should be understood that, in accordance with alternative embodiments, a variety of actuators can be used, including by way of example, an electronic linear actuator, a ball screw actuator, a gear motor actuator, and a pneumatic actuator, among others. Various actuators can also be employed to control tilting/trimming operation of the outboard motor 104.

It should further be noted that the degree of rotation (e.g., pivoting, trimming, tilting) that can take place about a tilt tube structure axis of rotation (or more generally a "tilt structure axis of rotation") can vary depending upon the embodiment or circumstance. For example, in accordance with at least some embodiments, trimming can typically comprise a rotation of from about −5 degrees from horizontal to 15 degrees from horizontal, while tilting can comprise a greater degree of rotation, for example, from about 15 degrees from horizontal to about 70 degrees from horizontal. Further, it can be noted that, as the power steering structure (or other actuator) size is increased, the tilt tube structure that at least partially surrounds or houses the power steering structure is increased. Such increase in size of the tilt tube structure generally increases the strength of the tilt tube structure. The tilt tube structure can be constructed from steel or other similarly robust material.

Figure 18:
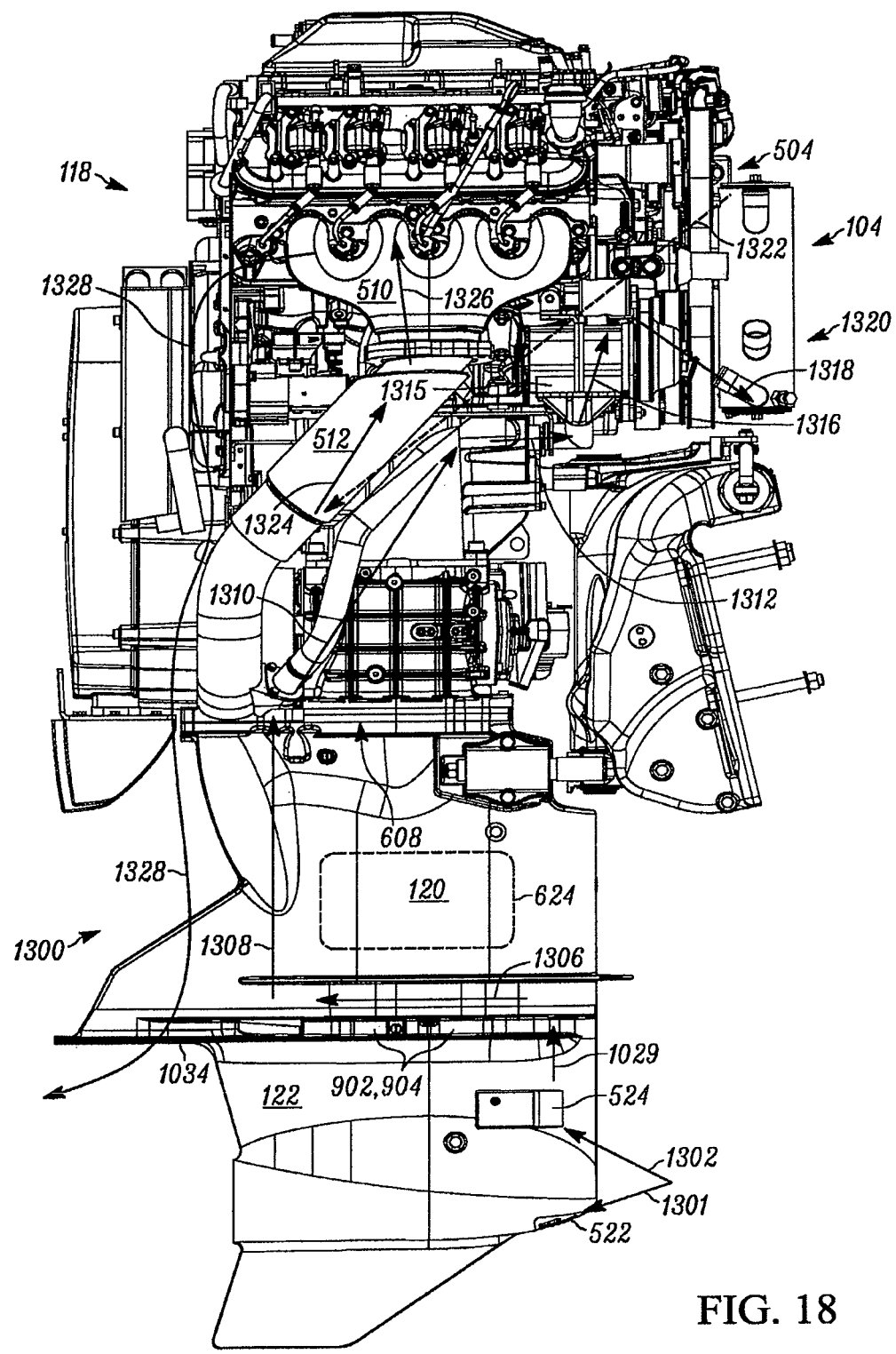
FIG. 18 is a right side view of the outboard motor showing an illustrative outboard motor water cooling system in accordance with embodiments of the present disclosure.

FIG. 18 is a right side view of outboard motor 104 showing an illustrative outboard motor water cooling system 1300 in accordance with various embodiments of the present disclosure. Cooling water flows throughout the motor to cool various components as shown and described, and such cooling water flow is generally represented by various arrows. As previously described in detail with respect to FIG. 10A, the outboard motor 104 receives/intakes, indicated by arrows 1301, 1302 into the lower portion 122 some of the water 101 (see FIG. 1) via multiple water inlets 522, 524, respectively. Cooling water then proceeds generally upwardly, as indicated by an arrow 1029, toward and into the mid portion 120 of the outboard motor 104 to provide a cooling affect. In accordance with at least some embodiments and as shown, cooling water proceeds generally rearwardly and then generally upwardly (e.g., vertically or substantially vertically) as indicated by an arrows 1306 and 1308, respectively, in the mid portion 120 past the second transmission oil reservoir 624 (shown in phantom) and gears 902 and 904 (which can be considered part of the lower portion 122) and thereby cools the oil in the reservoir and the gears.

Cooling water traverses generally upwardly, as indicated by arrow 1310, past, and in so doing cools, the second transmission 608, and into the upper portion 118, which includes the engine 504. More specifically, and in accordance with at least some embodiments, cooling water traverses forwardly, as indicated by arrow 1312 to a water pump 1315 where it proceeds, in the embodiment shown, upwardly, as indicated by arrow 1316. Water that is pumped by the water pump 1315 exits the water pump, after doing so, flows, as indicated by arrow 1318, into and through, so as to cool, an engine heat exchanger and an engine oil cooler, which are generally collectively referenced by numeral 1320. The engine heat exchanger and engine oil cooler 1320 serve to cool a heat exchanger fluid (e.g., glycol, or other fluid) and oil, respectively, within or associated with the engine 504 and at least in these ways accomplish cooling of the engine. A circulation pump circulates the cooled glycol (or other fluid) within the engine 504.

After exiting the engine heat exchanger and engine oil cooler 1320, water flows generally downwardly, toward and into a chamber surrounding the exhaust channels 512 (one of which is shown), as indicated by arrow 1322, where it then flows back upwardly, as indicated by arrows 1324, 1326, into the exhaust manifold 510. It is noted that, while in the chamber (not shown) surrounding the exhaust channels 512, cooling water runs in a direction counter to the direction of exhaust flow so as to cool the exhaust, with such counter flow offering improved cooling (e.g., due to the temperature gradient involved). From the exhaust manifold 510, cooling water flows downwardly, as indicated by arrow 1328, through the mufflers 1102, 1104 and past the first transmission 514 and, in so doing, cools the mufflers and the transmission. Cooling water continues to proceed out of the outboard motor 104 and into the sea, typically via the cavitation plate 1034 along the top of the lower portion 122.

From the above description, it should be apparent that the cooling system in at least some embodiments actually includes multiple cooling systems/subsystems that are particularly (though not necessarily exclusively) suited for use with outboard motors having horizontal crankshaft engines such as the outboard motor 104 with the engine 504. In particular, in at least some embodiments, the outboard motor includes a cooling system having both a closed-loop cooling system (subsystem), for example, a glycol-cooling system of the engine where the glycol is cooled by the heat exchanger. This can be beneficial on several counts, for example, in that the engine need not be as expensive in its design in order to accommodate externally-supplied water (seawater) for its internal cooling (e.g., to limit corrosion, etc.). At the same time, the outboard motor also can include a self-draining cooling system (subsystem) in terms of its intake and use of water (seawater) to provide coolant to the heat exchanger (for cooling the glycol of the closed-loop cooling system) and otherwise, where this cooling system is self-draining in that the water (seawater) eventually passes out of/drains out of the outboard motor 104. Insofar as the engine 504 includes both a closed-cooling system and a self-draining cooling system, the engine includes both a circulation pump for circulating glycol in the former (distinctive for an outboard motor) and a water (e.g., seawater) pump for circulating water in the latter. High circulation velocity is achievable even at low engine speeds. Further by virtue of these cooling systems (subsystems), enhanced engine operation is achievable, for example, in terms of better thermally-optimized combustion chamber operation/better combustion, lower emission signatures, and relative avoidance of hot spots and cold spots.

Many modifications to the above cooling system 1300 (and associated cooling water flow circuit) are contemplated and considered within the scope of the present disclosure. For example, the water pump 135, or an additional water pump, can be provided in the lower portion 122 (e.g., in a lower portion gear case) to pump water from a different location. In addition, and as already noted, various modifications can be made engine components and structures already described herein, including their placement, size, and the like and the above-described cooling system can be modified account for such changes.

Figure 19:
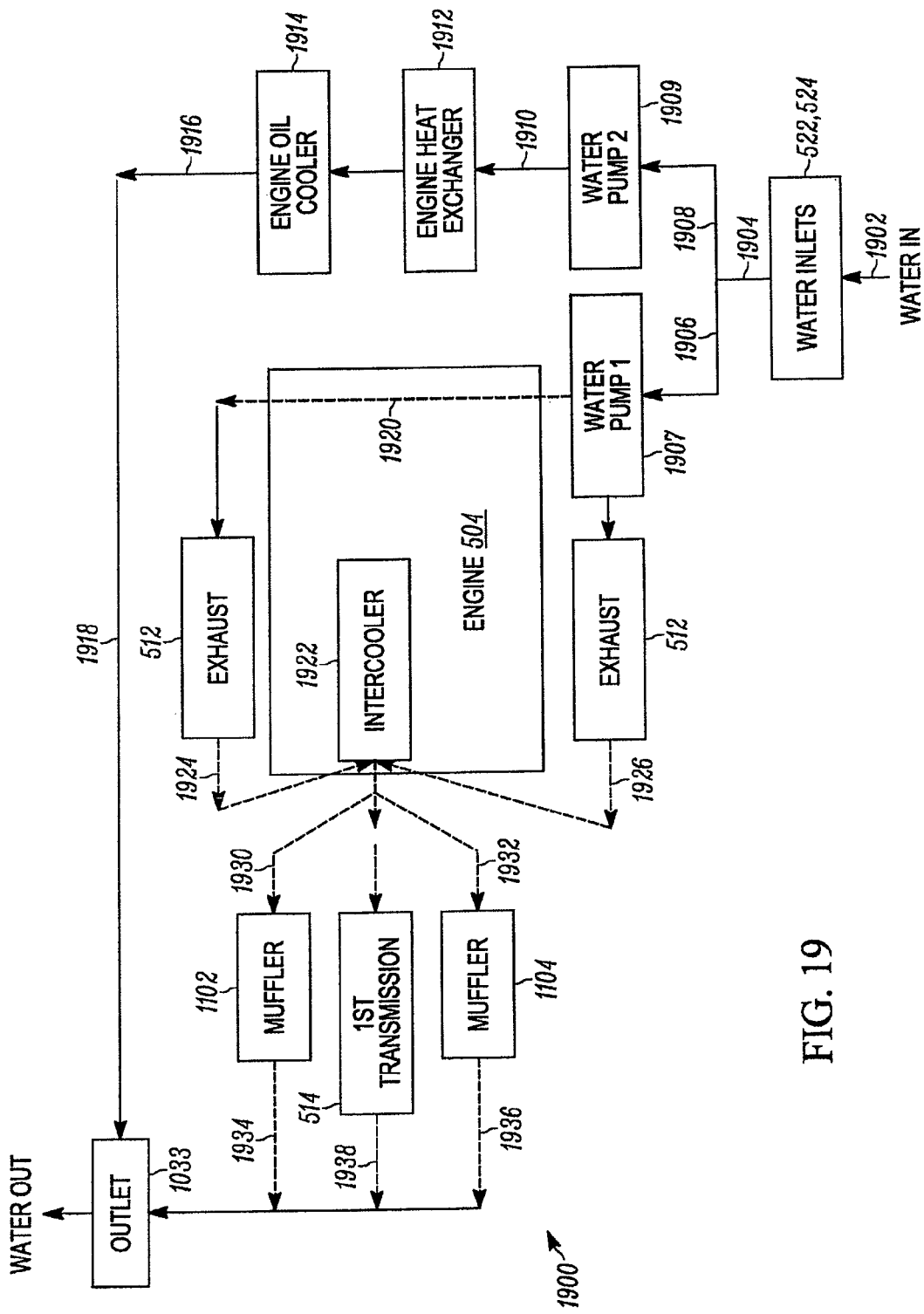
FIG. 19 is a schematic illustration of an alternative arrangement for an outboard motor water cooling system, in accordance with embodiments of the present disclosure.

FIG. 19 is a schematic illustration of an alternative arrangement for an outboard motor water cooling system 1900, in accordance with various embodiments of the present disclosure. In the present illustration, cooling water flow is again represented by various arrows. As shown, cooling water flows, as indicated by arrow 1902, into the water inlets 522, 524. In the instant exemplary embodiment, cooling water flows, as indicated by arrow 1904 and arrows 1906 and 1908, to first and second water pumps 1907, 1909 and, in so doing, cools the pumps. Water that is pumped by the water pump 1907 exits the water pump and, after doing so, flows, as indicated by arrow 1910, into and through an engine heat exchanger 1912 and then an engine oil cooler 1914. While shown as separate coolers, it is understood that the engine heat exchanger 1912 and the engine oil cooler 1914 can be integrated as a collective unit (e.g., as described with regard to FIG. 18). The engine heat exchanger 1912 serves to cool engine coolant (e.g., glycol, or similar fluid), and the engine oil cooler 1914 serves to cool oil, and at least in these ways cooling of the engine 504 is accomplished. After exiting the engine heat exchanger 1912 and engine oil cooler 1914, cooling water flows, as indicated by arrows 1916 and 1918 out to the sea, via a cavity 1033, which can be located within the cavitation plate in the lower portion 122.

In addition to, or in parallel with the cooling of the engine heat exchanger 1912 and the engine oil cooler 1914 as just described, water is pumped by the water pump 1907 and proceeds into a chamber (not shown) surrounding the exhaust channels 512. In so doing cools exhaust flowing within the channels. In at least some embodiments, the cooling water generally traverses, as indicated by 1920, the engine 504, and it is noted that such water flow may, but need not necessarily, serve to provide a cooling effect for the engine. Cooling water then flows to and cools the intercooler 1922 (or charge cooler) as indicated by arrow 1924, 1926. As indicated by arrows 1930, 1932, cooling water flows through the mufflers 1102, 1104, as well as past the first transmission 514, and in so doing, the mufflers and the first transmission are cooled. Finally water proceeds, as indicated by arrows 1934, 1936 from the mufflers 1102, 1104, as well as from the first transmission 514, as indicated by arrow 1938, out of the outboard motor to the sea, for example, via a cavity 1033.

Again, it is noted that many modifications to the above cooling systems are contemplated and considered within the scope of the present disclosure. For example, cooling of the intercooler 1922 can be separated from the cooling of the exhaust channels, the mufflers and the first transmission. An additional water pump and an additional heat exchanger (e.g., a dedicated heat exchanger) can be provided to accomplish such separated cooling of the intercooler 1922 (and associated cooling passages), allowing for the intercooler utilize a lighter fluid, such as glycol. Again, various modifications can be made engine components and structures already described herein, including respective placement, size, and the like and the above-described cooling system 1900 can be modified account for such changes.

Figure 20:
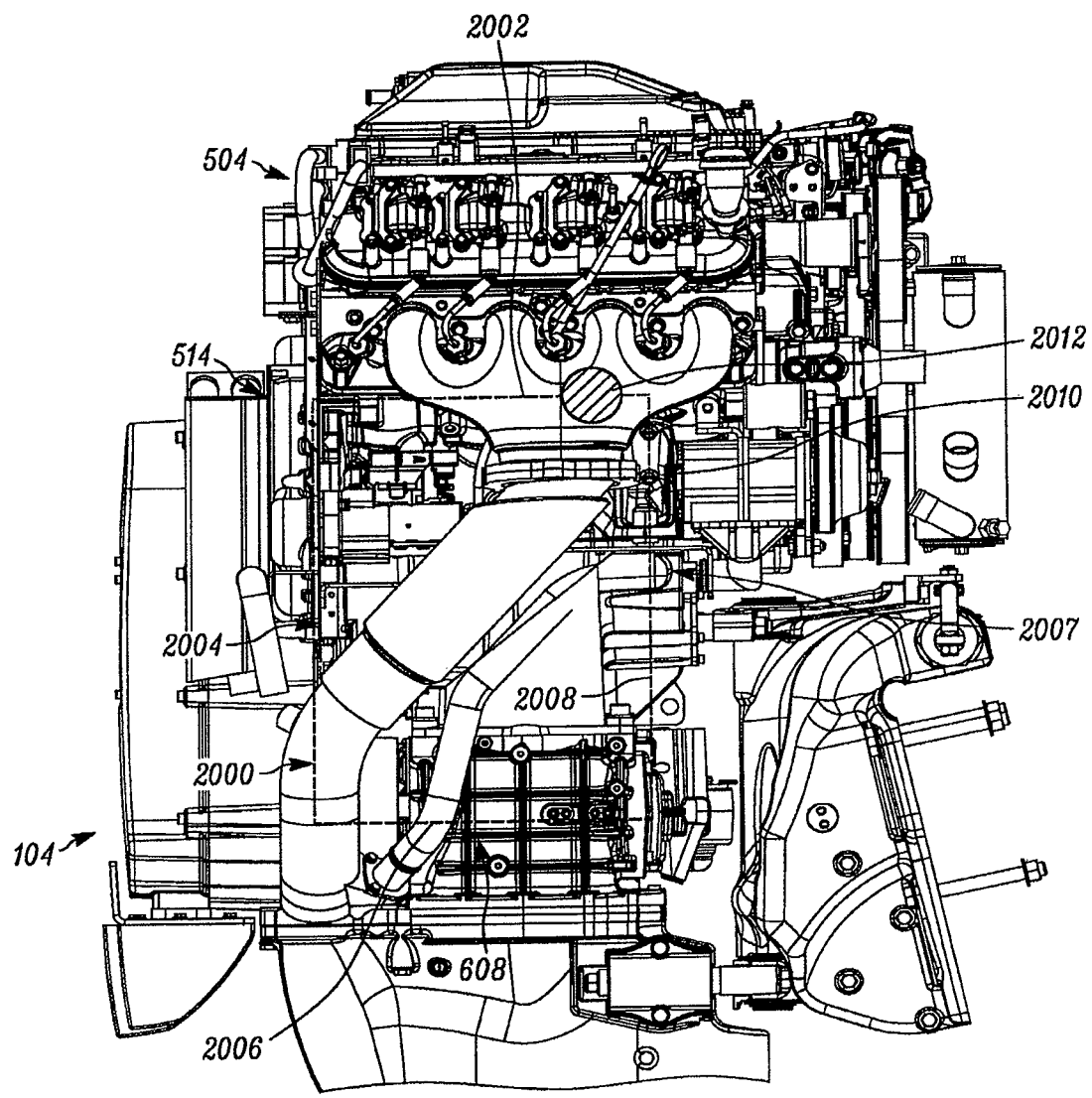
FIG. 20 is a right side view of the outboard motor including a rigid connection of multiple motor components or structures to create a rigid structure in accordance with embodiments of the present disclosure.

FIG. 20 is a right side view of the outboard motor 104 including a rigid connection of multiple motor components or structures to create a rigid structure or rigid body structure, indicated by dashed line 2000, and related method of assembly of the rigid structure, is shown in accordance with embodiments of the invention. The outboard motor can include a horizontal crankshaft engine 504. The engine 504 (or a surface or portion of the engine), can be bolted or otherwise connected to the first transmission 514 (or a surface or portion of the first transmission). The engine 504 is oriented horizontally, or substantially horizontally, and a horizontal plane representative of such orientation is indicated illustratively by horizontal dashed line 2002. The first transmission 514 is oriented vertically, or substantially vertically, and a vertical plane representative of such orientation is indicated illustratively by vertical dashed line 2004. The first transmission 514 (or a surface or portion of the first transmission) can be bolted or otherwise connected to the second transmission 608 (or a surface or portion of the second transmission). The second transmission 608 is oriented horizontally, or substantially horizontally, and a horizontal plane representative of such orientation is indicated illustratively by horizontal dashed line 2006. And the second transmission 608 (or a surface or portion of the second transmission, such as a cover portion) can be bolted or otherwise connected to the engine 504 (or a surface or portion of the engine) by way of a vertically oriented additional structure 2007, which can take the form of, for example, a cast motor structure or frame portion. A vertical, or substantially vertical, plane representative of such orientation is indicated illustratively by vertical dashed line 2008.

Rigid body structure 2000 thus is created by the interaction of these four structures engaged with one another. In accordance with at least one aspect and in the present illustrated embodiment, rigid body structure 2000 is rectangular or substantially rectangular in shape. Fastener 2010 is provided. Fastener 2010 permits adjustability needed (e.g., due to manufacturing tolerances and other variations) in the assembly of rigid body structure 2000 and particularly allows for variation in the spacing between the forwardmost portion of the engine and the forward most portion of the second transmission, that is, the spacing afforded by the additional structure 2007. In accordance with at least some embodiments, the center of gravity 2012 of the outboard motor 504 is located between the vertical (or substantially vertical) planes 2008 and 2004 of the rigid body structure 2000 and substantially at the plane 2002 of the engine 504. Creation and position of the rigid body structure 2000 in accordance with embodiments of the invention, including those which are illustrated, is particularly beneficial in that it offers resistance to bending and torsional moments (or similar stresses) which may result during operation of the outboard motor 504.

FIG. 21 is a reduced right side view of the outboard motor 104 and a mounting system 108, the mounting system being used to mount the outboard motor to a marine vessel as previously described. FIG. 22 is a schematic cross sectional view, taken along line 22-22 of FIG. 21, showing a progressive mounting assembly 2200. FIG. 22 shows the lower steering yoke structure 1242 mounted or otherwise connected to the lower mounting bracket structure 518 by way of bolts or other fasteners 2201 so that the mid portion 120 of the outboard motor 104 is linked to the mounting system 108. Also shown is steering tube structure 1246 which provides, as already described, for rotation of the mounting system 108 about the steering axis. A thrust mount structure 2202 is further provided between the mid portion 120 and the lower steering yoke structure 1246. Taken together, it can be seen that the progressive mounting assembly includes the lower steering yoke structure 1242, the lower mounting bracket structure 518, and the thrust mount structure 2202, FIGS. 23A-C are schematic illustrations depicting the progressive nature of the progressive mounting structure 2200 of FIG. 21 at various levels of operation. With references to FIG. 23A in particular, along with FIGS. 21 and 22, the progressive mounting structure 2200 is shown at an operational level having a low load (e.g., the motor 504 powers the marine vessel 102 at a slow or very slow speed) powering a watercraft. Accordingly, thrust mount structure 2202, which is disposed relative to, and possibly directly contacting motor mid portion 120, but with a space or air gap separating the thrust mount structure 2202 from the lower yoke assembly 1242.

With references to FIG. 23B in particular, along with FIGS. 21 and 22, the progressive mounting structure 2200 is shown at an operational level having a medium load (e.g., the motor 504 powers the marine vessel 102 at a medium or mid level speed). Accordingly, thrust mount structure 2202, which is disposed relative to, and possibly directly contacting motor mid portion 120, now contacts the lower yoke assembly 1242. That is, the thrust mount structure 2202 has moved relative the lower yoke assembly 1242 (e.g., such relative movement is permitted by way of the fasteners 2201), and the space or air gap previously separating the thrust mount structure 2202 from the lower yoke assembly 1242 is eliminated.

With references to FIG. 23C in particular, along with FIGS. 21 and 22, the progressive mounting structure 2200 is shown at an operational level having a high load (e.g., the motor 504 powers the marine vessel 102 at a high speed). Accordingly, thrust mount structure 2202, which is disposed relative to, and possibly directly contacting motor mid portion 120. The space or air gap previously separating the thrust mount structure 2202 from the lower yoke assembly 1242 is eliminated and the thrust mount structure 2202 contacts the lower yoke assembly 1242. The thrust mount structure 2202 is shown in a deformed state because it now serves to transfer force created by the high level of operation.

It should be understood that the aforementioned progressive mounting system previously described is illustrative in nature and various alternatives and modifications to the progressive mounting system can be made. Also, the progressive mounting structure facilitates changes to the thrust mount structure. For example, a thrust mount structure can, with relative ease, be removed and replaced with another thrust mount having different characteristics, such as a different size, shape or stiffness. Advantageously, the progressive mounting system is capable of being tuned or changed to accommodate a wide range (from very low to very high) of thrust placed on the system in a manner that is compact and suitable for a wide variety of outboard motor mounting applications.

Figure 24:
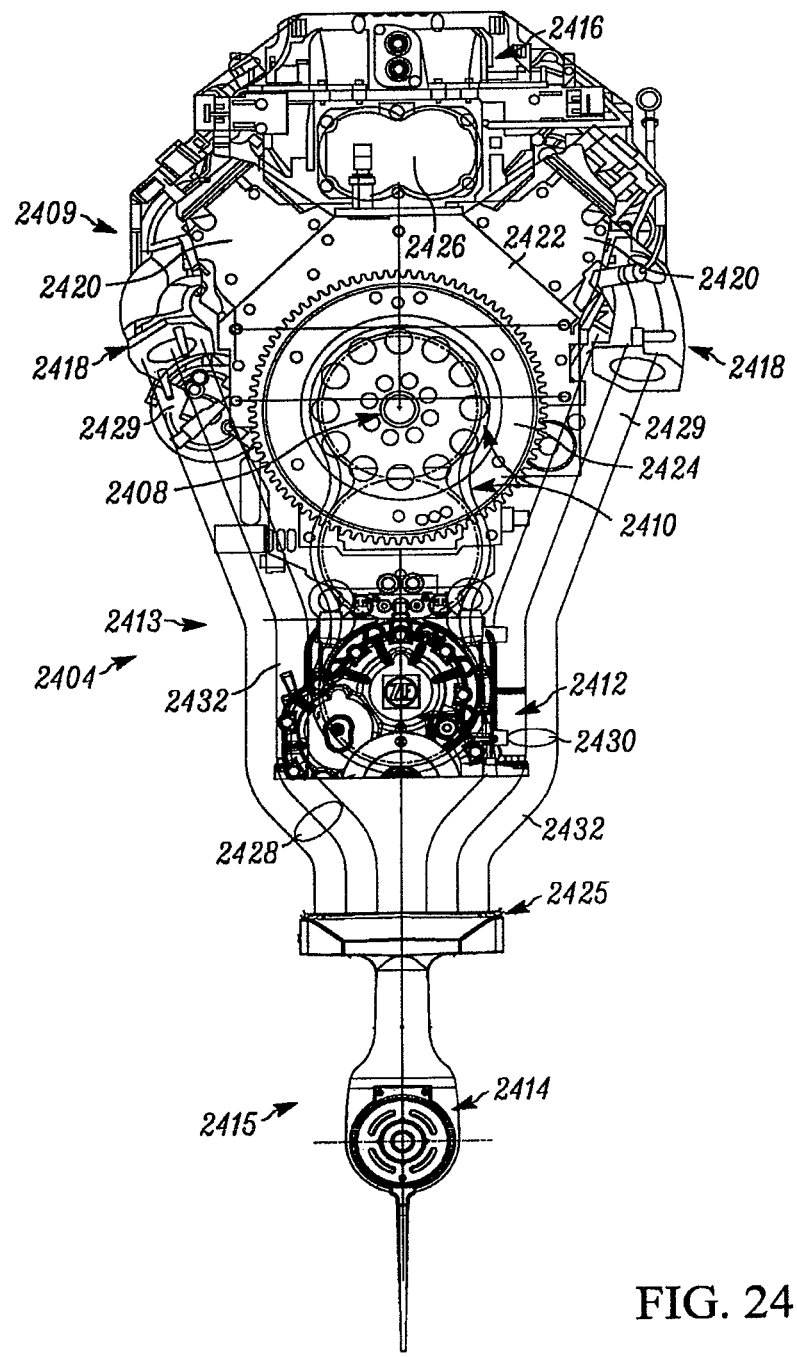
FIG. 24 is a rear elevation view of example structural support components and other components of an alternate embodiment of the outboard motor.

From the above discussion, it should be apparent that numerous embodiments, configurations, arrangements, manners of operation, and other aspects and features of outboard motors and marine vessels employing outboard motors are intended to be encompassed within the present invention. Referring particularly to FIG. 24, a rear elevation view is provided of internal components one alternate embodiment of an outboard motor 2404. In this embodiment, as with the outboard motor 104, there is a horizontal crankshaft engine 2406 with a rearwardly-extending crankshaft extending along a crankshaft axis 2408 at an upper portion 2409 of the outboard motor, a first transmission having an outer perimeter 2410, a second transmission 2412 within a mid portion 2413 of the outboard motor, and a third transmission 2414 at a lower portion 2415 of the outboard motor. Also, there is an intake manifold 2416 atop the engine 2406, exhaust manifold ports 2418 extending outward from port and starboard sides of the engine, and both cylinder heads 2420 of the engine and an engine block 2422 of the engine are visible, as is a flywheel 2424 mounted adjacent the rear of the engine. A gearcase mounting flange 2425 is further illustrated that can be understood as dividing the lower portion 2415 from the mid portion 2413, albeit it can also be understood as within the lower portion only. Further, in this embodiment, a supercharger 2426 is positioned above the engine block 2422 between the cylinder heads 2420. Although not shown, in still another embodiment a turbocharger can instead be positioned at the location of the supercharger 2426 or, further alternatively, one or more turbochargers can be positioned at locations 2429 beneath the manifold ports 2418.

Although in the embodiment of FIG. 24, port and starboard tubular exhaust conduits 2428 and 2430 extend downward (similar to the exhaust conduits of the engine 104) from the exhaust manifold ports 2418 to the lower portion 2415. However, in the embodiment of FIG. 24, the tubular exhaust conduits serve as more than merely conduits for exhaust. Rather, in the embodiment of FIG. 24, the tubular exhaust conduits collectively serve as a tubular mounting frame 2432 for the outboard motor 2404. In particular, the tubular mounting frame 2432 is capable of connecting the upper portion 2409, the mid portion 2413, and lower portion 2415 of the outboard motor 2404 with one another. Further, in still other embodiments, in addition to or instead of conducting exhaust, one or more tubes of such a tubular mounting frame can conduct coolant or other fluids as well.

From the above discussion, it should be understood therefore that the present invention is intended to encompass numerous features, components, characteristics, and outboard motor designs. Among other things, in at least some embodiments, the outboard motors encompassed herein are designed to be fastened to the aft end of a boat or other marine vessel (e.g., the transom) and to power or thrust the marine vessel through the use of a horizontal crankshaft engine. Further, in at least some embodiments, the outboard motors employ an engine that is coupled to a first transmission, a second transmission, and a third transmission, and/or is capable of steering about a steering axis and/or being rotatably trimmed about a trim axis. Further, in at least some embodiments, the outboard motor includes three portions, namely, upper, middle, and lower portions.

Also, in at least some embodiments, the engine is mounted above the transom with the crankshaft centerline substantially horizontal and substantially parallel to a keel longitudinal axis of the boat (parallel to the keel line or other bow-to stern axis) when trimmed to a nominal angle of 0 degrees (the steering axis can be perpendicular a sea level surface). The engine power take off (PTO) faces aft and rotatably drives a first transmission that transfers torque downwardly to a second transmission, which transmits torque through and 90 degree corner and then into a vertical output shaft than can be also be termed a driveshaft. The driveshaft transmits the torque to a third transmission, typically within a gearcase, which directs the torque into a horizontal propeller shaft where a propeller transfers the torque into thrust. The horizontal propeller shaft is typically located at or below the surface of the water so as to enable single or counter-rotating twin propellers. In at least some embodiments, the architecture of the outboard motor is intended to achieve good balance on the transom of the boat/marine vessel, good vibration isolation, and good steering stability across a wide operating speed range.

Additionally, in at least some embodiments, a pivot axis for trimming and tilting the outboard motor is located at the top of the transom, below the crankshaft centerline ahead of the steering axis (as noted above, the engine also is entirely or substantially above the trimming axis). A vertical steering axis is created by the swivel bracket which is constrained at the pivot axis for the trim system by the clamp brackets which are equally disposed to either side of the swivel bracket for securing the outboard to the transom. The outboard motor can be mounted to the swivel bracket with a plurality (e.g., four) rubber mounts attached by the steering head shafting which is rotatably mounted to the swivel bracket. The four rubber mounts create an elastic mounting axis which is designed to be aft of the vertical steering axis. Mountings as described are in the center portion of the outboard, or midsection. Extending the mounting axis upward to the upper portion where the engine is located, the elastic axis will be substantially proximal to the engine mounting positions which are located on opposite sides of the engine block proximal the midline of the crankshaft which is also proximate the vertical plane which contains the center of gravity of the engine whereby the discrete engine center of gravity as a separate component is mounted to the outboard's elastic mounting axis proximate the engines center of gravity. Extending the elastic axis downward to the lower portion, the gearcase, to the intersection of the propshaft centerline, the steering axis will be forward of the elastic axis and the elastic axis will be forward of the gearcase plan view center of pressure. With this architecture steering and vibration stability can be achieved.

Further, a mounting system that generally connects an outboard motor to a marine vessel is described in connection with a wide variety of embodiments. The mounting system accommodates significant thrust resulting from, for example, high power output by the engine during operation. As disclosed and in accordance with a variety of embodiments, the distance separating upper mounts or mounting portions is greater than the distance separating the lower mounts or mounting portions (or in the case of a single lower mount, the single lower mount or mounting portion is between and below the upper mounting portions). Such upper mount structure "spread" results in increased steering stability. In at least some further embodiments, an additional mounting structure (e.g., a thrust mount) can be included below the upper mount structure (e.g., yoke structure) for additional engagement with the outboard motor under at least some operating conditions. In such embodiments, there are five (or possibly four, if there is only one lower mount) mounts in the mounting assembly.

Further, in at least some embodiments, the engine is mounted to a tubular assembly which provides mountings for the engine, first, second and third transmissions, and the elastic mounts. The tubular structure can be constructed in such a way as to utilize the rear tubular segments as exhaust passages thus eliminating extra plumbing within the outboard system. The upper portion of the tubular structure provides a pair of mounting pads, disposed on opposite sides of the longitudinal centerline, which are designed to receive the engine mounts. Further, the upper portion provides a rear engine mounting surface designed to mount to the rear face of the engine to which the first transmission will also fasten. Thus, the rear mounting surface of the tubular structure is a plate that mounts the engine on one side and the first transmission on the other side. This method of mounting located the engines center of gravity as described above as well as providing a third rear mount for additional stability while under operating conditions. Additionally, the middle section of the tubular midsection provides a mounting surface for the second transmission. Below the mounting surface for the second transmission, the midsection provides for an oil sump for the transmission as well as a fuel sump and location for a high pressure fuel pump. Further, the lower section of the midsection provides for the mounting of the third transmission, the gearcase.

Additionally, it least some embodiments, the present invention concerns an outboard motor and/or marine vessel assembly having any one or more of the following features:
1) the center of gravity of the engine is vertically above the crankshaft center line;
2) torque flow: horizontal through engine, downward thru first transmission, forward and downward thru second transmission, downward and rearward thru third transmission;
3) wet clutch mounted in the midsection with a horizontal input and a vertical output;
4) tubular midsection construction;
5) separate oil pumps—dual engine pumps, transmission pump, and gearcase pump;
6) horizontal crankshaft with propeller below and engine vertically above;
7) dry sump with horizontal crankshaft;
8) engine oil proximate the transmission oil, and cooled by sea water;
9) outboard engine with integrated circulation pump and a separate remote circulation pump drive by an accessory belt for raw seawater;
10) air to glycol water cooling of an aluminum intercooler;
11) horizontal crankshaft outboard w/supercharger located in the vee of a vee type engine with the supercharger located below the intake manifold;
12) a horizontal crankshaft outboard engine with at least a turbo charger located in the V of a V-type engine with exhaust manifold also in the V;
13) a horizontal crankshaft engine with turbo chargers disposed on either side of the crankcase;
14) a horizontal crankshaft outboard with a supercharger above crankshaft centerline with an intercooler above crankshaft center line, with an intake manifold inlet above the supercharger;
15) a tubular midsection construction with exhaust conduit integrated as a structural member with the midsection;
16) the above including the combination of a water outlet tube with an exhaust tube;
17) outboard motor with exhaust downwardly toward the propeller and upwardly toward a throttled outlet located above the waterline;
18) closure of exhaust throttle valves opens a third passage for idle relief through an exhaust attenuation circuit;
19) an exhaust throttle valve that actuates a water control circuit for an idle relief muffler;
20) a horizontally disposed inlet to an exhaust system, without a riser, that flows downwardly toward the propeller;
21) outboard engine with accessory drive ahead of the driveshaft centerline;
22) an outboard with accessory drive in front of driveshaft centerline and a transmission behind the driveshaft centerline;
23) an outboard with a flywheel behind driveshaft centerline;
24) flywheel behind an engine, in front of a transmission, above a second transmission, above a third transmission;
25) a horizontal crankshaft outboard in combination with a wet clutch in the second transmission and a counter rotating propeller set;
26) a 90 degree transmission above the gearcase allowing torque to be evenly split between front and rear gears in both forward and reverse rotations to minimize torpedo diameter by eliminating shifting in the gearcase;
27) the above feature where the 90 degree transmission drives a third transmission with 2 input pinions and a single output shaft, and/or the above feature in combination with actively managed exhaust bypass to allow increased reverse thrust;
28) water cooling flow path where the water induced by vacuum water the gearcase, then passes the first transmission, then the second transmission, then the engine oil, to the inlet of a sea pump, where it is pressurized to pass through a heat exchanger, then up to the exhaust manifolds, then downwardly, then mixed with the exhaust and discharged, some with the exhaust and some without;
29) provision for the metering of water into the exhaust stream of the engine for the purpose of cooling but limiting and controlled to reduce the back pressure w/the balance of water discharged outside of the exhaust path;
30) idle relief discharge to be common w/exhaust bypass where the discharge is located downstream of the throttle plate;
31) a hinged cowl system allowing the cowl to be hinged up out of the way without being removed that can also be alternately removed without being hinged up first;
32) a hinged cowl with a mechanical tether to prevent cowl ejection in the event of a strike of an underwater object while at operating speeds;
33) the above feature with the mechanical tether disposed opposite the service access points of the engine.

Among other things, in at least some embodiments, the present invention relates to an outboard motor configured to be mounted on a marine vessel. The outboard motor includes a housing including an upper portion and a lower portion, where at least one output shaft extends outward from the lower portion upon which at least one propeller is supported, and an engine configured to provide first torque at a first shaft extending outward from the engine, the engine being substantially situated within the housing. The outboard motor also includes a first transmission device that is in communication with the first shaft so as to receive the output torque and configured to cause second torque including at least some of the first torque to be communicated to a first location beneath the engine, a second transmission device configured to receive the second torque and to cause third torque including at least some of the second torque to be communicated to a second location beneath the first location within or proximate to the lower portion, a third transmission device positioned within or proximate to the lower portion that is configured to receive the third torque and cause at least some of the third torque to be provided to the at least one output shaft.

Also, in at least some such embodiments, the first shaft is a crankshaft of the engine and extends aftward from the engine along a horizontal or substantially horizontal crankshaft axis, and a center of gravity of the engine is positioned above the horizontal crankshaft axis. Further, in at least some such embodiments, the third transmission device is situated at least partly within a gear casing of the lower portion, the gear casing having at least a portion that is substantially torpedo-shaped. Also in at least some such embodiments, the at least one output shaft includes a first output shaft and the at least one propeller includes a first propeller. Further, in at least some such embodiments, the third transmission device is situated at least partly within a gear casing of the lower portion, where the gear casing houses therewithin first and second pinions, where each of the first and second pinions is configured to receive a respective portion of the third torque, where the first and second pinions are respectively configured to rotate in opposite directions, where the gear casing further houses first and second additional gears are both axially aligned with the first output shaft, where the first and second additional gears respectively engage the first and second pinions in a manner such that opposite rotation of the first and second pinions relative to one another causes both of the first and second additional gears to rotate in a shared direction, and where such operation allows for the gear casing to have a reduced cross-sectional area. Additionally, in at least some such embodiments, the third transmission device additionally has third and fourth gears respectively situated above and coupled to the first and second pinions, respectively, where the third gear is coupled at least indirectly to the second transmission device so as to receive the third torque and drives the fourth gear. Further, in at least some such embodiments, the third transmission device is either a twin pinion transmission device or a single pinion transmission device, or the at least one output shaft additionally includes a second output shaft and the at least one propeller includes a second propeller, where the third transmission device is configured to cause the first and second output shafts to rotate in respectively opposite directions upon receiving the third torque such that the first and second propellers rotate in respectively opposite directions.

Additionally, in at least some such embodiments, the second transmission device includes, or is configured to receive the second torque via, an intermediate shaft, where the intermediate shaft is below and substantially parallel to the first shaft, and further in at least some such embodiments, the second transmission device is a multi-plate wet disk clutch transmission, and the third torque is communicated from the second transmission device to the third transmission device via an additional shaft that is substantially vertical in orientation, or the second transmission device is capable of being controlled to achieve forward, neutral, and reverse states, where in the forward state the second transmission device is configured to communicate the third torque in a first rotational direction, where in the reverse state the second transmission device is configured to communicate the third torque in a second rotational direction, and where the third transmission device is a twin pinion transmission device.

Further, in at least some such embodiments, the first transmission device includes one of (a) a series of gears each having a respective axis extending parallel to a first axis of the first shaft extending outward from the engine; (b) a first wheel or gear driven by the first shaft in combination with a second wheel or gear that drives a secondary shaft for providing the second torque further in combination with a belt or chain for linking the respective wheels or gears; or (c) first and second 90 degree type gear arrangements that interact such that the first torque provided via the first shaft is communicated from the first 90 degree type gear arrangement downward via an intermediary shaft to the second 90 degree type gear arrangement, which in turn outputs the second torque. Also, in at least some such embodiments, either (a) the first transmission device includes a transfer case that includes an arrangement of gears or other components that interact so that first rotational movement received from the first shaft is converted into second rotational movement accompanying the second torque, the second rotational movement differing in speed or magnitude from the first rotational movement, or (b) the second torque includes substantially all of the first torque, the third torque includes substantially all of the second torque, and the output shaft receives substantially all of the third torque.

Additionally, in at least some such embodiments, an oil reservoir for holding oil for the second transmission device is located within a mid portion of the outboard motor, between the second transmission device and the third transmission device, or the oil reservoir is either (a) cooled by water coolant arriving from the lower portion of the outboard motor, or (b) is capable of holding substantially 5 Liters or more of oil; and in addition to the oil reservoir for the second transmission device, each of the engine, the first transmission device, and third transmission device additionally has a further respective dedicated oil reservoir or repository of its own, so as to enhance operational robustness of the outboard motor. Also, in at least some such embodiments, a flow of rotational power from the engine to a propeller located at an aft end of a first propeller shaft of the at least one output shaft follows an S-shaped route from the engine to the first transmission device to the second transmission device to the third transmission device and finally to the propeller. Further, in at least some such embodiments, a gear ratio achieved between the output shaft and a first propeller shaft of the at least one propeller shaft can be varied by an operator by modifying at least one characteristic of at least one of the first, second, and third transmission devices.

Additionally, in at least some such embodiments, an aft surface of the engine is rigidly attached to the first transmission device, where the first transmission device is further rigidly attached to the second transmission device, and where the second transmission device is further rigidly attached, at least indirectly by an additional rigid member, to the internal combustion engine, whereby in combination the engine, first and second transmission devices, and additional rigid member form a rigid combination structure. Also, in at least some such embodiments, the outboard motor further includes a tubular assembly that provides mountings for the engine and each of the transmission devices, where a first of the mountings provided by the tubular assembly is located at a midsection of the tubular assembly, where proximate the midsection is further provided at least one of an oil sump, a fuel sump and a fuel pump, and where the tubular assembly includes at least a first tube that serves as a conduit for exhaust produced by the engine.

Further, in at least some additional embodiments, the present invention relates to a method of operating an outboard engine. The method includes providing first torque from the engine at a first shaft extending aftward from the engine, causing second torque including at least some of the first torque to be provided to a first location below the engine at least in part by way of a first transmission device, and causing third torque including at least some of the second torque to be provided to a second location below the first location at least in part by way of a second transmission device. The method additionally includes causing fourth torque including at least some of the third torque to be provided to a propeller supported in relation to a torpedo portion of the outboard engine.

Additionally, in at least some embodiments, the present invention relates to an outboard motor configured for attachment to and use with a marine vessel. The outboard motor comprises an internal combustion engine that is positioned substantially (or entirely) above a trimming axis and that provides rotational power output via a crankshaft that extends horizontally or substantially horizontally, a propeller rotatable about a propeller axis and positioned vertically below the internal combustion engine when the outboard motor is in a standard operational position, and at least one transmission component that allows for transmission of at least some of the rotational power output to the propeller. Further, in at least some such embodiments of the outboard motor, the outboard motor includes a front surface and an aft surface, the outboard motor being configured to be attached to the marine vessel such that the front surface would face the marine vessel and the aft surface would face away from the marine vessel when in the standard operational position, and the crankshaft of the engine extends in a front-to-rear direction substantially parallel to a line linking the front surface and aft surface. Also, in at least some such embodiments of the outboard motor, the internal combustion engine is an automotive engine suitable for use in an automotive application and further, in at least some additional embodiments, one or more of the following are true: (a) the internal combustion engine is one of an 8-cylinder V-type internal combustion engine; (b) the internal combustion engine is operated in combination with an electric motor so as to form a hybrid motor; (c) the rotational power output from the internal combustion engine exceeds 550 horsepower; and (d) the rotational power output from the internal combustion engine is within a range from at least 557 horsepower to at least 707 horsepower.

Further, in at least some such embodiments of the outboard motor, the at least one transmission component is positioned substantially below the internal combustion engine, between the internal combustion engine and the propeller axis. Also, in at least some such embodiments of the outboard motor, all cylinders of the internal combustion engine are positioned substantially at or above a center of gravity of the internal combustion engine. Additionally, in at least some such embodiments of the outboard motor, the engine includes (or is operated in conjunction with) at least one of a supercharger and a turbocharger, at least one of a plurality of spark plugs, one or more electrical engine components, the supercharger, and the turbocharger is positioned above one or both of the center of gravity of the internal combustion engine and the crankshaft of the engine, and the outboard motor includes at least one of an intercooler, a heat exchanger, and a circulation pump. Further, in at least some such embodiments of the outboard motor, all of the cylinders of the internal combustion engine have respective cylinder axes that are oriented so as to be either vertical or to have vertical components, and all of the cylinders of the internal combustion engine have exhaust ports that are above the crankshaft of the engine. Additionally, in at least some embodiments of the outboard motor, the outboard motor is configured to be attached to the marine vessel such that a front surface of the outboard motor would face the marine vessel and the aft surface would face away from the marine vessel when in the standard operational position, the internal combustion engine has front and aft sides, the front and aft sides respectively being proximate the front and aft surfaces, respectively, and a power take off of the internal combustion engine extends from the aft side of the internal combustion engine.

Also, in at least some such embodiments of the outboard motor, either (a) one or more of a heat exchanger and an accessory drive output are positioned at or extend from the front side of the internal combustion engine at or proximate to the front surface, or (b) one or more of an accessory drive, a belt, one or more spark plugs, one or more electrical engine components, and one or more other serviceable components are positioned at or proximate to a top side of the internal combustion engine or proximate to the front side of the internal combustion engine opposite the aft side of the internal combustion engine from which the power take off extends. Additionally, in at least some embodiments of the outboard motor, (a) a flywheel is positioned aft of the internal combustion engine, between an aft surface of the internal combustion engine and a first transmission component adjacent thereto, or (b) a center of gravity of the internal combustion engine is above an axis of the crankshaft of the internal combustion engine. Also, in at least some such embodiments of the outboard motor, an aft surface of the internal combustion engine is rigidly attached to a first transmission component of the at least one transmission component, the first transmission component is further rigidly attached to a second transmission component positioned below the internal combustion engine, and the second transmission components is further rigidly attached (at least indirectly by an additional rigid member) to the internal combustion engine, whereby in combination the internal combustion engine, first and second transmission components, and additional rigid member form a rigid combination structure.

Further, in at least some such embodiments of the outboard motor, the outboard motor further comprises a cowling that extends around at least a portion of the outboard motor so as to form a housing therefore. Additionally, in at least some such embodiments of the outboard motor, at least one portion of the cowling extends around an upper portion of the outboard motor at which is located the internal combustion engine. Also, in at least some such embodiments of the outboard motor, a first portion of the cowling is hingedly coupled to a second portion of the cowling by way of a hinge, and the hinge allows for rotation of the first portion of the cowling upward and aftward so that the one or more serviceable components of the internal combustion proximate a top surface or a front surface of the internal combustion engine are accessible. Further, in at least some embodiments, the present invention also relates to a boat comprising such an outboard motor, the boat being a marine vessel, the outboard motor being attached to a transom of the boat associated with a stern of the boat or a fishing deck of the boat. Additionally, in at least some such embodiments of the boat, an operator standing proximate the stern of the boat is able to access one or more components of the internal combustion engine proximate one or more of a front surface and a top surface of the internal combustion engine that are exposed when a cowling portion of the outboard motor is opened upward and aftward away from the stern of the boat. Also, in at least some such embodiments of the boat, the boat further comprises at least one additional motor also attached to the transom or another portion of the boat, and each of the at least one additional motor is identical or substantially identical to the outboard motor.

Also, in at least some embodiments, the present invention relates to an outboard motor configured for use with a marine vessel. The outboard motor comprises a horizontal crankshaft automotive engine and means for communicating at least some rotational power output from the horizontal crankshaft automotive engine to an output thrust device positioned below the horizontal crankshaft engine and configured to interact with water within which the outboard motor is situated. Further, in at least some such embodiments of the outboard motor, the output thrust device includes either a single propeller or two counterrotating propellers, the means for communicating includes a plurality of transmission devices, and a crankcase of the horizontal crankshaft automotive engine is made substantially or entirely from Aluminum.

Additionally, in at least some embodiments, the present invention relates to an outboard motor configured to be mounted on a marine vessel. The outboard motor comprises a housing including an upper portion and a lower portion, where at least one output shaft extends outward from the lower portion upon which at least one propeller is supported, and an engine configured to provide first torque at a first shaft extending outward from the engine, the engine being substantially situated within the housing. The outboard motor further comprises a first transmission device that is in communication with the first shaft so as to receive the output torque and configured to cause second torque including at least some of the first torque to be communicated to a first location beneath the engine, a second transmission device configured to receive the second torque and to cause third torque including at least some of the second torque to be communicated to a second location beneath the first location within or proximate to the lower portion, and a third transmission device positioned within or proximate to the lower portion that is configured to receive the third torque and cause at least some at least some of the third torque to be provided to the at least one output shaft.

In at least some embodiments of the outboard motor, the first shaft is a crankshaft of the engine and extends aftward from the engine along a horizontal or substantially horizontal crankshaft axis, and a center of gravity of the engine is positioned above the horizontal crankshaft axis. Further, in at least some such embodiments of the outboard motor, the third transmission device is situated at least partly within a gear casing of the lower portion, the gear casing having at least a portion that is substantially torpedo-shaped. Also, in at least some such embodiments of the outboard motor, the at least one output shaft includes a first output shaft and the at least one propeller includes a first propeller. Additionally, in at least some such embodiments of the outboard motor, the third transmission device is situated at least partly within a gear casing of the lower portion, the gear casing houses therewithin first and second pinions, each of the first and second pinions is configured to receive a respective portion of the third torque, the first and second pinions are respectively configured to rotate in opposite directions, the gear casing further houses first and second additional gears are both axially aligned with the first output shaft, the first and second additional gears respectively engage the first and second pinions in a manner such that opposite rotation of the first and second pinions relative to one another causes both of the first and second additional gears to rotate in a shared direction, and wherein such operation allows for the gear casing to have a reduced cross-sectional area.

Additionally in at least some such embodiments of the outboard motor, the third transmission device additionally has third and fourth gears respectively situated above and coupled to the first and second pinions, respectively, and the third gear is coupled at least indirectly to the second transmission device so as to receive the third torque and drives the fourth gear. Also, in at least some such embodiments of the outboard motor, the third transmission device is either a twin pinion transmission device or a single pinion transmission device. Further, in at least some such embodiments of the outboard motor, the at least one output shaft additionally includes a second output shaft and the at least one propeller includes a second propeller, and the third transmission device is configured to cause the first and second output shafts to rotate in respectively opposite directions upon receiving the third torque such that the first and second propellers rotate in respectively opposite directions. Also, in at least some such embodiments of the outboard motor, the second transmission device includes (or is configured to receive the second torque via) an intermediate shaft, where the intermediate shaft is below and substantially parallel to the first shaft. Further, in at least some such embodiments of the outboard motor, the second transmission device is a multi-plate wet disk clutch transmission, and the third torque is communicated from the second transmission device to the third transmission device via an additional shaft that is substantially vertical in orientation. Also, in at least some such embodiments of the outboard motor, the second transmission device is capable of being controlled to achieve forward, neutral, and reverse states, where in the forward state the second transmission device is configured to communicate the third torque in a first rotational direction, where in the reverse state the second transmission device is configured to communicate the third torque in a second rotational direction, and where the third transmission device is a twin pinion transmission device.

Further, in at least some such embodiments of the outboard motor, the first transmission device includes one of (a) a series of gears each having a respective axis extending parallel to a first axis of the first shaft extending outward from the engine, (b) a first wheel or gear driven by the first shaft in combination with a second wheel or gear that drives a secondary shaft for providing the second torque further in combination with a belt or chain for linking the respective wheels or gears, or (c) first and second 90 degree type gear arrangements that interact such that the first torque provided via the first shaft is communicated from the first 90 degree type gear arrangement downward via an intermediary shaft to the second 90 degree type gear arrangement, which in turn outputs the second torque. Also, in at least some such embodiments of the outboard motor, either (a) the first transmission device includes a transfer case that includes an arrangement of gears or other components that interact so that first rotational movement received from the first shaft is converted into second rotational movement accompanying the second torque, the second rotational movement differing in speed or magnitude from the first rotational movement, or (b) the second torque includes substantially all of the first torque, the third torque includes substantially all of the second torque, and the output shaft receives substantially all of the third torque.

Further, in at least some such embodiments of the outboard motor, an oil reservoir for holding oil for the second transmission device is located within a mid portion of the outboard motor, between the second transmission device and the third transmission device. Also, in at least some such embodiments of the outboard motor, the oil reservoir is either (a) cooled by water coolant arriving from the lower portion of the outboard motor, or (b) is capable of holding substantially 5 Liters or more of oil. Further, in at least some such embodiments of the outboard motor, in addition to the oil reservoir for the second transmission device, each of the engine, the first transmission device, and third transmission device additionally has a further respective dedicated oil reservoir or repository of its own, so as to enhance operational robustness of the outboard motor.

Also, in at least some such embodiments of the outboard motor, a flow of rotational power from the engine to a propeller located at an aft end of a first propeller shaft of the at least one output shaft follows an S-shaped route from the engine to the first transmission device to the second transmission device to the third transmission device and finally to the propeller. Additionally, in at least some such embodiments of the outboard motor, a gear ratio achieved between the output shaft and a first propeller shaft of the at least one propeller shaft can be varied by an operator by modifying at least one characteristic of at least one of the first, second, and third transmission devices. Further, in at least some such embodiments of the outboard motor, an aft surface of the engine is rigidly attached to the first transmission device, the first transmission device is further rigidly attached to the second transmission device, and the second transmission device is further rigidly attached (at least indirectly by an additional rigid member) to the internal combustion engine, whereby in combination the engine, first and second transmission devices, and additional rigid member form a rigid combination structure. Also, in at least some such embodiments of the outboard motor, the outboard motor further comprises a tubular assembly that provides mountings for the engine and each of the transmission devices, where a first of the mountings provided by the tubular assembly is located at a midsection of the tubular assembly, where proximate the midsection is further provided at least one of an oil sump, a fuel sump and a fuel pump, and where the tubular assembly includes at least a first tube that serves as a conduit for exhaust produced by the engine.

Additionally, in at least some embodiments, the present invention relates to a method of operating an outboard engine. The method includes providing first torque from the engine at a first shaft extending aftward from the engine, causing second torque including at least some of the first torque to be provided to a first location below the engine at least in part by way of a first transmission device, causing third torque including at least some of the second torque to be provided to a second location below the first location at least in part by way of a second transmission device, and causing fourth torque including at least some of the third torque to be provided to a propeller supported in relation to a torpedo portion of the outboard engine.

Further, in at least some embodiments, the present invention relates to an outboard motor for a marine application comprising an upper portion within which is situated an engine that generates torque, and a lower portion including a gear casing, where a propeller output shaft extends aftward from the gear casing along an axis drives rotation of a propeller. Additionally, the gear casing includes each of: (a) first and second pinions, where each of the first and second pinions is configured to receive a respective portion of the torque generated by the engine via at least one transmission device, and where the first and second pinions are respectively configured to rotate in opposite directions; (b) first and second additional gears that are both axially aligned with the axis and coupled to or integrally formed with the propeller output shaft, where the first and second additional gears respectively engage the first and second pinions in a manner such that opposite rotation of the first and second pinions relative to one another causes both of the first and second additional gears to rotate in a shared direction; and (c) an exhaust port formed at or proximate an aft end of the gear casing, the exhaust port allowing exhaust provided thereto via at least one channel within the lower portion to exit the outboard motor.

Additionally, in at least some such embodiments of the outboard motor, at least one water inlet is formed along the lower portion by which water coolant is able to enter the outboard motor from an external water source. Further, in at least some such embodiments, the at least one water inlet includes a lower water inlet formed along a bottom front surface of the gear casing and at least one upper water inlet formed along at least one side surface of the lower portion at a location substantially midway between a top of the lower portion and the bottom front surface. Also, in at least some such embodiments of the outboard motor, the at least one upper water inlet includes port and starboard upper water inlets formed along port and starboard side surfaces of the lower portion. Further, in at least some such embodiments of the outboard motor, operation of the upper water inlets can be tuned by placing or modifying one or more cover plates over the upper water inlets so as to partly or entirely cover over one or more orifices formed within the port and starboard side surfaces in various manners, further operation of the lower water inlet can be tuned by placing an additional cover plate over or in relation to the lower water inlet, and all of the water inlets are positioned forward of the first and second pinions toward a forward side of the outboard motor, the outboard motor being configured so that the forward side faces a marine vessel when the outboard motor is attached to the marine vessel.

Additionally, in at least some such embodiments of the outboard motor, (a) at least one of the orifices is entirely covered over by way of at least one of the cover plates, so as to preclude any of the water coolant from entering the at least one orifice, or (b) the additional cover plate is added so as to block the lower water inlet and thereby preclude any of the water coolant from entering the lower water inlet. Further, in at least some such embodiments of the outboard motor, an oil drain screw associated with an oil reservoir for the gear casing extends, from within the lower portion, toward the lower water inlet without protruding out of the lower portion, whereby the oil drain screw can be accessed to allow draining of oil from the gear casing, and whereby a positioning of the oil drain screw is such that no portion of the oil drain screw protrudes out beyond an exterior surface of the gear casing. Also, in at least some such embodiments of the outboard motor, the lower housing includes a front coolant chamber configured to receive the water coolant able to enter the outboard motor via the at least one water inlet. Additionally, in at least some such embodiments of the outboard motor, the outboard motor further comprises first and second transfer gears respectively coupled to the first and second pinions by way of first and second additional downward shafts extending respectively from the first and second transfer gears to the first and second pinions, respectively, where the first and second transfer gears engage one another and the first transfer gear receives at least some of the torque generated by the engine from a transmission device positioned above the first and second transfer gears by way of an intermediate shaft extending from the transmission device to the first transfer gear.

Also, in at least some such embodiments of the outboard motor, the outboard motor further comprises a mid portion in between the upper portion and the lower portion, where the mid portion and lower portion are configured so that at least a first portion of the water coolant received by the front coolant chamber passes by the first and second transfer gears so as to cool the first and second transfer gears. Additionally, in at least some such embodiments of the outboard motor, the outboard motor further comprises an oil reservoir for the transmission device, the oil reservoir being positioned below the transmission device and above the first and second transfer gears within the mid portion, where the mid portion and lower portion are configured so that at least the first portion or a second portion of the water coolant received by the front coolant chamber passes by the oil reservoir so as to cool oil within the oil reservoir. Further, in at least some such embodiments of the outboard motor, Archimedes spiral mechanisms are formed in relation to each of the first and second additional downward shafts, such that oil is conducted upwards from a reservoir portion within the gear casing to the first and second transfer gears regardless of whether the outboard motor is operating a forward or reverse direction. Also, in at least some such embodiments of the outboard motor, the outboard motor further comprises a mid portion in between the upper portion and the lower portion, where a transmission device capable of forward-neutral-reverse operation is positioned within the mid portion above the first and second pinions, and where the respective portions of the torque are supplied to the first and second pinions at least indirectly from the transmission device.

Additionally, in at least some such embodiments of the outboard motor, the lower portion includes an exhaust cavity positioned aftward of the first and second pinions, the exhaust cavity being configured to receive exhaust provided thereto from the engine and being coupled by way of or constituting the at least one channel by which the exhaust is provided to the exhaust port. Further, in at least some such embodiments of the outboard motor, the exhaust port includes a plurality of exhaust port sections positioned around the propeller output shaft and separated from one another by a plurality of axially extending vanes. Also, in at least some such embodiments of the outboard motor, the lower portion includes a cavitation plate extending aftward along a top portion of the lower portion above the propeller, and the cavitation plate includes at least one of a (a) cavity within which water coolant circulating within the outboard motor arrives after performing cooling within the outboard motor and prior to exiting the outboard motor, the cavity at least partly in communication with the exhaust cavity and (b) a sacrificial anode.

Further, in at least some embodiments, the present invention relates to an outboard motor for a marine application that comprises an upper portion within which is situated an engine that generates torque, and a lower portion including a gear casing, where a propeller output shaft extends aftward from the gear casing along an axis drives rotation of a propeller. The gear casing has: (a) first and second pinions coupled respectively to first and second gears by way of first and second downwardly-extending shafts, respectively, where each of the first and second gears is configured to receive a respective portion of the torque generated by the engine via at least one transmission device, and where the first and second pinions are configured to rotate in opposite directions; (b) first and second additional gears that are both axially aligned with the axis and coupled to or integrally formed with the propeller output shaft, where the first and second additional gears respectively engage the first and second pinions in a manner such that opposite rotation of the first and second pinions relative to one another causes both of the first and second additional gears to rotate in a shared direction; and (c) a plurality of tunable water inlets formed along one or more forward surfaces of the lower portion, the tunable water inlets being configurable to allow or preclude entry of water coolant from an external water source to enter into the lower portion, wherein the lower portion is configured so that at least some of the water coolant entering the lower portion passes by the first and second gears so as to cool the first and second gears.

Additionally, in at least some such embodiments of the outboard motor, at least one of the lower portion, upper portion and a mid portion between the lower and upper portions is configured to direct at least some of the water coolant toward or by at least one of: (a) an oil reservoir for a transmission device; (b) a heat exchanger configured to cool glycol engine coolant upon receiving the water coolant; and (c) an exhaust conduit receiving exhaust from the engine. Further, in at least some such embodiments of the outboard motor, the engine is a horizontal crankshaft engine, and the at least one transmission device includes a wet disk clutch transmission. Also, the present invention also relates in at least some embodiments to a marine vessel comprising such embodiments of the outboard motor.

Further, in at least some embodiments, an outboard motor includes a lower portion having one or more tunable water inlets. In some such embodiments, there are one or two upper water inlets located substantially midway between top and bottom regions of the lower portion. In other embodiments, there is at least one tunable water inlet along a bottom surface of a gear case. In at least some such embodiments, one or more water inlets are tunable by placement of one or more covers (e.g., cover plates, clamshell-type structures, etc.) that entirely or partly block entry of water into an interior of the lower portion via the one or more water inlets. Water entering via the inlets can proceed into the outboard motor for use for cooling.

Additionally, in at least some embodiments, the present invention relates to a mounting system for connecting an outboard motor to a marine vessel. The mounting system comprises a swivel bracket structure having a steering tube structure and providing a steering axis about which the swivel bracket structure is capable of rotating, and a pair of clamp bracket structures extending from the swivel bracket structure. The mounting system also comprises a first steering yoke structure connected to the swivel bracket structure by way of the steering tube structure, and including a first crosspiece mounting structure that includes a pair of first steering yoke structure mount portions which can be used to couple the swivel bracket structure to the outboard engine, the pair of first steering yoke structure mount portions separated by a first distance. The mounting system further comprises a second steering yoke structure connected to the swivel bracket structure by way of the steering tube structure, and including a second steering yoke structure mount portion which can be used to couple the swivel bracket structure to the outboard engine, the second steering yoke structure mount portion positioned between the pair of first steering yoke structure mount portions.

Further, in at least some such embodiments of the mounting system, each of the pair of first steering yoke structure mount portions includes a respective first passage and the second steering yoke structure mount portion includes a second passage. Also, in at least some such embodiments of the mounting system, the second steering yoke structure mount portion passage is below and between the pair of first steering yoke structure mount portions. Additionally, in at least some such embodiments of the mounting system, the outboard motor includes a horizontal crankshaft engine.

Also, in at least some embodiments, the present invention relates to a mounting system for connecting an outboard motor to a marine vessel. The mounting system includes a swivel bracket structure having a steering tube structure and providing a steering axis about which the swivel bracket structure is capable of rotating, and a pair of clamp bracket structures extending from the swivel bracket structure. The mounting system further includes a first steering yoke structure connected to the swivel bracket structure about a steering tube structure, and including a first crosspiece mounting structure that includes a pair of first steering yoke structure mount portions which can be used to couple the swivel bracket structure to the outboard engine, the pair of first steering yoke structure mount portions separated by a first distance. The mounting system additionally includes a second steering yoke structure connected to the swivel bracket structure about the steering tube structure, and including a pair of second steering yoke structure mount portions which can be used to couple the swivel bracket structure to the outboard engine, the pair of second steering yoke structure mount portions separated by a second distance, where the first distance is greater than the second distance, thereby providing convergence from the pair of first steering yoke structure mount portions to the pair of second steering yoke structure mount portions.

Further, in at least some such embodiments of the mounting system, each of the pair of first steering yoke structure mount portions includes a passageway and the first distance is at least about the distance between respective centers of the passageways. Additionally, in at least some such embodiments of the mounting system, each of the pair of second steering yoke structure mount portions includes a passageway and the second distance is at least about the distance between respective centers of the passageways. Also, in at least some such embodiments of the mounting system, the first crosspiece mounting structure is centered or substantially centered about the steering tube structure, and the crosspiece mounting structure terminates in the pair of mount portions. Additionally, in at least some such embodiments of the mounting system, the clamp bracket structures are symmetric with respect to one another. Further, in at least some such embodiments of the mounting system, the clamp bracket structures are capable of being affixed rigidly or substantially rigidly to the marine vessel. Also, in at least some such embodiments of the mounting system, the crosspiece mounting structure terminates in the pair of mount portions.

Additionally, in at least some such embodiments of the mounting system, a steering axis extends longitudinally along the center of steering tube structure and provides an axis of rotation. Also, in at least some such embodiments of the mounting system, the axis of rotation is vertical or substantially vertical. Further, in at least some such embodiments of the mounting system, the mounting system further includes a tilt tube structure having an axis of rotation that permits at least one of tilting and trimming about the axis of rotation, and the axis of rotation of the tilt tube structure further coincides with an axis of actuation of a power steering actuator that is generally housed within the tilt tube structure. Also, in at least some such embodiments of the mounting system, the mounting system further includes a tilt tube structure having an axis of rotation. Further, in at least some such embodiments of the mounting system, the swivel bracket structure is rotatable about the tilt tube axis of rotation. Additionally, in at least some such embodiments of the mounting system, the swivel bracket structure is at least one of tiltable and trimmable about the tilt tube axis of rotation. Also, in at least some such embodiments of the mounting system, the tilt tube axis of rotation is horizontal or substantially horizontal and, by virtue of swiveling around the tilt tube axis of rotation, it is possible to rotate the outboard motor in relation to a transom of the marine vessel so as to bring a lower portion of the marine vessel out of the water within which it would ordinarily be situated.

Also, in at least some embodiment, the present invention relates to a mounting system for connecting an outboard motor to a marine vessel. The mounting system comprises a swivel bracket structure having a steering tube structure and providing a steering axis about which the swivel bracket structure is capable of rotating, and a pair of clamp bracket structures extending from the swivel bracket structure. The mounting system further comprises a tilt tube structure having an axis of rotation, the tilt tube structure housing (at least in part) a power steering cylinder having a central axis that coincides, or substantially coincides, with the tilt tube structure axis of rotation. Further, in at least some such embodiments of the mounting system, the power steering cylinder includes a power steering piston that is capable of moving within the steering cylinder in response to power steering fluid movement. Additionally, in at least some such embodiments of the mounting system, the swivel bracket structure is rotatable about the tilt tube axis of rotation. Further, in at least some such embodiments of the mounting system, the swivel bracket structure is at least one of tiltable and trimmable about the tilt tube axis of rotation. Also, in at least some such embodiments of the mounting system, the tilt tube axis of rotation is horizontal.

Additionally, in at least some such embodiments of the mounting system, the mounting system further comprises a first steering yoke structure connected to the swivel bracket structure by way the steering tube structure, and including a first crosspiece mounting structure that includes a pair of first steering yoke structure mount portions which can be used to couple the swivel bracket structure to the outboard engine, the pair of first steering yoke structure mount portions separated by a first distance, and a second steering yoke structure connected to the swivel bracket structure by way of the steering tube structure, and including a second steering yoke structure mount portion which can be used to couple the swivel bracket structure to the outboard engine, the second steering yoke structure mount portion positioned between the pair of first steering yoke structure mount portions. Also, in at least some such embodiments of the mounting system, the mounting system further comprises a first steering yoke structure connected to the swivel bracket structure about a steering tube structure, and including a first crosspiece mounting structure that includes a pair of first steering yoke structure mount portions which can be used to couple the swivel bracket structure to the outboard engine, the pair of first steering yoke structure mount portions separated by a first distance, and a second steering yoke structure connected to the swivel bracket structure about the steering tube structure, and including a pair of second steering yoke structure mount portions which can be used to couple the swivel bracket structure to the outboard engine, the pair of second steering yoke structure mount portions separated by a second distance, wherein the first distance is greater than the second distance, thereby providing convergence from the pair of first steering yoke structure mount portions to the pair of second steering yoke structure mount portions.

Further, in at least some embodiments, the present invention relates to a method of cooling an outboard motor having a lower portion, a mid portion, an upper portion, a first transmission disposed in the upper portion and a second transmission disposed in the mid portion. The method includes receiving, into the lower portion of the outboard motor, an amount of cooling water, and flowing the amount of cooling water generally upwardly into the mid portion of the outboard motor and past the second transmission. In at least some such embodiments of the method, the amount of cooling water is received into the lower portion of the outboard motor via a plurality of water inlets, and/or the cooling water cools at least in part the second transmission. Also, in at least some such embodiments of the method, the amount of cooling water that is flowing upwardly in the mid portion of the outboard motor flows vertically or substantially vertically. Further, in at least some such embodiments of the method, the amount of cooling water flowing into the mid portion of the outboard motor also flows generally rearwardly in the mid portion past at least one of a pair of transfer gears and a second transmission oil reservoir to cool any oil in the reservoir. Also, in at least some such embodiments of the method, an engine is disposed in the upper portion of the outboard motor and the amount of cooling water flows from the mid portion generally upwardly into the upper portion.

Additionally, in at least some such embodiments of the method, the method further comprises flowing the amount of cooling water forwardly to a water pump. Also, in at least some such embodiments of the method, the method further comprises pumping, using the water pump, the amount of cooling water into and through, so as to cool, an engine heat exchanger and an engine oil cooler. Further, in at least some such embodiments of the method, the method further comprises cooling a heat exchanger fluid at the heat exchanger using the amount of cooling water and further cooling an amount of oil at the engine oil cooler using the amount of water. Additionally, in at least some such embodiments of the method, the method further comprises, after exiting the engine heat exchanger and engine oil cooler, flowing the amount of water generally downwardly, toward and into at least one chamber surrounding a plurality of exhaust channels, and further flowing the amount of water back upwardly into at least one exhaust manifold, so as to cool exhaust. Also, in at least some such embodiments of the method, cooling water flows in a direction counter to a direction of exhaust flow so as to cool the exhaust (while in the at least one chamber surrounding the exhaust channels). Further, in at least some such embodiments of the method, after exiting the at least one exhaust manifold, the amount of cooling water flows downwardly, through one or more mufflers, and past the first transmission and, in so doing, cools the one or more mufflers and the first transmission. Also, in at least some such embodiments of the method, the method further comprises flowing the amount of cooling water out of the outboard motor, by way of the lower portion.

Further, in at least some embodiments, the present invention relates to a method of cooling an outboard motor having a lower portion, a mid portion, and an upper portion. The method comprises receiving, into the lower portion of the outboard motor, an amount of cooling water, and flowing the amount of water upwardly from the lower portion to and through the mid portion and into the upper portion. The method also includes flowing a first portion of the amount of water into a first water pump and pumping the water from the first pump into and through one or more engine heat exchangers (e.g., and engine coolant heat exchanger and/or an engine oil cooler) and, after exiting the engine heat exchanger(s), flowing the first portion of the cooling water out of the outboard motor by way of the lower portion. The method further includes flowing a second portion of the amount of water into a second water pump and pumping the second portion into chambers surrounding respective exhaust channels to cool exhaust flowing within the channels, and flowing the second portion of the amount of cooling water through a plurality of mufflers and past a first transmission disposed in the upper portion, and in so doing, cooling the mufflers and the first transmission. The method additionally includes flowing the second portion of the amount of cooling water from the mufflers and the first transmission, out of the outboard motor.

Additionally, in at least some such embodiments of the method, the method further comprises flowing the amount of cooling water generally upwardly into the mid portion of the outboard motor and past, so as to cool, the second transmission disposed in the mid portion. Further, in at least some such embodiments of the method, the method further comprises cooling the engine in the upper portion by cooling engine coolant using a heat exchanger and cooling engine oil using an engine oil cooler. Also, in at least some such embodiments of the method, the method further comprises at least one of: (a) flowing the second portion of the amount of cooling water to, so as to cool, an intercooler, and (b) flowing a third portion of the amount of water into a third water pump and pumping the third portion of the amount of cooling water to, so as to cool, an intercooler. Further, in at least some such embodiments of the method, the intercooler is an aluminum intercooler, and air to glycol water cooling is performed at the intercooler.

Further, in at least some embodiments, the present invention relates to a rigid body structure for use with outboard motor comprising an internal combustion engine that is rigidly attached to a first a first transmission assembly, a second transmission assembly positioned below the internal combustion engine and connected the first transmission assembly, and an additional rigid member connected to the second transmission assembly and to the internal combustion engine, whereby in combination the internal combustion engine, first and second transmission assemblies, and the additional rigid member form a rigid body structure. Additionally, in at least some such embodiments of the rigid body structure, the internal combustion engine is a horizontal crankshaft engine. Further, in at least some such embodiments of the rigid body structure, the rigid body structure is rectangular or substantially rectangular in shape. Also, in at least some such embodiments of the rigid body structure, the rigid body structure includes a fastener which permits adjustability in the assembly of the rigid body structure.

Additionally, in at least some embodiments, the present invention relates to a progressive mounting assembly of an outboard motor also having a transom mounting assembly, the progressive mounting assembly for use in allowing connection of the outboard motor to a transom of a marine vessel by way of the transom mounting assembly. The progressive mounting assembly includes a steering yoke structure capable of being used with the transom mounting assembly, a mounting bracket structure connected to the steering yoke structure and mountable to a remainder of the outboard motor, and a thrust mount structure in operable association with the steering yoke structure and the mounting bracket structure such that the thrust mount structure is capable of transferring force in during an operational range of the outboard motor. Further, in at least some such embodiments of the progressive mounting assembly, the thrust mount structure contacts the lower yoke assembly and is deformed transferring a moderate to substantial force.

Also, in at least some embodiments, the present invention relates to an outboard motor adapted for use with a marine vessel. The outboard motor comprises an internal combustion engine positioned substantially within an upper portion of the outboard motor, where the internal combustion engine is configured to output rotational power at a crankshaft and further output exhaust from at least one engine cylinder during operation of the engine, and a first exhaust conduit that is configured to communicate at least some of the exhaust downward from the engine to a gear casing at a lower portion of the outboard motor, where the exhaust is able to exit the lower portion by way of at least one orifice formed in an aft surface of the gear casing positioned in front of a propeller attached to the gear casing. The outboard motor further comprises at least one water inlet positioned proximate a front surface of the lower portion by which water coolant is able to enter into the lower portion from an exterior water source, and at least one channel leading from the at least one water inlet to a portion of the exhaust conduit, the least one channel being configured to direct at least some of the water coolant to pass in proximity to the exhaust conduit so as to cool the exhaust communicated by the exhaust conduit.

Further, in at least some such embodiments of the outboard motor, the at least one engine cylinder includes a plurality of engine cylinders, where the first exhaust conduit is configured to receive the exhaust from a first cylinder along a first side of the engine, and the outboard motor further comprises a second exhaust conduit that is configured to receive additional exhaust from a second cylinder along a second side of the engine and to communicate at least some of the additional exhaust downward from the engine to the gear casing. Also, in at least some such embodiments of the outboard motor, the first and second exhaust conduits run along port and starboard sides of the outboard motor so as to minimize heat transfer from the exhaust conduits to one or both of oil or other internal engine components. Additionally, in at least some such embodiments of the outboard motor, the outboard motor further comprises third and fourth exhaust conduits that link the first and second exhaust conduits, respectively, with first and second mufflers, respectively, the first and second mufflers being positioned aftward of the internal combustion engine substantially along first and second sides of a first transmission. Also, in at least some such embodiments of the outboard motor, the first and second mufflers are coupled in a manner tending to reduce or ameliorate noise associated with the exhaust and additional exhaust communicated from the engine.

Further, in at least some such embodiments of the outboard motor, output ports of the first and second mufflers are coupled to output orifices formed within an upper portion of a cowling of the outboard motor, where positioning of the orifices within the upper portion minimizes water entry into the orifices, and where the upper portion of the cowling further includes at least one air intake port. Additionally, in at least some embodiments, the engine is a horizontal crankshaft engine that outputs the exhaust communicated by the exhaust conduits. Also, in at least some embodiments, coolant for cooling exhaust flows in a direct opposite or counter a direction of flow of the exhaust leaving the engine.

Additional alternate embodiments are also possible. For example, in some other embodiments, more than one (e.g., two) of the outboard motors such as the outboard motor 104 are positioned on a single marine vessel such as the marine vessel 102 to form a marine vessel assembly.

It is specifically intended that the present invention not be limited to the embodiments and illustrations contained herein, but include modified forms of those embodiments including portions of the embodiments and combinations of elements of different embodiments as come within the scope of the following claims.

We claim:

1. An outboard motor configured to be mounted on a marine vessel, the outboard motor comprising:
   a housing including an upper portion and a lower portion, wherein at least one output shaft extends outward from the lower portion upon which at least one propeller is supported;
   an engine configured to provide first torque at a first shaft extending outward from the engine, the engine being substantially situated within the housing;
   a first transmission device that is in communication with the first shalt so as to receive the first torque and configured to cause second torque including at least some of the first torque to be communicated to a first location beneath the engine;
   at least one additional transmission device configured to receive the second torque and to cause third torque including at least some of the second torque to be at least indirectly communicated to the at least one output shaft,
   wherein the first transmission device additionally includes:
      a plurality of power train components including a plurality of gears, a plurality of sprockets, a plurality of wheels, or a plurality of pulleys;
      a primary housing structure within which the power train components are supported and also including an opening; and
      a cover structure configured to cover over the opening when attached to the primary housing structure,
      wherein the first transmission device is configured so that, when the cover structure is removed from the primary housing structure, one or more of the power train components are accessible by way of the opening,
   whereby accessing and modification of one or more of the power train components is facilitated so as to facilitate modification of a gear ratio of the first transmission device.

2. The outboard motor of claim 1, wherein the power train components include a first change gear supported upon an input shall of the first transmission device, the input shaft being either a portion of the first shaft or indirectly coupled to the first shall, wherein the first change gear is accessible so as to be removable from the first transmission device and replaced by an alternate gear when the cover structure is removed from the primary housing structure.

3. The outboard motor of claim 2, wherein the power train components include a second change gear supported upon an intermediate shaft of the first transmission device, the intermediate shall indirectly coupled to an additional output shaft by which the second torque is communicated from the first transmission device, wherein the second change gear is accessible so as to be removable from the first transmission device and replaced by a further alternate gear when the cover structure is removed from the primary housing structure.

4. The outboard motor of claim 3, wherein each of the input shall and intermediate shaft is supported in relation to the first transmission device by way of a respective pair of bearing assemblies.

5. The outboard motor of claim 4, wherein at least one of the bearing assemblies of each of the pairs of bearing assemblies includes a respective shim, and wherein each of the bearing assemblies includes a respective cone and a respective cup.

6. The outboard motor of claim 5, wherein each of the first and second change gears can be replaced without any modifications to the respective shims of the bearing assemblies by which the input shaft and intermediate shaft are supported.

7. The outboard motor of claim 4, wherein at least one of the bearing assemblies of each of the pairs of bearing assemblies is supported at least in part by the cover structure.

8. The outboard motor of claim 3, wherein the power train components additionally include first and second nuts that can be tightened so as to fixedly attach the first and second change gears to the input and intermediate shafts, respectively, and that can respectively be loosened and removed so as to allow removal of the first and second change gears, respectively.

9. The outboard motor of claim 3, further comprising a first additional gear also supported upon the intermediate shaft, a second additional gear supported on an additional intermediate shaft, and a third additional gear supported on an additional output shaft;
wherein the first change gear is in contact with the second change gear, the first additional gear is in contact with the second additional gear, and the second additional gear is in contact with the third additional gear so that rotation of the first change gear indirectly causes rotation of the additional output shaft; and
wherein the first change gear has a first diameter that is less than, equal to, or greater than a second diameter of the second change gear.

10. The outboard motor of claim 1, wherein an oil pump is integrated with the first transmission device, and wherein the first transmission device and oil pump are configured so that operation of the first transmission device causes the oil pump to pressurize and output oil.

11. The outboard motor of claim 10, wherein the oil pump includes an annular orifice, wherein the first transmission device and oil pump are configured so that an additional shaft of the first transmission device is positioned so as to pass through the annular orifice, such that rotation of the first shaft of the engine at least indirectly causes corresponding rotation of the additional shaft, which in turn causes the oil pump to pressurize and output the oil.

12. The outboard motor of claim 11, wherein each of the first shaft and the additional shaft extends in a substantially horizontal manner, and wherein the oil pump is a gerotor type pump.

13. The outboard motor of claim 10, further comprising an oil filter associated with the oil pump and at least one channel, wherein the outboard motor is further configured so that the oil output by the oil pump is delivered to the oil filter at which the oil is filtered, and so that the filtered oil is communicated via the at least one channel to at least one of the power train components, a component of the at least one additional transmission device, and an additional component of the outboard motor.

14. A method of modifying a gear ratio of a first transmission device on an outboard motor, the method comprising:
removing a cover from a primary housing of the first transmission device so as to reveal power train components supported within the primary housing, the power train components including first and second power train components;
removing first and second fastening components by which the first and second power train components are respectively affixed to first and second shafts respectively extending within the first transmission device;
removing the first and second power train components from the first transmission device via an orifice within the primary housing;
providing third and fourth power train components respectively as replacements for the first and second power train components, respectively;
affixing the third and fourth power train components with respect to the first and second shafts; and
attaching the cover to the primary housing.

15. The method of claim 14, wherein each of the first and second fastening components is a respective nut, wherein the first transmission device includes a plurality of bearing assemblies with shims for supporting the shafts therewithin, and wherein the modifying of the gear ratio does not require any modification to the shims.

16. The method of claim 14, wherein the affixing of the third and fourth power train components includes attaching the first and second fastening components to the first and second shafts, wherein the first shaft is part of or driven by an output shaft of an engine of the outboard motor, and wherein the second shaft is an internal shaft within the first transmission device.

17. The method of claim 14, further comprising:
providing an oil pump that is integrated within the first transmission device and supported in relation to at least one of the first shaft, the second shaft, or an additional shaft of the first transmission device.

18. A method of operating the first transmission device of claim 17, further comprising:
operating the first transmission device so as to cause rotation of each of the first shall, the second shaft, and the additional shaft, wherein the oil pump is supported in relation to the additional shaft, wherein the rotation of the additional shaft causes the oil pump to drive oil to an oil filter that is in turn provided to at least one component of the outboard motor, and wherein the oil pump is a gerotor type pump.

19. A transmission device for implementation in an outboard motor configured to be mounted on a marine vessel in a manner such that an engine of the outboard motor is positioned outside of the marine vessel, the transmission device comprising:
a plurality of power train components including a plurality of gears and a plurality of shafts, the plurality of shafts including an input shaft and an output shaft, wherein the input shaft is configured to receive rotational power from the engine of the outboard motor, and wherein the input shaft is substantially horizontal,
wherein the power train components are arranged so that input rotation of the input shaft results in output rotation of the output shaft;

a primary housing portion within which the plurality of power train components are at least partly positioned;

a secondary housing portion that is configured to be affixable to and removable from the primary housing portion, wherein the primary housing portion and the secondary housing portion are configured so that the secondary housing portion when affixed to the primary housing covers over an opening with the secondary housing portion, the opening being proximate to an end of the input shaft, on which a first of the gears is supported; and an oil pump that is formed as part of the transmission device, wherein the transmission device with the oil pump is configured so that the oil pump is driven to pressurize and output oil when the transmission device is operating to communicate rotational power.

20. The transmission device of claim 19, wherein at least two of the plurality of gears are accessible from a location outside of the transmission device when the secondary housing portion is removed, whereby the at least two gears can be replaced by at least two replacement gears so that a gear ratio of the transmission device is altered.

21. The transmission device of claim 20, wherein the oil pump is mounted upon a first of the shafts of the transmission device such that rotational movement of the first shaft drives the oil pump to pressurized and output the oil, and wherein at least some of the oil that is output is delivered to at least one bearing of the transmission device.

22. The transmission device of claim 19, wherein the secondary housing portion is configured so that the secondary housing portion when affixed to the primary housing additionally serves to support at least one of the power train components.

23. A method of modifying a gear ratio of a first transmission device on an outboard motor, the method comprising:

removing a cover from a primary housing of the first transmission device so as to reveal a plurality of power train components supported within the primary housing, the power train components including first and second power train components that are respectively supported within the primary housing by first and second shafts, respectively, so as to be rotatable about first and second axes of the first and second shafts, respectively, wherein each of the first and second axes is horizontal or substantially-horizontal;

removing the first and second power train components from the first transmission device via an orifice within the primary housing;

providing third and fourth power train components respectively as replacements for the first and second power train components, respectively;

affixing the third and fourth power train components with respect to the first and second shafts; and attaching the cover to the primary housing.

24. The method of claim 23, wherein the cover is removed from an upper rear-facing region of the primary housing at which is located the orifice.

25. The method of claim 24, wherein each of the first, second, third, and fourth power train components is a respective gear.

26. The method of claim 25, wherein an oil pump is integrated with the first transmission device, and wherein the first transmission device and oil pump are configured so that operation of the first transmission device causes the oil pump to pressurize and output oil.

* * * * *